United States Patent
Simpson

(10) Patent No.: US 11,555,709 B2
(45) Date of Patent: *Jan. 17, 2023

(54) FINANCIAL SWAP INDEX METHOD AND SYSTEM ON TRANSPORTATION CAPACITY UNITS AND TRADING DERIVATIVE PRODUCTS BASED THEREON

(71) Applicant: CirclesX LLC, Houston, TX (US)

(72) Inventor: Erik M Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 246 days.

This patent is subject to a terminal disclaimer.

(21) Appl. No.: 16/556,838

(22) Filed: Aug. 30, 2019

(65) Prior Publication Data

US 2020/0011683 A1 Jan. 9, 2020

Related U.S. Application Data

(63) Continuation-in-part of application No. 16/274,490, filed on Feb. 13, 2019, now Pat. No. 11,215,466, and
(Continued)

(51) Int. Cl.
*G06Q 50/14* (2012.01)
*G01C 21/34* (2006.01)
(Continued)

(52) U.S. Cl.
CPC ......... *G01C 21/3438* (2013.01); *G06F 16/29* (2019.01); *G06F 16/9535* (2019.01);
(Continued)

(58) Field of Classification Search
None
See application file for complete search history.

(56) References Cited

U.S. PATENT DOCUMENTS 4,476,954 A 10/1984 Johnson et al.
5,412,560 A 5/1995 Dennison
(Continued)

FOREIGN PATENT DOCUMENTS

CN 107341968 A 11/2017
GB 2539556 A 12/2016
(Continued)

OTHER PUBLICATIONS

PCT International Search Report and Written Opinion; PCT/US2020/027543; dated Jul. 1, 2020.
(Continued)

*Primary Examiner* — Sunit Pandya
(74) *Attorney, Agent, or Firm* — Pramudji Law Group PLLC; Ari Pramudji

(57) ABSTRACT

Implementations of various methods and systems for creating and calculating a transportation capacity unit index and trading derivative products based thereon to transact and trade transportation seats or freight or transportation capacity units and resulting financial swap, futures, forwards and option structures in airline transport, subway transport, train transport, automobile transport, autonomous vehicle transport, taxi transport, space transport, package freight transport, tractor trailer freight transport, cargo freight transport, container freight transport, virtual transport, underground transport, ship or sea transport, public transport, private transport or drone transport on a computer, mobile computer device, audio computer device, virtual reality computer device or mixed reality computing device.

20 Claims, 47 Drawing Sheets

Related U.S. Application Data a continuation-in-part of application No. 16/258,658, filed on Jan. 27, 2019, now Pat. No. 11,035,682, and a continuation-in-part of application No. 16/257,032, filed on Jan. 24, 2019, now abandoned, and a continuation-in-part of application No. 16/242,981, filed on Jan. 8, 2019, now abandoned, and a continuation-in-part of application No. 16/242,967, filed on Jan. 8, 2019, and a continuation-in-part of application No. 16/239,485, filed on Jan. 3, 2019, and a continuation-in-part of application No. 16/183,647, filed on Nov. 7, 2018, and a continuation-in-part of application No. 16/167,525, filed on Oct. 22, 2018, and a continuation-in-part of application No. 15/877,393, filed on Jan. 23, 2018, and a continuation-in-part of application No. 15/266,326, filed on Sep. 15, 2016, now Pat. No. 11,138,827.

(51) Int. Cl.
  *G06Q 50/00* (2012.01)
  *G06Q 50/30* (2012.01)
  *G06F 16/9535* (2019.01)
  *G06F 16/29* (2019.01)
  *G06Q 30/02* (2012.01)

(52) U.S. Cl.
  CPC ......... *G06Q 30/0206* (2013.01); *G06Q 50/01* (2013.01); *G06Q 50/30* (2013.01)

(56) References Cited

U.S. PATENT DOCUMENTS

| | | |
|---|---|---|
| 5,604,676 A | 2/1997 | Penzias |
| 5,726,885 A | 3/1998 | Klein et al. |
| 5,751,245 A | 5/1998 | Janky et al. |
| 5,973,619 A | 10/1999 | Paredes |
| 6,175,831 B1 | 1/2001 | Weinreich et al. |
| 6,240,396 B1 | 5/2001 | Walker et al. |
| 6,285,999 B1 | 9/2001 | Page |
| 6,356,838 B1 | 3/2002 | Paul |
| 6,421,606 B1 | 7/2002 | Asai et al. |
| 6,434,530 B1 | 8/2002 | Sloane et al. |
| 6,609,103 B1 | 8/2003 | Kolls |
| 6,618,062 B1 | 9/2003 | Brown et al. |
| 6,646,659 B1 | 11/2003 | Brown et al. |
| 6,663,564 B2 | 12/2003 | Miller-Kovach et al. |
| 6,708,879 B2 | 3/2004 | Hunt |
| 6,850,907 B2 | 2/2005 | Lutnick et al. |
| 7,090,638 B2 | 8/2006 | Vidgen |
| 7,373,320 B1 | 5/2008 | McDonough |
| 7,584,123 B1 | 9/2009 | Karonis et al. |
| 7,634,442 B2 | 12/2009 | Alvarado et al. |
| 7,680,690 B1 | 3/2010 | Catalano |
| 7,680,770 B1 | 3/2010 | Buyukkokten et al. |
| 7,711,629 B2 | 5/2010 | Laurent et al. |
| 7,747,739 B2 | 6/2010 | Bridges et al. |
| 7,756,633 B2 | 7/2010 | Huang et al. |
| 7,788,207 B2 | 8/2010 | Alcorn et al. |
| 7,886,166 B2 | 2/2011 | Shnekendorf et al. |
| 7,987,110 B2 | 7/2011 | Cases et al. |
| 8,024,234 B1 | 9/2011 | Thomas et al. |
| 8,121,780 B2 | 2/2012 | Gerdes et al. |
| 8,249,946 B2 | 8/2012 | Froseth et al. |
| 8,296,335 B2 | 10/2012 | Bouve et al. |
| 8,388,451 B2 | 3/2013 | Auterio et al. |
| 8,570,244 B2 | 10/2013 | Mukawa |
| 8,762,035 B2 | 6/2014 | Levine et al. |
| 8,798,593 B2 | 8/2014 | Brown et al. |
| 8,918,411 B1 | 12/2014 | Latif et al. |
| 8,920,175 B2 | 12/2014 | Black et al. |
| 8,930,490 B2 | 1/2015 | Brown et al. |
| 8,968,099 B1 | 3/2015 | Hanke et al. |
| 9,011,153 B2 | 4/2015 | Bennett et al. |
| 9,020,763 B2 | 4/2015 | Faaborg et al. |
| 9,077,204 B2 | 7/2015 | More et al. |
| 9,092,826 B2 | 7/2015 | Deng et al. |
| 9,159,088 B2 | 10/2015 | Dillahunt et al. |
| 9,213,957 B2 | 12/2015 | Stefik et al. |
| 9,274,540 B2 | 3/2016 | Anglin et al. |
| 9,292,764 B2 | 3/2016 | Yun et al. |
| 9,387,928 B1 | 7/2016 | Gentry et al. |
| 9,389,090 B1 | 7/2016 | Levine et al. |
| 9,389,094 B2* | 7/2016 | Brenner ............... G01C 21/343 |
| 9,410,963 B2 | 8/2016 | Martin et al. |
| 9,528,972 B2 | 12/2016 | Minvielle |
| 9,558,515 B2 | 1/2017 | Babu et al. |
| 9,665,983 B2 | 5/2017 | Spivack |
| 9,880,577 B2 | 1/2018 | Dyess et al. |
| 9,960,637 B2 | 5/2018 | Sanders et al. |
| 9,978,282 B2 | 5/2018 | Lambert et al. |
| 10,262,289 B2 | 4/2019 | Vaananen |
| 10,403,050 B1 | 9/2019 | Beall et al. |
| 10,460,520 B2 | 10/2019 | Simpson et al. |
| 10,586,084 B2 | 3/2020 | Burch et al. |
| 10,685,503 B2 | 6/2020 | Ricci |
| 10,737,585 B2 | 8/2020 | Chaudhary et al. |
| 10,832,337 B1 | 11/2020 | Floyd et al. |
| 10,872,381 B1 | 12/2020 | Leise et al. |
| 11,138,827 B2 | 10/2021 | Simpson |
| 11,288,563 B2 | 3/2022 | Lee et al. |
| 11,296,897 B2 | 4/2022 | Endress et al. |
| 11,298,017 B2 | 4/2022 | Tran |
| 2002/0004788 A1 | 1/2002 | Gros et al. |
| 2002/0013718 A1 | 1/2002 | Cornwell |
| 2002/0013761 A1 | 1/2002 | Bundy |
| 2002/0065738 A1 | 5/2002 | Riggs et al. |
| 2002/0065766 A1 | 5/2002 | Brown et al. |
| 2002/0133456 A1 | 9/2002 | Lancaster et al. |
| 2002/0161689 A1 | 10/2002 | Segal |
| 2003/0055776 A1 | 3/2003 | Samuelson |
| 2003/0191725 A1 | 10/2003 | Ratliff et al. |
| 2003/0233311 A1 | 12/2003 | Bramnick et al. |
| 2004/0019552 A1 | 1/2004 | Tobin |
| 2004/0115596 A1 | 6/2004 | Snyder et al. |
| 2004/0260581 A1 | 12/2004 | Baranowski et al. |
| 2005/0021346 A1 | 1/2005 | Nadan et al. |
| 2005/0027637 A1 | 2/2005 | Kohler |
| 2005/0288974 A1 | 12/2005 | Baranowski et al. |
| 2005/0288986 A1 | 12/2005 | Barts et al. |
| 2007/0005224 A1 | 1/2007 | Sutardja |
| 2008/0033833 A1 | 2/2008 | Senior |
| 2008/0040232 A1 | 2/2008 | Perchthaler |
| 2008/0077309 A1 | 3/2008 | Cobbold |
| 2008/0140557 A1 | 6/2008 | Bowlby et al. |
| 2008/0157990 A1 | 7/2008 | Belzer et al. |
| 2009/0231687 A1 | 9/2009 | Yamamoto |
| 2009/0271236 A1 | 10/2009 | Ye et al. |
| 2009/0275002 A1 | 11/2009 | Hoggle |
| 2009/0276154 A1 | 11/2009 | Subramanian et al. |
| 2009/0287401 A1 | 11/2009 | Levine et al. |
| 2010/0042421 A1 | 2/2010 | Bai et al. |
| 2010/0114790 A1 | 5/2010 | Strimling et al. |
| 2010/0191834 A1 | 7/2010 | Zampiello |
| 2010/0211441 A1 | 8/2010 | Sprigg et al. |
| 2010/0217680 A1 | 8/2010 | Fusz et al. |
| 2010/0228574 A1 | 9/2010 | Mundinger et al. |
| 2010/0280884 A1 | 11/2010 | Levine et al. |
| 2011/0106660 A1 | 5/2011 | Ajjarapu et al. |
| 2011/0202418 A1 | 8/2011 | Kempton et al. |
| 2012/0078743 A1 | 3/2012 | Betancourt |
| 2012/0101629 A1 | 4/2012 | Olsen et al. |
| 2012/0303259 A1 | 11/2012 | Prosser |
| 2012/0323645 A1 | 12/2012 | Spiegel et al. |
| 2013/0024041 A1 | 1/2013 | Golden et al. |
| 2013/0147820 A1 | 6/2013 | Kalai et al. |
| 2013/0179205 A1 | 7/2013 | Slinin |
| 2013/0191237 A1 | 7/2013 | Tenorio |
| 2013/0211863 A1 | 8/2013 | White |
| 2013/0265174 A1 | 10/2013 | Scofield et al. |
| 2013/0275156 A1 | 10/2013 | Kinkaid et al. |
| 2013/0304522 A1 | 11/2013 | Cundle |

(56) References Cited

U.S. PATENT DOCUMENTS

| | | |
|---|---|---|
| 2013/0311264 A1 | 11/2013 | Solomon et al. |
| 2014/0098009 A1 | 4/2014 | Prest et al. |
| 2014/0229258 A1 | 4/2014 | Seriani |
| 2014/0122190 A1 | 5/2014 | Wolfson et al. |
| 2014/0129302 A1 | 5/2014 | Amin et al. |
| 2014/0149157 A1 | 5/2014 | Shaam et al. |
| 2014/0162598 A1 | 6/2014 | Villa-Real |
| 2014/0220516 A1 | 8/2014 | Marshall et al. |
| 2014/0236641 A1 | 8/2014 | Dawkins |
| 2014/0244413 A1 | 8/2014 | Senior |
| 2014/0310019 A1 | 10/2014 | Blander et al. |
| 2014/0324633 A1 | 10/2014 | Pollak et al. |
| 2014/0349672 A1 | 11/2014 | Kern et al. |
| 2015/0006428 A1 | 1/2015 | Miller et al. |
| 2015/0016777 A1 | 1/2015 | Abovitz et al. |
| 2015/0161564 A1 | 6/2015 | Sweeney et al. |
| 2015/0178642 A1 | 6/2015 | Abboud |
| 2015/0198459 A1 | 7/2015 | MacNeille et al. |
| 2015/0206443 A1 | 7/2015 | Aylesworth et al. |
| 2015/0220916 A1 | 8/2015 | Prakash et al. |
| 2015/0241236 A1 | 8/2015 | Slusar et al. |
| 2015/0248689 A1 | 9/2015 | Paul et al. |
| 2015/0260474 A1 | 9/2015 | Rublowsky et al. |
| 2015/0269865 A1 | 9/2015 | Volach et al. |
| 2015/0324831 A1 | 11/2015 | Barua et al. |
| 2015/0371186 A1 | 12/2015 | Podgurny et al. |
| 2016/0117657 A1 | 4/2016 | Forbes, Jr. et al. |
| 2016/0117756 A1 | 4/2016 | Carr et al. |
| 2016/0162989 A1 | 6/2016 | Cole et al. |
| 2016/0171891 A1 | 6/2016 | Banatwala et al. |
| 2016/0203422 A1 | 7/2016 | Demarchi et al. |
| 2016/0224935 A1 | 8/2016 | Burnett |
| 2016/0225115 A1 | 8/2016 | Levy et al. |
| 2016/0307276 A1 | 9/2016 | Young |
| 2016/0297316 A1 | 10/2016 | Penilla et al. |
| 2016/0300296 A1 | 10/2016 | Alonso Cembrano |
| 2016/0307288 A1 | 10/2016 | Yehuda et al. |
| 2016/0307373 A1 | 10/2016 | Dean et al. |
| 2016/0321609 A1 | 11/2016 | Dube et al. |
| 2016/0349835 A1 | 12/2016 | Shapira |
| 2017/0019496 A1 | 1/2017 | Orbach |
| 2017/0046658 A1* | 2/2017 | Jones .......... G06Q 10/0835 |
| 2017/0061509 A1 | 3/2017 | Rosenberg et al. |
| 2017/0089710 A1 | 3/2017 | Slusar |
| 2017/0122746 A1 | 5/2017 | Howard et al. |
| 2017/0243286 A1 | 8/2017 | Castinado et al. |
| 2017/0243310 A1* | 8/2017 | Dawkins .......... G06Q 10/02 |
| 2017/0249626 A1 | 8/2017 | Marlatt |
| 2017/0276500 A1 | 9/2017 | Margalit et al. |
| 2017/0293881 A1 | 10/2017 | Narkulla |
| 2018/0013211 A1 | 1/2018 | Ricci |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0053237 A1 | 2/2018 | Hayes et al. |
| 2018/0075695 A1 | 3/2018 | Simpson |
| 2018/0095471 A1 | 4/2018 | Allan et al. |
| 2018/0102053 A1 | 4/2018 | Hillman et al. |
| 2018/0111494 A1 | 4/2018 | Penilla et al. |
| 2018/0143029 A1 | 5/2018 | Nikulin et al. |
| 2018/0278984 A1 | 9/2018 | Aimone et al. |
| 2018/0293638 A1 | 10/2018 | Simpson |
| 2018/0342106 A1 | 11/2018 | Rosado |
| 2018/0348863 A1 | 12/2018 | Aimone et al. |
| 2018/0357899 A1 | 12/2018 | Krivacic et al. |
| 2018/0365598 A1 | 12/2018 | Jamail |
| 2018/0365904 A1 | 12/2018 | Holmes |
| 2018/0374268 A1 | 12/2018 | Niles |
| 2019/0047427 A1 | 2/2019 | Pogorelik |
| 2019/0050634 A1 | 2/2019 | Nerayoff et al. |
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |
| 2019/0143828 A1 | 5/2019 | Sawada et al. |
| 2019/0146974 A1 | 5/2019 | Chung |
| 2019/0158603 A1 | 5/2019 | Nelson et al. |
| 2019/0160958 A1 | 5/2019 | Chaudhary et al. |
| 2019/0178654 A1 | 6/2019 | Hare |
| 2019/0188450 A1 | 6/2019 | Spivack et al. |
| 2019/0205798 A1 | 7/2019 | Rosas-Maxemin et al. |
| 2019/0228269 A1 | 7/2019 | Brent et al. |
| 2019/0236741 A1 | 8/2019 | Bowman et al. |
| 2019/0236742 A1 | 8/2019 | Tomskii et al. |
| 2019/0271553 A1 | 9/2019 | Simpson |
| 2019/0318286 A1 | 10/2019 | Simpson |
| 2019/0333166 A1 | 10/2019 | Simpson |
| 2019/0333181 A1 | 10/2019 | Simpson |
| 2020/0098071 A1 | 3/2020 | Jackson |
| 2020/0125999 A1 | 4/2020 | Simpson |
| 2020/0151816 A1 | 5/2020 | Simpson |
| 2020/0156495 A1 | 5/2020 | Lindup |
| 2020/0160461 A1 | 5/2020 | Kaniki |
| 2020/0173808 A1 | 6/2020 | Beaurepaire et al. |
| 2020/0317074 A1 | 10/2020 | Miller et al. |
| 2020/0317075 A1 | 10/2020 | Yokoyama et al. |
| 2022/0100731 A1 | 3/2022 | Tirapu Azpiroz et al. |
| 2022/0122026 A1 | 4/2022 | Okabe et al. |

FOREIGN PATENT DOCUMENTS

| | | |
|---|---|---|
| JP | 2003177034 A | 12/2001 |
| WO | 2001041084 A2 | 6/2001 |
| WO | 2015059691 A1 | 4/2015 |
| WO | 2015161307 A1 | 4/2015 |
| WO | 2018024844 A1 | 2/2018 |
| WO | 2019183468 A1 | 9/2019 |

OTHER PUBLICATIONS

PCT International Search Report and Written Opinion; PCT/US2020/023223; dated Jun. 19, 2020.

PCT International Search Report and Written Opinion; PCT/US2020/023729; dated Jun. 18, 2020.

PCT International Search Report and Written Opinion; PCT/US2020/021546; dated Jun. 8, 2020.

PCT International Search Report and Written Opinion; PCT/US2020/018012; dated Apr. 21, 2020.

PCT International Search Report and Written Opinion; PCT/US2020/012208; dated Mar. 24, 2020.

Westerman; Longitudinal Analysis of Biomarker Data from a Personalized Nutrition Platform in Healthy Subjects; Nature, Scientific Reports; vol. 8; Oct. 2, 2018 (retrieved Jun. 1, 20200). https://www.nature.com/articles/s41598-018-33008-7.

Ahmed, et al.; Energy Trading with Electric Vehicles in Smart Campus Parking Lots; Applied Sciences; Sep. 7, 2018.

Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?

Peters, et al.; Student Support Services for Online Learning Re-Imagined and Re-Invigorated: Then, Now and What's To Come; Contact North | Contact Nord; Sep. 2017.

Soccer bail-shaped drone might be the safest flying robot yet https://mashable.com/2015/12/21/soccer-ball-drone/; Dec. 21, 2015.

Fleishman; Use Parking Apps to Find Lots, Garages, Valet, and Meters; Macworld; Jul. 19, 2015.

Borras, et al. Intelligent Tourism Reminder Systems: A Survey; Expert Systems with Applications 41; Elsevier; Jun. 9, 2014.

Pentland; After Decades of Doubt, Deregulation Delivers Lower Electricity Rates; Forbes; Oct. 13, 2013 (retrieved Feb. 29, 2020). https://www.forbes.com/sites/williampentland/2013/10/13/after-decades-of-doubt-deregulation-delivers-lower-electricity-prices/#201d4a9c1d13.

Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.

U.S. Appl. No. 60/035,205, filed Jan. 10, 1997.

(56) References Cited

OTHER PUBLICATIONS

The Wayback Machine, Interest Rate Swaps, https://web.archive.org/web/20171006212154/https://global.pimco.com/en/gbl/resources/education/understanding-interest-rate-swaps, 2016, pp. 1-7.

Freight Derivatives—a Vital Tool For YOur Business, https://www.reedsmith.com/-/media/files/perspectives/2007/02/freight-derivatives-a-vital-tool-for-your-business/files/freight-derivatives-a vital-tool-for-your-business/fileattachment/etcfreightderivativesavitaltoolforyourbusiness.pdf (Year: 2007), Energy, Trade & Commodities, pp. 1-3.

Barry, Kieth, App lets drivers auction public parking spaces, Wired, Aug. 11, 2011, pp. 1-4.

Jiang, Landu, et al., Sun Chase: Energy-Efficient Route Planning for solar-powered Evs, IEEE 37th international conference on distrubuted computing systems, 2017, pp. 1-11.

Netlingo, https://web.archive.org/web/20170122184857/https://www.netlingo.com/word/electronic-exchange.php, dated Oct. 22, 2017.

Laseter, Tim, et al., "B2B benchmark: The State of Electronic Exchanges", ech & Innovation, dated Oct. 1, 2001.

Directed Graph, https://en.wikipedia.org/wiki/Directed_graph, pp. 1-6, 2022.

About IBM Food Trust, https://www.IBM.com/downloads/cas/E9DBNDJG, pp. 1-17, 2019.

IBM Blockchain Transparent Supply, https://www.IBM.com/downloads/cas/BKQDK0M2, pp. 1-14, Aug. 2020.

Radocchia, Samantha, 3 Innovative Ways Blockchain Will Build Trust In The Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.

Change the World, https://fortune.com/change-the-world/2019/IBM/, Fortune Media IP Limited, pp. 1-5, 2022.

IBM Food Trust, https://www.constellationr.com/node/1760i/vote/appiication/view/588, Constellation Research Inc,, pp. 1-4, 2010-2022.

Dey, Somdip, et al.,, FoodSQRBlock: Digitizing Food Production and the Supply Chain with Blockchain and QR Code in the Cloud, https://www.mdpi.eom/2071-1050/13/6/3486/htm, MDPI, pp. 1-27, Mar. 22, 2021.

Ramasubramanian, Vasant, "Quadrasense: Immersive UAV-based cross-reality environmental sensor networks," phD diss., Massachusetts Institute of Technology, pp. 1-75, 2015.

Wyzant, https://web.archive.org/web/20190327185429/https://www.wyzant.com/hotitworks/students,Wyzant tutoring, pp. 1-13, Mar. 27, 2019.

PCT International Search Report and Written Opinion; PCT/US2021/065855; dated Mar. 29, 2022.

PCT International Search Report and Written Opinion; PCT/US2022/012717; dated Mar. 30, 2022.

Zhao, et al., Incentives in Ridesharing with Deficit Control, Proceedings of the 13th International Conference on Autonomous Agents and Multiagent Systems (AAMAS 2014), May 5-9, 2014, pp. 1021-1028.

* cited by examiner

3500

3510 — TCU FORWARD

> S(T) – TCU(t)
>
> TCU(t) is the forward price when the contract was initiated
>
> S(t) denotes the spot price at time = t, S(T) is spot price at delivery
>
> TCU May be standardized or custom

3520 — TCU FUTURES

> 1) TCU Futures force participants to realize gains and losses daily
>
> 3) TCU Futures may be standardized
>
> 2) TCU Futures may be settled through a clearing house
>
> 4) TCU Futures may be regulated, forwards are not regulated

3530 — TCU SWAP $$V = \sum_{t-1}^{n} \frac{\bar{c} - \tilde{c}}{(1 + {}_0R_t)^t}$$

C = European Call Option with interest rate r and the TCU futures or forward or swap price of F(t) of maturity T on a TCU with strike price K and delivery date T' (with T' greater than or equal to T)

$$p = e^{-rT}[KN(-d_2) - FN(-d_1)]$$

P = the corresponding put option price

3720 and N() is the cumulative normal distribution function $$d_1 = \frac{\ln\left(\frac{F}{K}\right) + \left(\frac{\sigma^2}{2}\right)T}{\sigma\sqrt{T}}$$

3730

$$d_2 = \frac{\ln\left(\frac{F}{K}\right) - \left(\frac{\sigma^2}{2}\right)T}{\sigma\sqrt{T}} = d_1 - \sigma\sqrt{T},$$

If we consider an option on a forward contract expiring at time T' > T, the payoff doesn't occur until T'. Thus the discount factor $e^{-rT}$ is replaced by $e^{-rT'}$

SeatsX LLC
12335 Kingsride #418
Houston, TX 77034

Merrill Lynch Capital Services, Inc.
[Address]
Attention:

Fax No.: [
Telephone No.: ]

Re: TRANSPORTATION CAPACITY TRANSACTION - SEATSX Contract No. [

Dear Ladies and Gentlemen:

The purpose of this document is to confirm the terms and conditions of the transaction entered into between Merrill Lynch Capital Services, Inc. ("Counterparty") and SeatsX LLC ("SeatsX") on [                    ] (the "Transaction"). This document constitutes a "Confirmation" as referred to in the ISDA Master Agreement specified below.

The definitions and provisions contained in the 2002 ISDA Definitions and the 2002 ISDA Commodity Derivatives Definitions (the "Definitions"), as published by the International Swaps and Derivatives Association, Inc. ("ISDA"), are incorporated into this Confirmation. In the event of any inconsistency between the Definitions and this Confirmation, this Confirmation will prevail. In the event of any inconsistency between the 2002 ISDA Definitions and the 2002 ISDA Commodity Derivatives Definitions, the 1993 ISDA Commodity Derivatives Definitions will prevail.

1. This Confirmation will supplement, form part of, and be subject to, the 2002 ISDA Master Agreement dated as of December 2, 2002, as amended and supplemented from time to time (the "Agreement"), entered into between you and us. All provisions contained in the Agreement shall govern this Confirmation except as expressly modified below.

2. Terms of Transaction. The terms of the particular Transaction to which this Confirmation relates are as follows:

Transaction Type: Transportation Capacity Unit ("TCU") Swap

Notional Quantity: 100 Units of the Product during each Period during the Term

Product: A Transportation Unit during a particular Time in a particular Market in the particular Period during the Term Unit: One Transportation Capacity Unit attributed to the Product Trade Date:

Seller: [SeatsX][Counterparty]

Buyer: [SeatsX][Counterparty]

| | |
|---|---|
| Contractual Currency: | United States Dollars |
| Route: | Katy, Texas to Downtown Houston (along Smith Street) |
| Demographic Group: | Open |
| Market: | Houston |
| Term: | From the Effective Date through and including the Termination Date |
| Period: | Each calendar month during the Term |
| Effective Date: | |
| Termination Date: | {6 months after the Effective Date} |
| Settlement Dates: | {Within [5] Business Days after the Floating Price for the Product is published by the Price Source} |
| Seller's telephone, telex or Facsimile number for purposes of Giving notice: | Telephone No.: [ ]<br>FaxNo : [ ] |
| Fixed Amount Details: | |
|   Fixed Price Payer: | {SEATSX} {Counterparty} |
|   Fixed Price: | _____ |
|   Fixed Amount: | Fixed Price x Number of Unit |
| Floating Amount Details: | |
|   Floating Price Payer: | {SEATSX} {Counterparty} |
| Product Reference Price: | |
|   Price Source: | The first monthly report of quarterly TCU data published by SeatsX TCU Index® for the applicable route and calendar month during the Term |
|   Floating Price: | The SeatsX TCU Index reported by the Price Source as the average TCU for the quarter which includes the calendar month applicable to the Product |
|   Settlement Terms: | |
|     Settlement: | On each Settlement Date, the Fixed Price Payer shall pay the Fixed Amount, and the Floating Price Payer shall pay the Floating Amount. |
| Interest Rate: | Means, for any day, the rate of interest from time to time published in the Wall Street Journal as the prime commercial lending rate, as such rate may change when and as such prime commercial lending rate (or such comparable rate, if the Wall Street Journal does not so designate a |

FIG. 42

|  |  |
|---|---|
| Other Terms: | "prime commercial lending rate") changes. |
|  | Not applicable |
| 3. Calculation Agent: | [SEATSX][Counterparty] |
| 4. Payments to SEATSX: | |
| Pay | : Bank of America, N.A. |
| For the Account of | : SeatsX LLC |
| Account Number/ CHIPS UID | : XXXXXXXXXXX |
| Fed ABA No. | : XXXXXXXXX |
| Payments to Counterparty: | |
| Pay | As notified by Counterparty to |
| For the Account of | SEATSX As notified by |
| Account Number/ CHIPS UID | Counterparty to SEATSX As notified by Counterparty to SEATSX |
| Fed ABA No. | |
| Attn: | As notified by Counterparty to SEATSX As notified by Counterparty to SEATSX |

Please promptly confirm that the foregoing correctly sets forth the terms of the Transaction entered into between us by executing the copy of this Confirmation and returning it to us within two (2) Business Days after the date first above written via facsimile to (813) 916.2001, Attention: Director, Documentation Department.

SeatsX LLC. is pleased to have entered into this Transaction with you. Yours sincerely, Confirmed as of the Trade Date:

SEATSX LLC.

MERRILL LYNCH CAPITAL SERVICES, INC.

By:_____  
Name:_____  
Title: _____

By:_____  
Name:_____  
Title: _____

Master Transportation Capacity

Unit Services Agreement Dated as of

[ ]

By and Between

[INSERT CORPORATE NAME] ("Party A")    and [INSERT CORPORATE NAME] ("Party B")

Type of Legal Entity: _____          Type of Legal Entity: _____
Place of Organization/Registration: _____      Place of Organization/Registration: _____

Party A and Party B have entered and/or anticipate entering into one or more Transactions that are or will be governed by this Master Agreement, which includes the schedule (the "Schedule") (together, the "Master Agreement"). Terms used herein and not defined herein shall have the meanings set forth in Article 1.

ARTICLE 1. DEFINITIONS

As used in this Agreement, the following terms have the respective meanings set forth below:

"*Affiliate*" means, with respect to any Person, any other Person that directly or indirectly, through one or more intermediaries, controls or is controlled by, or is under common control with, such Person. For these purposes, "control" of any Person shall mean the ownership of, or the power to direct the voting of, more than ten percent (10%) of the common stock or issued share capital or other equity interests having ordinary voting power for the election of directors (or Persons performing comparable functions) of such Person.

"*Agreement*" has the meaning set forth in Section 2.2.

"*Assigning Party*" has the meaning set forth in Section 10.4.

"*Bankrupt*" means any entity, if such entity (i) files a petition or otherwise commences, authorizes or acquiesces in the commencement of a proceeding or cause of action under any bankruptcy, insolvency, reorganization, debt restructuring, liquidation or similar law, or has any such petition filed or commenced against it, (ii) makes an assignment or any general arrangement for the benefit of creditors, (iii) otherwise becomes bankrupt or insolvent (however evidenced), (iv) has a liquidator, administrator, receiver, trustee, conservator or similar official appointed with respect to it or any substantial portion of its property or assets, or (v) is generally unable to pay its debts as they fall due.

"*Business Day*" means (i) with respect to payments, a day, other than a Saturday or Sunday, on which the banks designated under the "Payments" section on the Schedule are open for business, and (ii) with respect to notices or other communications, any day, other than a Saturday or Sunday, on which banks in the city designated by the recipient party under the "Notices and Correspondence" section on the Schedule are open for business.

"*Buyer*" means the Party to a Transaction that is obligated to purchase a Product.

"*Claiming Party*" has the meaning set forth in Article 3.

"*Claims*" means all third-party claims, demands or actions in connection with this Agreement, threatened or filed, that directly or indirectly relate to the subject matter of an indemnity or remedy hereunder, and the resulting losses, liabilities, obligations, damages, expenses, attorneys' fees and court

4510 costs, whether incurred by or in connection with a settlement or otherwise, and whether such claims, demands or actions are threatened or filed prior to or after the termination of this Agreement.

*"Confirmation"* has the meaning set forth in Section 2.3.

*"Content"* means advertising media which (i)    is in a form suitable for delivery to media outlets where such type of advertising media is Published, (ii)    complies with the Creative Code of the American Association of Advertising Agencies and all other applicable laws, rules and regulations, (iii)    does not infringe upon the copyrights, trademarks and rights of privacy and publicity of others and is not libelous, slanderous or defamatory, and (iv)    is delivered by Buyer to Seller for Publication by or on behalf of Seller in connection with a Transaction.

*"Contract Price"* means the price per Period to be paid by Buyer to Seller in connection with a Transaction.

*"Contract Value"* means, with respect to a Terminated Transaction, as applicable, the net present value (discounted at the Present Value Discount Rate to the first day of the term applicable to such Terminated Transaction) of the Contract Price applicable to such Terminated Transaction.

*"Contractual Currency"* means the currency designated on the Schedule in which any and all payments shall be made under this Agreement, unless otherwise specified in connection with any Transaction.

*"Costs"* means, with respect to the Non-Defaulting Party, agency fees, brokerage fees, attorneys' fees and expenses, commissions and other similar third party transaction costs and expenses reasonably incurred by such Party (i) in terminating any arrangement or entering into new arrangements which replace a Terminated Transaction, or (ii) in connection with the enforcement and protection of such Party's rights and remedies under this Agreement.

*"Credit"* has the meaning set forth in the applicable Executed Confirmation.

*"Credit Support Annex"* means the credit support annex attached hereto as Exhibit A.

*"Cross Default Amount"* means the cross default amount, if any, set forth on the Schedule for a Party.

*"Defaulting Party"* means a Party that is responsible for an Event of Default.

*"Default Rate"* means, for any day, the annual prime commercial lending rate (or comparable rate), from time to time published in the "Default Rate Source" designated on the Schedule, as such rate may change, plus two (2) percent per annum; provided that the Default Rate shall never exceed the maximum interest rate permitted by applicable law.

*"Early Termination Date"* means the day designated by the Non-Defaulting Party pursuant to Section 5.2 as the early termination date, which day shall be no earlier than the latest day on which Seller has scheduled Content for Publication in connection with this Agreement and the twentieth (20th) day after the Non-Defaulting Party effectively notifies the Defaulting Party of such day.

*"Effective Date"* means the date set forth on the first page of this Master Agreement.

*"Event of Default"* means the occurrence of any of the events listed in Section 5.1.

*"Executed Confirmation"* means a Confirmation that is executed or deemed accepted by the Parties in accordance with Section 2.3, including any and all annexes thereto.

*"Force Majeure"* means an event or circumstance, including any preemption of the Publication of Content by a media outlet, which prevents a Party from performing its obligations under one or more Transactions, which is not within the reasonable control of, or the result of the negligence or willful misconduct of, the Claiming Party, and which, by the exercise of due diligence, the Claiming Party is unable to overcome or avoid or cause to be avoided. Force Majeure shall not include or be based on (i) the loss of Buyer's markets; (ii) Buyer's inability to economically use or resell the Product purchased hereunder; (iii) the loss or failure of Seller's supply (except as set forth above); or (iv) Seller's ability to sell the Product at a price greater than the Contract Price.

*"GAAP"* means generally accepted accounting principles in the jurisdiction specified on the Schedule.

*"Guarantor"* means, in respect of a Party, the guarantor, if any, specified for such Party on the Schedule.

*"Master Agreement"* has the meaning set forth in the Preamble.

*"Non-Defaulting Party"* means the Party that is not a Defaulting Party.

*"Option"* means the right but not the obligation to enter into a Transaction.

*"Option Buyer"* means the Party specified as the purchaser of an Option.

*"Option Seller"* means the Party specified as the seller of an Option.

*"Party"* or *"Parties"* means Party A and Party B, individually or collectively, as applicable and their respective permitted successors or assigns.

*"Party A"* has the meaning set forth on the first page of this Master Agreement.

*"Party B"* has the meaning set forth on the first page of this Master Agreement.

*"Payment Date"* means, with respect to a Transaction, the $30^{th}$ day of any calendar month or if there is no such day or such day is not a Business Day, the last Business Day of such calendar month.

*"Performance Assurance"* has the meaning set forth in the Credit Support Annex.

*"Period"* means the consecutive individual periods of time (e.g., weekly, monthly) comprising the Term; provided, however, that if the Parties fail to specify a Period, the Period shall be deemed to be a calendar month; provided, further, however, that if the applicable Term is less than a calendar month and the Parties fail to specify a Period, there shall be deemed to be one Period having the same duration as the Term.

*"Person"* means an individual, partnership, corporation, limited liability company, association, organization, business trust, joint stock company, trust, unincorporated association, joint venture, firm or other entity, or a government or any political subdivision or agency, department or instrumentality thereof.

*"Premium"* means the premium to be paid or collected, if any, related to the purchase or sale of an Option that is specified by the Parties.

*"Present Value Discount Rate"* means at a particular date, (i) if the term of the Terminated Transaction, as applicable, is one year or less, the "Ask Yield" interest rate for the appropriate U.S. Government Treasury bill or note with a term closest to the time remaining in such term, plus 100 basis points, or (ii) if the time remaining in the term of the Terminated Transaction is greater than one year, the "Ask Yield" interest rate for the appropriate U.S. Government Treasury note with a term closest to the time remaining in such term, plus 100 basis points, in each case, as quoted in the "Treasury Bonds, Notes & Bills" section of the Default Rate Source most recently published as of such date.

EXHIBIT A
CREDIT SUPPORT ANNEX

The provisions of this Credit Support Annex shall apply to the extent the Parties have elected on the Schedule to make them applicable. Upon the occurrence of any Event of Default under this Credit Support Annex, such event shall constitute an Event of Default pursuant to Article 5 of the Master Agreement.

1. Definitions. The following terms, when used in this Credit Support Annex, shall have the meanings set forth in this Section 1. Capitalized terms used in this Credit Support Annex and not defined in this Section 1 or elsewhere in this Credit Support Annex shall have the meanings ascribed to them in the Master Agreement.

*"Applicable Interest Rate"* means the "Applicable Interest Rate" set forth on the Schedule.

*"Credit Rating"* means, with respect to any entity, the rating then assigned to such entity's unsecured, senior long-term debt obligations (not supported by third party credit enhancements) or if such entity does not have a rating for its senior unsecured long-term debt, then the rating then assigned to such entity as an issuer long-term rating by S&P, Moody's or any other rating agency agreed by the Parties.

*"Independent Amount"* means with respect to a Party, the amount specified as such for that Party in each Executed Confirmation, or if no amount is specified, zero. If the Party A Collateral Threshold or the Party B Collateral Threshold is an amount other than zero, then the "Independent Amount" shall be inapplicable.

*"Letter(s) of Credit"* means one or more irrevocable, transferable standby letters of credit issued by a U.S. commercial bank or a foreign bank with a U.S. branch having a credit rating of at least A- by S&P and A3 by Moody's, in a form acceptable to the Party in whose favor the letter of credit is issued. Costs of a Letter of Credit shall be borne by the applicant for such Letter of Credit.

*"Material Adverse Change"* has the meaning set forth on the Schedule.

*"Moody's"* means Moody's Investor Services, Inc. or its successor.

*"Party A Collateral Threshold"* means the collateral threshold, if any, set forth on the Schedule for Party A.

*"Party A Minimum Guaranty Amount"* means the amount, if any, set forth on the Schedule for Party A.

*"Party A Rounding Amount"* means the amount, if any, set forth on the Schedule for Party A.

*"Party B Collateral Threshold"* means the collateral threshold, if any, set forth on the Schedule for Party B.

*"Party B Minimum Guaranty Amount"* means the amount, if any, set forth on the Schedule for Party B.

*"Party B Rounding Amount"* means the collateral threshold, if any, set forth on the Schedule for Party B.

*"Performance Assurance"* means collateral (other than the Independent Amount, if any) in the form of either cash, Letter(s) of Credit, or other security acceptable to the requesting Party.

*"S&P"* means the Standard & Poor's Rating Group (a division of McGraw-Hill, Inc.) or its successor.

2. Party A Credit Protection.

FIG. 47

FINANCIAL SWAP INDEX METHOD AND SYSTEM ON TRANSPORTATION CAPACITY UNITS AND TRADING DERIVATIVE PRODUCTS BASED THEREON

BACKGROUND OF THE INVENTION

Technical Field

The disclosed embodiments relate generally to derivative investment markets. More specifically, the present disclosure relates to electronically creating and disseminating one or more transportation capacity unit indices calculated by using a portfolio of transportation capacity unit derivatives and other underlying assets and facilitating the electronic creation and trading of derivative products based on the index.

Background of Field of the Invention

While derivative markets have been developed for bonds, interest rate swaps, swaptions, wheat, gold, cattle, natural gas, oil, stocks and other securities, no such markets exists for transportation capacity units (actual standardized movement of people or freight between two fixed points as a commodity like oil). This situation is unfortunate because transportation is one of the largest sectors of the economy and tremendous inefficiencies exist because there has been no innovation of a market or financial derivative products in the transportation sector. Transportation Network Companies have provided electronic means of hailing a taxi-cab, but they have no relation to making a transportation seat unit or transportation freight unit a tradable commodity or derivative security. These tremendous market deficiencies have resulted in Transportation Network Companies actually adding congestion and traffic in cities and the rate of single occupancy vehicle ridership has actually increased since the advent of Transportation Network Companies because of all the dead head rides to pick up passengers or freight.

To avoid the problems associated with transportation network companies adding congestion, pollution, excess wear and tear on roads, increased needs for widened roadways which result in flooding and other environmental concerns, transportation markets may use financial and physical derivative transportation capacity unit transformations that convert commute or freight routes into standardized financial derivative transportation capacity unit markets and financial derivative indices to provide a method, system and transformed structure for allocating capital, investment, risk management, price protection, efficiency, financial instruments, securitization, security, fixed for floating price swaps and other derivative market benefits.

A derivative is a financial instrument valued, at least in part, on the value and/or characteristic(s) of another security, known as an underlying asset. Examples of underlying assets include, but are not limited to financial instruments (e.g. bonds, interest rate swaps, and interest rate swaptions), commodities, securities, electronically traded funds, and indices. Four exemplary well-known derivatives are options, forwards, futures and swaps.

Derivatives, such as options, swaps, forwards and futures contracts, may be traded over-the-counter and/or on other trading platforms, such as organized exchanges. In over-the-counter transactions (e.g. forwards) the individual parties to a transaction are able to customize each transaction to meet each party's individual needs. With trading platform or exchange traded derivatives, buy and sell orders for standardized derivative contracts are submitted to an exchange where they are matched and executed. Exchange technologies may handle swaps, forwards, options and futures. Generally, modern trading exchanges have exchange specific computer systems that allow for the electronic submission of orders via electronic communication networks, such as the Internet.

Once matched and executed, the executed trade is transmitted to a clearing corporation that stands between the holders and writers of derivative contracts. When exchange traded derivatives are exercised, the cash or underlying assets are delivered, when necessary, to the clearing corporation and the clearing corporation disperses the assets as appropriate and defined by the consequence(s) of the trades.

An option contract gives the contract holder a right, but not an obligation, to buy or sell an underlying asset at a specific price on or before a certain date, depending on the option style (e.g., American or European). Conversely, an option contract obligates the seller of the contract to deliver an underlying asset at a specific price on or before a certain date, depending on the option style (e.g., American or European). An American style option may be exercised at any time prior to its expiration. A European style option may be exercised only at its expiration, i.e., at a single pre-defined point in time.

There are generally two types of options: calls and puts. A call option conveys to the holder a right to purchase an underlying asset at a specific price (i.e., the strike price), and obligates the writer to deliver the underlying asset to the holder at the strike price. A put option conveys to the holder a right to sell an underlying asset at a specific price (i.e., the strike price), and obligates the writer to purchase the underlying asset at the strike price.

There are generally two types of settlement processes: physical settlement and cash settlement. During physical settlement, funds are transferred from one party to another in exchange for the delivery of the underlying asset. During cash settlement, funds are delivered from one party to another according to a calculation that incorporates data concerning the underlying asset.

A forward or swap contract gives a buyer of the future an obligation to receive delivery of an underlying commodity or asset on a fixed date in the future. A simple swap is also an agreement whereby a floating price is exchanged for a fixed price over a specified period of time for a specified quality specification. Accordingly, a seller of the forward contract has the obligation to deliver the commodity or asset on the specified date for a given price. Forwards or swaps may be settled using physical or cash settlement. Both forwards, swaps, options and futures contracts may be based on abstract market indicators, such as indices.

A futures contract gives a buyer of the future an obligation to receive delivery of an underlying commodity or asset on a fixed date in the future. Accordingly, a seller of the future contract has the obligation to deliver the commodity or asset on the specified date for a given price. Futures may be settled using physical or cash settlement. Both options and futures contracts may be based on abstract market indicators, such as indices.

An index is a statistical composite that is used to indicate the performance of a market or a market sector over various time periods and may thus act as a performance benchmark. Examples of indices include the Dow Jones Industrial Average, the National Association of Securities Dealers Automated Quotations ("NASDAQ") Composite Index, and the Standard & Poor's 500 ("S&P 500"). As noted above, options on indices are generally cash settled. For example, using cash settlement, a holder of an index call option receives the right to purchase not the index itself, but rather a cash amount equal to the value of the index multiplied by a multiplier, e.g., $100. Thus, if a holder of an index call option exercises the option, the writer of the option must pay the holder, provided the option is in-the-money, the difference between the current value of the underlying index and the strike price multiplied by a multiplier.

Transportation industry participants such as bus companies, airlines, trains, ships, van pools, carpools, subways, freight and other transportation companies have traditionally used such things as gasoline futures to manage their cost risk of fuel, but there has never existed an index or financial or physical derivative market to manage the transportation capacity either in physical capacity specification or in financial exposure due to price fluctuations vis-à-vis a physical transportation capacity unit index as exists in crude oil, gasoline or natural gas. The mismatch between the financial and derivative products on the cost side of transportation industry participants and the revenue side of industry participants lead to large financial problems that are avoidable.

Accordingly, there is a need for financial swap indices on transportation capacity units and trading of derivative products based thereon.

Description of the Related Art

The following descriptions and examples are not admitted to be prior art by virtue of their inclusion within this section.

The current implementations of methods to use financial swap payment structures and index calculations over a transportation unit capacity auction market on networks and computer systems to ride-share, bus, subway, train, vanpool, carpool or move freight are non-existent because there is no financial market that exists other than the novel invention in this disclosure. Further, most implementations of methods do not allow price discovery between various sellers and buyers of transportation because the systems are disparate and are not open access or transparent. Transportation Network Company prior art does not contemplate the resale of a transportation unit for the purposes of trading and price discovery and risk management. The majority of mobile method and system transportation services are utilizing mobile technology and GPS as well as system algorithms to manage transportation as a service which is fundamentally different than viewing transportation as a commodity and as a commodity market which the proposed system and method accomplish with the benefits of financial swap payment structures and index disclosed in the method and system. While financial loans exist for buying automobiles, no method exists for financial swap payment structures or loans against transportation capacity units such as transportation seat units or transportation trunk space units or any transportation capacity unit. Competing methods price transportation as a service with the consumer buying multiple units with no transparent marketplace governing price competition for a single freight or transportation unit along a hub to hub route. Additional competing implementations of methods do not allow for forward selling or forward purchasing of transportation seats, freight or capacity beyond a single transaction which a commodity forward market financial swap payment structure and index allows through the systems and methods. An open and transparent market for financial swap payment structures allows for large increases in financial incentives to ride share, carpool, freight share, or any combination of transportation unit price discovery and by economic theory results in the lowest possible price for consumers. City planners from New York to Austin to San Francisco to Paris to Mumbai to Tokyo to Beijing to Sao Paulo or Johannesburg all struggle to see how the future options of transportation will shape city planning. City planners have large concerns that when markets move to autonomous cars that cities will still have massive congestion problems if people continue to ride as a single passenger in one car. Currently, no related art method or system provides a financial swap investment payment structure that would allow investors to invest in decreased congestion in a city, decreased pollution and less wear on the roads which would align state pension goals with city planning goals. Some alternative methods simply provide loans for transportation vehicles which are a form of financial swap payment structures, but these structures have been proven to add traffic, add single occupancy vehicles ("SOVs"), congestion and wear and tear on roads which actually raise the cost of operating a city or state government. Many transportation experts reason that a future full of autonomous vehicles will actually increase congestion just like Transportation Network Companies ("TNC"s). TNCs were sold to the world as a method to reduce traffic however all major cities have completed studies that have actually shown that TNCs have all increased traffic by as much as 50%. Once one realizes that the TNCs were all heavily financed by Middle East oil interests, it is very clear that TNCs actually are known and designed to increase the use of gasoline from extra dead head trips and chauffeured travel. The aforementioned alternative methods do not allow a free market financial swap payment structure or index mechanism based on open prices to allow any driver of transportation services to move or monetize unused transportation units efficiently. Because no such example exists, there is a strong counter-example that the new unique novel invention functions as a unique, novel and independent method from any other prior art. Additionally it is common knowledge to anyone with ordinary skill in transportation markets that no financial swap payment structure or loan exists to sell transportation capacity units on a forward basis for passenger transportation or freight and that no such financial swap market exists with the collateral as the vehicle to ensure financial performance and accountability. Effectively, the novel invention of this disclosure allows for an innovation in financial products and market technology that allows partial sales of cars or fractional vehicle ownership in a unique method from other fractional car ownership methods as it is accomplished synthetically and virtually through the financial swap payment structure. Accordingly, the proposed novel invention allows for significant new product offerings, significant incentives, and much higher utilization rates by redefining the market into unitized commodity units in transportation and freight capacity markets and providing the financial swap payment structures and technology methods and systems to accomplish the goal of higher efficiency and lower consumer pricing for transportation and freight units.

Implementations of methods have been made in systems that provide transportation on demand through technology methods and systems but none frame the problem as a forward commodity market or a unitized capacity market with simple elegant financial swap payment, derivative trading on the transportation capacity unit or index systems and methods which allow the natural forces of supply and demand to set the price through a universally transparent medium such as an open transportation and freight capacity forward market. Additionally, no prior art system or method proposes a technically capable solution of integrating the technical software and hardware requirements for integrating the tasks of a network, GPS system, mobile computing devices, servers, forward commodity markets, financial swap database server and CPU instructions, grouping software for hubs, transparent open access pricing systems, blockchain audit, safety methods and systems, virtual hub systems, algorithms for no arbitrage conditions in a simple easy to use graphical user interface format for mobile or virtual computing over various mediums which are connected via a network.

1) U.S. Pat. No. 6,609,103 issued Aug. 19, 2003 to H. Brock Kolls discloses a system of an e-commerce terminal which facilitates incentive-based purchase of one or more products while said user is on said transportation vehicle. The prior art relates to a computer-implemented system and terminal located in a transportation vehicle for advertising and product sales. The prior art is incapable of structuring a financial based swap payment structure for transportation units based on both the system elements, inputs and market design of methods and system. Not only would the system be incapable of measuring the base of a transportation unit, but also not capable of facilitating market based auction transactions from a plurality of users on those transportation units to price a financial swap payment structure on transportation units. Lastly, the prior art specifically occurs in a transportation vehicle whereas the novel invention is an internet application method and system capable of functioning with any CPU device.

2) U.S. Patent Application Pub. No.: US 2002/0133456 published Sep. 19, 2002 by John M. Lancaster discloses systems and methods for using derivative financial products in capacity driven industries. The prior art claim relates to trading an airline fare product comprising a derivative product wherein the derivative product is based on a forward contract for the purchase of at least one airline fare product. Further the prior art claim discloses a method of trading an airline fare product wherein the derivative product is based on at least one of a fixed airline fare, availability of the airline fare product, a commission associated with the sale of the airline fare product, a volume discount of the airline fare product, a purchasing time limit for the airline fare product and inventory of the airline fare product. The prior art is very clearly not designed on a physical transportation unit delivery and does not transform the physical delivery sequence, but rather acts as a derivative on a fare or fare product. In other words, the prior art is not based on the actual delivery of a physical good or service but rather the derivative value. The prior art discloses guaranteeing of credit risk estimation and employing a clearinghouse functionality similar to an exchange, backing options, assigning option executions to obliged parties and holding margin accounts. Very clearly to someone with ordinary skill in the art, the prior art is exchange based derivative products whereas the novel innovation uses physical delivery of the actual transportation unit as a custom forward contract as well as collateral guarantees from the actual physical transportation unit, not an exchange which demonstrates large and fundamental differences. The novel art is unique in that there is no existing financial swap for a transportation unit based on the actual underlying value of the physical asset with the collateral for the derivative instrument being the actual physical transportation unit and the transformation of the physical delivery of that unit. The complex level of GPS monitoring, GPS systems for matchmaking, market construction and transformation of abstract data into a forward contract is also not possible with the methods disclosed in the prior art whereas the systems and methods are capable of making physical transportation units a physical commodity along with the financial swap payment structure in the novel invention. This innovative novel advancement in the art allows a common user of the method and system to access financial markets utilizing not exchanges or futures markets, but rather the physical transportation unit, resulting transformation of that unit or freight capacity as the collateral and financial guarantee for performance.

3) U.S. Pat. No. 6,356,838 issued Mar. 12, 2002 to Sunil Paul discloses a method, system and program for determining an efficient transportation route. The prior art relates to a computer-implemented method that is described for determining an efficient transportation route comprising: compiling travel data over one or more travel segments, the travel data transmitted from one or more transportation vehicles traveling over the travel segments; receiving positional data associated with a transportation request, the positional data including an origin and a destination; and providing a driver of a vehicle with a first efficient route from the origin to the destination using the travel data, the first efficient route including one or more of the travel segments. Also described is a computer-implemented method for providing transportation services comprising: receiving a transportation request from a passenger; tracking the passenger's position following the request using positional detection logic; and transmitting positional data identifying the passenger's position to a pickup vehicle. The prior art patent is widely cited as the business model taken by most mobile application based transportation services companies. While the prior art does describe the service model of the current construct of the market for transportation with a custom on demand service and then a corresponding company delivering that service through both the technology and the actual physical transportation, it defines a completely different market scenario than a virtual hub to virtual hub transportation open transparent market forward market financial swap structure for an individual transportation or freight capacity unit. As previously discussed a commodity based transportation capacity unit market has a completely different market construct than is defined by all operators and patents in the space. The prior art is simply matching transportation requests through a series of servers, GPS systems, and mobile devices. The prior art clearly was a novel invention, but as evidenced by the market, the method has been utilized to replace the inefficient taxi model rather than create a marketplace for transportation units that can be priced as a commodity with specific commodity contract specifications and the discipline a market brings to a business problem to fill up unutilized transportation capacity through the efficient mechanism of price. It is very clear the result of the methods and systems of the prior art has contributed to increased congestion and traffic unlike the proposed methods and systems. In a commodity-based transportation capacity system with open access transparent systems and methods combined with a financial swap structure to incent participation, the price on physical transportation units will continue to go lower until all space has been utilized or supply for the transportation units is equal to the demand for transportation units. As any observer with ordinary skill would see, most transportation or freight unit seats or capacity goes unutilized and this is a proof and counterexample that no such system is in existence and that the patents and prior art in this field do not address the present novel invention of bringing a forward market and resulting financial swap structures to provide an incentive to bear on the prices of individual units of transportation or freight capacity between virtual hub to virtual hub routes. If prior art addressed the novel invention, then a marketplace would exist for transportation units of capacity which is open access and transparent with associated financial payment structures and prices would drop until a level was reached where all transportation was fully utilized. The prior art simply makes the method of taxi cab and private service cars more efficient and in fact adds to congestion as has been empirically documented by all cities across the world. By contrast the novel invention may use the method and system integrating the technical software and hardware requirements for integrating the tasks of a network, GPS system, mobile computing devices, servers, forward commodity markets, grouping software for hubs, transparent open access pricing systems, financial swap payment structures, blockchain audit and safety methods and systems, virtual hub topology systems, algorithms for no arbitrage conditions and transforming the abstract aforementioned layers in a simple easy to use graphical user interface format for mobile or virtual computing over various mediums which are connected via a network.

4) U.S. Pat. No. 6,421,606 issued Jul. 16, 2002 to Asai et al., discloses a method and system for a route guiding apparatus and medium. The prior art specifically addresses a route guiding apparatus providing information for a route using public transportation as an alternative to a vehicular route. In addition to searching for a vehicular route from a current location to a destination, it is determined whether the current location and the destination are within a zone in which public transportation can be used. When the current location and the destination are determined to be within a public transportation zone, a route using public transportation is searched for. Subsequently, the cost of the route using public transportation and the cost of the vehicular route are compared. When the cost of the public transportation route falls within a predetermined limit, the apparatus indicates the public transportation route. The route costs are calculated considering factors such as required travel time and ticket fees. The apparatus may also recommend public transportation when no parking is available near the destination, or based on traffic information concerning the vehicular route. The prior art clearly addresses a comparing function to determine the lowest cost route to move from one point to another point however the prior art is completely void of providing an open access transparent forward commodity market for individual capacity units to place the method of a market over the system which would then allow for dramatically lower and more efficient prices and utilization would increase dramatically as supply and demand forces would force the market to balance through price due to the financial swap structure transformation of transportation units. Accordingly, the prior art is not comparable from a market method and system basis or from an efficiency basis. The novel invention by contrast integrates the technical software and hardware requirements for integrating the tasks of a network, GPS system, mobile computing devices, servers, forward commodity markets, grouping software for hubs, transparent open access pricing systems, financial swap structure database, blockchain audit and safety methods and systems, virtual hub topology systems, algorithms for no arbitrage conditions in a simple easy to use graphical user interface format for mobile or virtual computing over various mediums which are connected via a network.

5) U.S. Pat. No. 7,373,320 issued May 13, 2008 to Timothy Francis McDonough discloses a method and system for an invention relating to a futures exchange for services contracts. The SerFEx is an electronic market system that enables the exchange of cash (spot and futures) contracts and futures contracts for the delivery of services. Services are traded on the exchange similar to commodities on a prior art commodities exchange. The exchange allows the futures market to determine the right price for services for the producers and consumers of those services. Participants may buy, sell, or leverage services contracts through a variety of order types. The exchange is composed of an electronic infrastructure that has four major components: a front-end facility comprised of licensed authorized intermediaries, an automated bid/ask matching system, a clearinghouse system, and a title management system. The exchange operates twenty-four hours per day and seven days per week with all accounts settled at least once in every twenty-four hours. Participants in the exchange may be producers of services, intermediaries, speculators, and consumers of the services. The prior art very clearly calls the title and claims of the patent a contract futures exchange. A person with ordinary skill in the art would know there is a dramatic difference between a futures contract which are on regulated exchanges and forward contracts which trade over the counter. Futures contracts are highly regulated by definition. There are very specific legal differences between futures and forward contracts and they can't be confused or used interchangeably. As one of many examples, speculators are not permitted to trade forward contracts as all contracts must be transacted with a physical underlying ownership and must be physically delivered unlike regulated futures exchanges which permit speculators. For the sake of clarity, the transportation capacity market is exclusively limited to forward physical contracts which means that the contracts are limited to be traded by only those who are actually providing the underlying service or method. The prior art specifically mentions a data system method for implementing a service contract exchange for construction, transportation, warehousing, postal services, information, real estate, rental, leasing, financial, insurance, professional, scientific, technical services, management, administrative services, educational services, health care, social assistance arts, entertainment and recreation among others. Again someone with ordinary skill would note the specific technical difference between a forward contract which is proposed and the prior art futures contract which are large. As a very important further technical difference to anyone with ordinary skill in the art, the prior art does not show mobile computers or GPS systems as part of the proposed futures exchange in any of the claims or as any part of any diagram and it would be clear this would be a necessary requirement to functionally allow for the transformation or delivery of futures or forward contracts for transportation or freight. Therefore the prior art method and system would be incapable of completing the novel invention proposed in this patent method and systems. FIGS. 9A and 9B of the prior art show that the primary art of the patent in question was a futures contract to sell a royalty escrow service contract which does not require GPS or mobile based technology to complete a transaction. Accordingly, the prior art would be disqualified from comparison very clearly to someone with ordinary skill based on the futures to forwards legal differences and the technical inability to complete a transportation capacity contract without mobile or GPS based technology outlined in any claim or figure of the patents. The prior art is limited to a regulated futures exchange which has a clearing house that guarantees the transactions through a highly regulated process. By contrast forward contracts and financial swaps carry default risks. The prior art refers to mark to market contracts which are a hall mark of futures contracts whereas the novel invention forward transportation unit contracts are settled on one date at the end of the contract. The prior art is clearly limited to regulated futures with are heavily participated in by speculators who are betting on price directions and usually close out positions prior to maturity as evidenced by any regulated commodity futures trading commission data. The novel invention by contrast is a forward transportation or freight capacity unit contract which is mainly used by hedgers and physical participants in the market to eliminate the volatility of an asset price and physical delivery usually takes place as would be the case for someone actually using or providing the transportation or freight capacity unit. The prior art futures contracts are generally subject to one single regulatory regime as by definition they must be regulated by a single entity in one jurisdiction. The prior art is limited in the claims to futures which in the case of physical delivery, counterparties are chosen randomly by the exchange. By contrast the novel invention of a forward transportation capacity or freight unit and resulting financial swap payment structure specifies to whom the delivery should be made. The prior art claims limit are limited to futures where there are margin requirements and periodic margin calls by which cash may change hands daily. By contrast the novel invention of a computer implemented forward commodity transportation capacity unit market, no cash flows until physical delivery takes place. By comparison the novel invention may be transacted across jurisdictional boundaries and are primarily governed by the transactional relations between the parties. The prior art is a futures exchange for service contracts for royalties of many service products highlighting the service of transportation or transportation as a service which is not an actual physical fungible good such as a commodity like copper or coffee or oil which can have an associated futures contract. By contrast the novel invention is a fungible commodity forward contract of an actual seat or ride capacity or space freight capacity on a transportation capacity bearing unit. A service of the prior art would not be able to group users using a virtual hub pooling server which would then combine with another virtual hub or combination of hubs to make a tradable commodity unit, again therefore rendering the prior art as incapable of delivering or even rendering the service or resulting financial payment structure on that service. The novel invention by contrast integrates the technical software and hardware requirements for integrating the tasks of a network, GPS system, mobile computing devices, servers, forward commodity markets, grouping topology software for hubs, transparent open access pricing systems, financial swap payment structuring databases, blockchain audit and safety methods and systems, virtual hub topology systems, algorithms for no arbitrage conditions in a simple easy to use graphical user interface format for mobile or virtual computing over various mediums which are connected via a network. The prior art is technically incapable of providing the software or hardware that would allow for the completion of a transaction between two users in any of the claims. Lastly, the prior art of McDonough largely resembles the recent U.S. Supreme court decision in Alice Corp. v. CLS Bank International. The issue in the Alice case was whether certain claims about a computer-implemented, electronic escrow service for facilitating financial transactions covered abstract ideas ineligible for patent protection as nothing was fundamentally transformed. The patents were held to be invalid because the claims were drawn to an abstract idea, and implementing those claims on a computer was not enough to transform that idea into patentable subject matter. It is very clear that the prior art of McDonough is dangerously close in spirit if not fully resembling the Alice decision as the patent is simply pushing forth the concept of using a financial exchange to cover a general abstract idea with very little evidence to support a novel invention of the actual structure of the market or a novel approach to how to make the physical market perform with either an escrow service contract futures exchange or a transportation service contract futures exchange. In this specific case, the Supreme court gave a two-step test which McDonough would follow the precedent of Alice in that they are simply borrowing the concept of a futures exchange without a novel technical method or system as to facilitating a transaction and as we clearly present in our arguments, the prior art could not facilitate a transportation futures contract implementation because there is no mobile technology to route riders which renders the implementation non-feasible. Further there is no specific computer system or unique program which is novel in the implementation other than regurgitating back the business method of a prior art exchange and then applying it to the abstract concept of applying the existing prior art to service contracts. The novel system and methods of this patent specifically outline the implementation of integrating and transforming a novel interfacing of networks, GPS systems, mobile computing devices, services, forward commodity markets, grouping software for hubs, transparent open access pricing systems, virtual hub topology, financial swap payment structures, no arbitrage conditions alongside a novel graphical user interface that combines all these systems and methods for forward transportation contracts. Clearly the current patent (unlike McDonough), adds "something extra" that embodies and "innovative concept" and is not generic, conventional or obvious as no other patent or business offers these novel concepts.

6) U.S. Pat. No. 7,756,633 issued Jul. 13, 2010 to Huang et al., discloses a method and system for a comprehensive security-enhanced rideshare system is provided. The rideshare program includes localization, mapping and ride matching for participants. Participation incentives and revenue methods provide for the financial viability of the rideshare system. Participant security is monitored in near real-time using location-determining communication devices used by the participants in the system. The rideshare system monitors a number of security-indicating criteria and takes action when an anomalous condition is recognized. The method claim of the prior art specifically refers to providing security in a rideshare environment and monitoring that participant to look for anomalies during the travel route or travel times by a pre-defined threshold and sending security alerts to be confirmed by the rideshare participant that indeed they are safe. The novel invention is fundamentally different than the prior art as the blockchain technology for security within the forward transportation capacity market relies upon algorithms which include independent comprehensive background checks of participants combined algorithms which alert towards the actual commodity unit of the transportation capacity unit not being delivered as per the forward contract specifications in the agreement. Further facial recognition, finger print, video 911 and photo recognition sub-methods are not utilized which govern payment and identity risk to default on the financial swap payment structure to ensure the identity of users which are part of the novel invention and patent.

7) U.S. Pat. No. 8,121,780 issued Feb. 21, 2012 to Gerdes et al. discloses a method for offering a user reward based on a chosen navigation route includes calculating alternative routes from a starting location to a destination location by taking into consideration route segments including public transportation route segments and road network route segments. The alternative routes are presented to a user. A reward is offered for choosing a respective one of the routes. A navigation system that performs the route calculation preferably queries a network database for public transportation information. The prior art in concept is similar to the Paul et al, US Patent application No 2015/0248689 wherein the user of the system and method are given a reward or incentive for choosing a route which in theory promotes the concept of transportation pooling or the use of public transportation. The clear differences again are that the prior art is not a forward based transportation capacity market which will drive the transportation capacity price to the lowest possible economic level. Accordingly the prior art does not necessarily lead to the most efficient outcome nor does it mention or lead to a financial swap payment structure based on a forward transportation unit. The forward commodity individual unit transparent open access forward market is required to arrive at the most efficient lowest price outcome in the limit and therefore the proposed invention uses methods and systems to come to a superior solution and is therefore fundamentally different and unique. The novel invention by contrast integrates the technical software and hardware requirements for integrating the tasks of a network, GPS system, mobile computing devices, servers, forward commodity markets, grouping software for hubs, transparent open access pricing systems, blockchain audit and safety methods and systems, virtual hub topology systems, financial swap structure databases, algorithms for no arbitrage conditions transforming abstract concepts in a simple easy to use graphical user interface format for mobile or virtual computing over various mediums which are connected via a network.

8) U.S. Pat. No. 8,762,035 issued Jun. 24, 2014 to Uri Levine et al., discloses a method and system for real-time community information exchange for a traffic mapping service for allowing plurality of users having each a navigation device to transmit their locations to a server and optionally to signal to the server their requested destination. The system and method are further capable of calculating traffic parameters such as current traffic speed at a given road based on the momentary locations of the users. The system and method of the invention may also calculate and advise the users of preferred roads to take in order to arrive at the requested location with minimum delay. The prior art utilizes GPS systems and mobile devices to route people most efficiently from a starting point to an ending point utilizing a community of users. The prior art utilizes a community but has nothing to mention of an open access transparent transportation or freight trading market for forward transportation or freight capacity. Further the prior art is focused on the shortest mapping route for a transportation segment, not using a market to price the value of the individual capacity units along a given virtual hub to virtual hub topology route or a series of single or multi-modal, multi-hub topology subject to constraints to price the transportation or freight capacity in the context of a financial swap structure that on transformed transportation units. The novel invention by contrast integrates the technical software and hardware requirements for integrating the tasks of a network, GPS system, mobile computing devices, servers, forward commodity markets, grouping software for hubs, transparent open access pricing systems, blockchain audit and safety methods and systems, financial swap databases, virtual hub topology systems, algorithms for no arbitrage conditions in a simple easy to use graphical user interface format for mobile or virtual computing over various mediums which are connected via a network.

9) U.S. Pat. No. 8,798,593 issued Aug. 5, 2014 to Haney, discloses location sharing and tracking using mobile phones or other wireless devices. The prior art systems and methods provide a system for exchanging GPS or other position data between wireless devices for purposes of group activities, child location monitoring, work group coordination, dispatching of employees etc. Cell phones and other wireless devices with GPS receivers have loaded therein a Buddy Watch application and a TalkControl application. The Buddy Watch application communicates with the GPS receiver and other wireless devices operated by buddies registered in the users phone as part of buddy groups or individually. GPS position data and historical GPS position data can be exchanged between cell phones of buddies and instant buddies such as tow truck drivers via a buddy watch server. Referencing the Alice Corp. v. CLS Bank International decision, the prior art generally falls under the category of an abstract concept of grouping people using GPS which is not a novel concept or transforming the data and methods and systems beyond a general business method from prior art without specific application. Further, the prior art would struggle to stand the light of Alice additionally considering Bilski v. Kappos that the idea of grouping people with GPS is an abstract idea and does not apply to a specific novel example such as the transformation of transportation, transportation units as a commodity, unique transportation contract specifications, uniquely defining transportation capacity as seats or cargo space, calculating financial swap structures on those transportation units, and transportation to define a virtual or actual hub or hub series topology in the context of a forward contract market for transportation and resulting financial swap structure.

10) U.S. Patent Application No. US 2015/0248689 with publication date of Sep. 3, 2015 to Sunil Paul et al., discloses a method and system for providing transportation discounts. The prior art systems and methods for providing transportation discounts are disclosed as a server receives, from a client device of a user, a request for a transportation service. In response, the server identifies that the request relates to a particular characteristic associated with modified pricing. The server then calculates an adjusted price for the transportation service based on the modified pricing associated with the particular characteristic. As we have reviewed in the background section of this patent application the proposed system and method uses proprietary information for a company to price a transportation discount which is non-transparent and the company assigned the patent uses its technology to price the discount rather than an open transparent market such as a commodity forward market for transportation or freight capacity and resulting financial swap payment structures. The Paul et al patent application refers to a ride request in FIG. 7 which prices a discount for a ride option based on longer wait time and fewer pick-ups as a proposed example. In this example, the ride request and the market is not for an individual unit of transportation or freight capacity and the example is not an open access market exchange for the individual units of transportation. Custom discounts or the concept of generally used discounts are not used in Individual custom rides are not commodities or fungible which has been why the transportation market has not been able to get to the result disclosed in this novel invention. In a hub to hub based system (or multi-hub topology, there would be enough liquidity and participants to create a viable marketplace of substitutable transportation or freight capacity and resulting financial swap payment structure. A hub to hub transportation model may generally leave the last mile of transportation to another system or method such as the method of a custom transportation request. A commodity or forward market for transportation or freight capacity is only viable where there is ample liquidity for substitution. The proposed method and system of Paul et al., is fundamentally different and more akin to the current methods and systems currently available through companies such as Uber or Lyft or Grab or Via or other TNCs. Paul et al, in FIG. 8 propose an electronic bulletin board for matching custom requests, but clearly do not function as a commodity forward market with defined commodity delivery points (virtual hubs or multi-layered virtual hubs), product specifications, financial swap payment structure or penalties for non-performance, etc. . . . as are standard in commodity contracts for well-known alternative products such as wheat, corn, natural gas, power, oil, etc. . . . . Further FIG. 9 proposed by Paul et al, shows a cross promotional package approach to transportation and theater or dinner shows which defeats the purpose of defining transportation units as a commodity unit which will bear the lowest cost and provide the highest economic incentive for usage. FIG. 12 from Paul et al describes a method and system for using user profile history data to generate discounts which by definition are set by the system. This is fundamentally different from setting a price by an open access market where any participant can offer any price at any time for a given hub to hub route with uniformity of contract as well as longer term financial swap payment structures to help incent filling transportation units. No system or company controls the pricing in the novel invention, the market is left free to float which is different from the system and method Paul et al, propose which has a transportation server price the transportation request for some hot spot location. Further, Paul et al suggest some embodiments are defined from a sponsor giving a transportation discount to a particular location as a promotion. A commodity market eliminates custom behavior and treats a transportation unit for a specific product as uniform without special characteristics such as are proposed by Paul et al. The novel invention by contrast integrates and transforms the technical software instructions and hardware requirements for integrating the tasks of a network, GPS system, mobile computing devices, servers, forward commodity markets, grouping software for virtual hubs, financial swap payment structure databases, transparent open access pricing systems, blockchain audit and safety methods and systems, virtual hub topology systems, algorithms for no arbitrage conditions in a simple easy to use graphical user interface format for mobile or virtual computing over various mediums which are connected via a network.

SUMMARY

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

The aforementioned deficiencies and other problems associated with the general transportation and freight markets, lack of risk management derivatives in transportation or other novel systems and interfaces and how transportation functions with large inefficiencies which use electronic devices to hail taxi cabs or car-pooling services are reduced or eliminated by the disclosed method and system of integrating, transforming and interfacing a plurality of systems into one system which allows the efficiency of a forward market to price and ration unused spaced as to eliminate wasted transportation units or freight capacity with the incentive of financial swap payment structures and derivatives on transportation capacity indices. Implementations of various methods and systems of a financial swap payment structure and index derived from the value of transportation seats or capacity units in airline transport, subway transport, train transport, automobile transport, autonomous vehicle transport, bike transport, bus transport, limo transport, boat transport, moped transport, package transport, freight cargo transport, motorcycle transport, shuttle transport, taxi transport, space transport, virtual transport, atomic particle transport, underground transport, ship transport, sea transport or drone transport on a computer, mobile computer device, virtual reality computer device or mixed reality computing device. Implementations of methods will occur in various transportation modules considering, but not limited to all forms of transportation and movement of freight. Transportation systems have generally assumed transportation is a personalized good rather than a commodity which is substitutable. Transportation and freight unit methods and systems were not standardized or unitized as a fixed contract that could be securitized or unitized until the inventions described in U.S. patent application Ser. No. 15/266,326, "Implementations of a computerized business transaction exchange for various users," filed Sep. 15, 2016 and Ser. No. 15/877,393, "Electronic Forward Market Exchange for Transportation Seats and Capacity in transportation vehicles and Spaces," filed Jan. 23, 2018 and Ser. No. 16/183,647, "Financial Swap Structure Method and System on Transportation Capacity Units," filed Nov. 7, 2018, the contents of which are hereby incorporated by reference in their entirety. In the United States, 85% of all vehicles ride with a single passenger in the vehicle which is a tremendously inefficient use of energy and it causes high levels of traffic congestion. While carpools and vanpools and bus systems have existed for many decades they are largely not utilized by a majority of the population because the time involved to coordinate schedules outweighs the benefit of cost savings and reduced energy use. Mobile networks have allowed for the rise of Transportation Network Companies that promote hired drivers but the cost of these systems has continued to be expensive for the majority of the public which has held back wide scale adoption. It has also been proven that transportation network companies have increased traffic and pollution (Fitzsimmons, E., "Uber Hit With Cap as New York City Takes Lead in Crackdown Further, transportation companies.", Aug. 8, 2018, https://www.nytimes.com/2018/08/08/nyregion/uber-vote-city-council-cap.html) rather than reducing traffic and pollution due to incorrect and inefficient methods and systems. Transportation Network Companies have created systems which allow a given company to set the prices of transportation capacity rather than an open transparent market place. The implementation of the methods and systems creates a financial payment structure swap and index based on the value of transportation capacity units. The implementation of the methods and systems that provide a financial payment structure swap and index on transformed transportation capacity units provides a way for investors, traders and industry participants to swap in derivative transactions where two counterparties exchange cash flows of one party's financial instrument for those of the other party's financial instrument. The simplest example of the transportation capacity swap is an agreement whereby a floating price is exchanged for a fixed price over a specified period. The implementation of the agreement contains transformed transportation capacity units, a volume of transformed transportation units, a duration of transformed transportation units, a fixed price of transformed transportation units and a floating price of transformed transportation units. Bus companies, van pool operators, carpool operators or other transportation participants may sell swaps to lock in their sales price. The industry participant and an intermediary agree on a fixed price, for example $10 for a transformed transportation unit index between point A and point B. The implementation of the method and system contains an index price for the transformed transportation unit which is a floating price. The floating price or floating price index may be the weighted average of transaction and forward prices for the transportation capacity unit for a given time period. For the period agreed, the bus company, van pool operator, carpool operator or other industry participant receives from an intermediary the difference between the fixed price and the floating price if the latter is lower. If the floating price is higher, the difference is paid by the industry participant to the intermediary. An additional example of transformed transportation capacity unit swap may be a differential swap. Whereas a standard aforementioned swap is based on the difference between fixed and floating prices, a differential swap is based on the difference between a fixed differential between two transformed transportation capacity units and the actual or floating differential for the two transformed transportation capacity units over time. The aforementioned examples do not limit the invention as many types of transformed transportation capacity unit swaps are possible such as swaps with floating and fixed differentials between transformed transportation capacity units and fuel markets such as gasoline or diesel or power or electricity or other fuel sources. Many additional transformed transportation unit swap variations may include but not be limited to participation swaps, double up swaps, extendible swaps, pre-paid swaps, off-market swaps, total return swaps, variance swaps, amortizing swaps, deferred rate swaps, forward swaps, accreting swaps, curve lock swaps or other swaps on transformed transportation capacity units. The implementation of the methods and systems that further provide a payment structure swap and index on transportation capacity units provides a way for investors, traders and industry participants to invest assets in the filling of transportation units that then limits pollution, reduces congestion and increases the frequency by which transportation can be delivered. It is a well-known fact that transparent open access markets create the lowest price for a good or service with fungible characteristics such as occurred in airlines, telecom and electricity markets (Pentland, W., "After decades of doubt, deregulation delivers lower electricity prices.", Oct. 13, 2013, https://www.forbes.com/sites/williampentland/2013/10/13/after-decades-of-doubt-deregulation-delivers-lower-electricity-prices/#710fb94b1d13). The lowest cost and most efficient solution will greatly reduce pollution, increase transportation capacity utilization rates, reduce traffic congestion, increase service frequency and save consumers of transportation services trillions in cost by increasing utilization rates. An open access transparent system for financial swap structures on transportation capacity units will also ensure that new technologies such as autonomous cars do not become elitist and are only reserved for the wealthy and do not actually add to pollution and congestion problems as New York City has seen with Transportation Network Companies. Transportation is currently one of the most inefficient markets in the world and a financial swap payment structure and index based on an open forward markets for transportation capacity units will bring flexibility and innovation in payment terms, market discipline and low-cost commodity pricing to all classes and forms of transportation capacity, freight movement and services.

The current economic system and global network generally assumes that the economic choice with the highest level of utility and highest level of efficiency is one governed by acting in self-interest with competition. Modern economic game theory suggests that the former assumption can be improved by acting in self interest in an atmosphere of competition but by also considering the economic outcome for the group as well as self-interest. In the specific economic case of transportation and freight movement, there is no open transparent market to make transparent the economic cost of not valuing transportation capacity down to the commodity unit level. Because the market for transportation is generally valued at the whole vehicle level, not the smaller unit/seat or space level, tremendous inefficiencies exist. These inefficiencies are for the benefit of large fuel companies, large auto companies and large transportation companies and they are at the expense of the consumer who must buy more transportation units than they need because there is no market for smaller units. Accordingly, inefficient choices are made which waste a great deal of energy and time. Most participants in the current economic system simply do not know how their choices affect others in the system, especially that choices in the developed world may affect disproportionately the outcomes for those in the undeveloped world or the wealthy compared to those with fewer resources. The current system is not linked and therefore sub-optimal economic outcomes are achieved because there are limited governing mechanisms to consider the global group outcome. A transparent open access forward market system and method for trading transformed transportation units and resulting financial swap and index construction and innovation solves these inefficiencies by placing the discipline of a market to the poorly utilized resources. Further, financial swap payment and index structures based on transportation units allow investor capital to be available for market participants to are willing to sell rides or freight transport of more generally transportation capacity units that reduce congestion, wear and tear on roads, reduce pollution and generally raise GDP per capita for market participants by reducing highly depreciating expenditures on transportation units.

Further making the argument for this new and novel financial swap payment structure and index method and system to valuing transportation and freight capacity, are the example of large public subway systems in New York City, Paris or London as a few examples. In these metropolitan markets, all people of all ethnicities, all sex types and all income levels ride the public subway system. In these markets, each consumer buys an individual seat and they then are allowed to sit in any seat (proving fungibility), but there is no designation of where they sit, only that they are given a space on the transportation mode/method. The aforementioned example is evidence that indeed seats and rides are interchangeable and they indeed fit the definition of a fungible commodity which is one of many basis and premise for the proposed new and novel invention. It is widely known that products which fit the definition of a commodity are most efficiently priced in transparent commodity markets and commodity forward markets have been set up for those products such as oil, power, natural gas, foreign exchange, gold, silver, corn, wheat and many other products. Further, ancillary services such as a financial swap payment and index structure may be a method to provide market improvements on the age-old problems of rigid payment terms, pollution, traffic congestion and inefficient utilization of resources. Even though the basis of a fungible commodity product definition is met through the example of a public subway system, the subway market continues to exist as a fixed price market set by the local transportation authorities. Again, the public subway system could be further improved by allowing a variable transparent market system to be added to the subway systems of the world or allowing the substitution of a physical delivered vehicle ride on a given route with a train or subway route. No such forward commodity trading auction market has existed for transportation units because the solution to integrate the technical requirements are complex and novel. Further financial swap payment and index structures are a novel invention utilizing the innovative market for transformed transportation capacity units. The method and system of the financial swap payment structures and indices on transportation capacity forward market units of the new and novel invention of this disclosure solves the complicated market problem and may provide the most efficient system and open market-based solution to pricing transportation in such a way that the global consumer will save money by using market pricing, financial tools, methods and systems to fully utilize all market transportation capacity to the fullest extent possible. Because an open transparent market is setting the price of the methods and systems of the aforementioned novel invention rather than a company or single provider, the solution is the most elegant and mathematically efficient answer for the global economy.

City planners across the globe discuss the field of shared-use mobility which encompasses transportation services that are shared among users, including public transit; taxis and limos; bikesharing, carsharing (round-trip, one-way and personal vehicle sharing); ridesharing (car-pooling, van-pooling); ridesourcing/ride-splitting; scooter sharing; shuttle services; neighborhood jitneys; and commercial delivery vehicles providing flexible goods movement. No prior art has ever transformed the vehicular transportation capacity on a street into a financial market where the commodity may be traded, physically delivered, swap payments made based on index values, option and derivatives based on indices. It is the use of any combination of shared mobility services, above, that have the effect of improving options to travel without a vehicle. Yet, in all these plans and studies, there has never been a proposal to integrate the power of a transparent marketplace to transformed transportation capacity which elegantly combines technology to make the concept feasible with markets, transportation capacity swaps, transportation capacity derivatives or financial or physical index mechanisms and methods for transportation capacity units. Further, by definition, there exists no innovative financial swap payment structures or index to incent investors to put capital towards a market which fills empty transportation units in the form of seats, rides or freight units. The key to motivate the movement to shared-use mobility is to integrate an innovative financial swap payment structure based on a commodity market to trade the individual value of a single unit of transportation or freight capacity which has not been done by any other prior art or patent globally and has not been practiced by any business. The novelty of the method and system is to combine the technology of financial swap payment structures, index formation commodity markets, global positioning system ("GPS") location services, networks, databases, CPUs and defining transportation as hub to hub capacity such as has been accomplished in energy and telecom markets among other methods and systems. Ample market participants actively physically participate in hub to hub transportation already and the unitized capacity of transport may be a tradable commodity if the systems and methods existed to trade and price the market in such a manner such as are in this novel and innovative invention.

The San Francisco County Transportation Authority released a report Transportation Network Companies ("TNCs") have made traffic 51% worse (San Francisco County Traffic Authority, "Emerging Mobility, TNC's and Congestion.", Oct. 15, 2018, https://www.sfcta.org/sites/default/files/content/Planning/TNCs/TNCs_Congestion_Report_181015_Final.pdf). Similarly, a highly publicized New York City study found that the services provided by Transportation Network Companies (TNCs) created a net increase of 600 million vehicle miles traveled in New York City during 2016, which was a three to four percent increase in traffic citywide. Accordingly, the method and systems of prior art are actually making city congestion problems worse, not better. While governments suggest effective policy leading towards shared—use vehicles and services, and away from single occupancy uses, much more is needed to prevent worsening congestion. Instead, a much simpler solution is to utilize financial swap payments and index structures on an open access transparent marketplace for virtual hub to virtual hub multi-modal transportation capacity such as is accomplished in the contents of this patent disclosure and novel invention. The solution is therefore fundamentally different, novel and unique compared to the models and patents pursued by prior art.

Using methods and systems of a financial swap payment and index structures on transparent virtual hub to virtual hub market for transportation and freight capacity to promote shared-use practices will have immediate benefits of taking drivers off the road and reducing the congestion, infrastructure costs, greenhouse gas emissions and household transportation costs, even without the benefit of electric and autonomous vehicles, offering a more immediate way to shape the future with affordable, accessible and equitable multi-modal options. Cultivating shared mobility practices now is important to start the behavioral shift towards a shared, electric autonomous vehicle future.

Shared-use vehicle technology is already here and is advancing but it has been a slow process because there has yet to be an open access transportation marketplace to make transparent the price of a single unit of transportation capacity nor the financial swap payment structure and index incentives to promote the advancement of such methods. The underlying market technology may be utilized with a range of services from a public transportation service as the backbone of the transportation network, to individual shared services that can provide first and last mile options; or multi-passenger "micro-transit" options operated in areas where high-capacity transit is not feasible. Financial swap payment structures and indices have a significant capacity to fill transportation unit space capacity with people or freight which has otherwise been under utilized without the existence of a flexible swap, index and liquid financial structure to monetize the space. Another way to view the contents of this disclosure is that the method and system will have the effect of creating a financial payment structure to speed the development of a virtual hub to virtual hub subway (using various transportation types and modes) in every city throughout the world through multiple methods of transportation (normalizing modes of transportation with respect to price). The alternative or status quo has led to urban planning infrastructure expenses that are skyrocketing, flooding from excessive road construction, congestion that has become unmanageable in most urban areas, escalating pollution and resulting health care costs, increased vehicular deaths from congestion and excessive costs at the consumer level which can be reduced significantly. The patent disclosure method and system creates and harnesses financial swap payment structures, index construction and program instructions so that a market force can bring these benefits in a way that clearly has been unobtainable in the past through other methods and inventions. If another system and method was solving these problems there would be clear evidence as a counter-example in the market, but no such evidence exists. In fact, evidence suggests all these aforementioned problems have escalated with alternative inventions which have been patented and moved forward in business models for the marketplace.

Efficiently implementing a multi-modal financial swap payment structure and index for an open forward market for transportation and freight capacity requires not only the use of direct virtual hub to virtual hub technology, but also multi-hub and multi-modal series of market auctions to allow the user more efficient selection criteria such as cheapest route, single-mode transport, multi-mode transport, fastest route transport, most scenic route transport, highest rating transport, most available transport, highest volume transport, most frequent transport, service level transport, security and safety transport and group restricted transport. The novel art and disclosure further describes the optimization methods of allowing a user to participate in a series of virtual hub to virtual hub auctions that may be presented as a series of auctions or as one combined auction with multiple hubs and legs presented as one single auction. The resulting financial swap cash flow series and index values may then be discounted and offered as both an investment vehicle and incentive payment for participants in the system and method. The open market auctions and multi-modal methods may be constrained by using no method, cheapest route method, single-mode transport method, multi-mode transport method, fastest route transport method, most scenic route transport method, highest rating transport method, most available transport method, highest volume transport method, most frequent transport method, service level transport method, security method and safety transport method and group restricted transport methods, or additional methods which optimize a series of auctions for transportation and freight units within an open forward market method. The aforementioned sub-methods of the open forward market for transportation and freight capacity units comprise a multi-layered, multi-modal layered network node topology subject to a plurality of constraints.

In some embodiments, the methods and systems are on portable devices. In some embodiments, the methods and systems are on stationary devices. In yet other embodiments, the methods and system disclosed may use mixed reality, augmented reality or virtual reality or other audio or visualization methods to allow a user to transact and trade freight and transportation capacity as a forward commodity with a resulting financial swap payment structure and index. In some embodiments the graphical user interface ("GUI") on any mobile or stationary computer device interfaces with one or more processors, memory and one or more modules, programs or sets of instructions stored in the memory for performing multiple functions. In some embodiments, the user interacts with the GUI primarily through finger contacts or voice commands or other sensory methods to interface with the GUI. In some embodiments, the functions may include the user directing the GUI to place a user profile in a virtual hub so that they may participate, transact or trade a combination of virtual hub transportation routes as a forward commodity for transportation or freight capacity with a resulting financial swap payment and index structure. In some embodiments, the functions may include the user instructing the GUI to participate, transact, financially structure a financial swap, index, payment or trade in various modes of transportation capacity such as automobile, air, autonomous vehicle, bike, boat, bus, drone, limo, motorcycle, moped, shuttle, spaceship, subway, taxi, train, other transportation methods, cargo freight, package freight, virtual or various combinations of the aforementioned modes. In some embodiments, the functions may include the user instructing the GUI to form a new or existing virtual hub or virtual hub combination which then has a specification function which forms a basis for the GUI to present the plurality of buyers and sellers of transportation and freight capacity between two or more virtual hubs with a resulting financial swap payment structure and index.

In an aspect of the invention, a computer-implemented method for use in conjunction with a computing device with various display formats comprises: a user at a mobile or fixed computing device with a touchscreen or a computing device without a touchscreen or augmented reality non-screen display or audio non-screen interface detecting a user network login, detecting a secure login based on facial recognition, fingerprint recognition or photo scan recognition of the user, performing multiple local and external security and crime checks on the user, detecting and receiving from the user through the GUI user input or GPS coordinate input from the computing device and detecting from the user input a destination coordinate and transmission of said coordinates, generating a net present value or present value or future value of cash flows with relation to the underlying transportation capacity units, generating and applying one or more optimization techniques to form a virtual hub with other users that have similar transportation requests within a geographic boundary, determining if two or more virtual hubs are required for the path of the auction between a said starting point and ending point, generating instructions for a plurality of computing devices, networks, virtual hub database servers, network member database servers, transportation platform market database servers to form a combination of virtual hubs and contract specifications for delivery of transportation services or freight capacity between the virtual hubs in a format presented by a GUI which allows the user to submit prices to sell (offer) or bid (buy) transportation or freight capacity between virtual hub combinations, generating instructions to interface a plurality networks, global positioning systems networks, servers, forward commodity markets, grouping software for virtual hubs, transparent open access pricing systems which form a price time priority queue price auction of a given quality, financial swap payment structures, index construction on the virtual hub and specification combination, blockchain audit and safety systems, virtual hub topology servers and systems, no arbitrage constraint condition systems which form one system to implement a financial swap payment structure and index on forward commodity transportation and freight capacity unit market system and method. The programs and instructions are stored in memory and configured to be executed by one or more processes by a plurality of users. The programs may include a plurality of configurations and specification instructions for various modes of transportation capacity. The programs also may include as specification options to select a plurality of timings, quality levels of capacity and service, physical or cash settle, term of timings such as by the second, minute, hour, day, weekday, weekend, month, annual or day of the week, various order types such as day, good till cancelled, immediate or cancel, good till date, day till cancelled, limit, market, market if touched, snap market, snap mid, snap to primary, peg to benchmark, adaptive custom orders. The programs may also include a plurality of instruction modes such as automobile, air, autonomous vehicle, bike, boat, bus, drone, limo, motorcycle, moped, shuttle, spaceship, subway, taxi, train, packages, and cargo for transportation or freight capacity. The programs also may include: instructions for virtual hub pick up and drop off points as well as instructions to set various constraints such as cheapest route, single mode, multi-mode, fastest route, most scenic route, highest rating, most available or liquid, highest volume, most frequent, service level, security and safety and group restricted modes. The programs and instructions from the GUI provide master instructions for the plurality of computing devices and servers which interface to allow the user to participate, transact and trade a plurality of transportation and freight capacity modes between a plurality of virtual hubs. The programs and instructions from the GUI may price a plurality of financial swap payment structures and index values based on the forward market contracts for transportation capacity and freight capacity units.

In another aspect of the invention, a computing system comprises: a plurality of networks, global positioning systems networks, servers, forward commodity market servers and instructions, financial swap payment structure databases, index construction instructions, cash or physical settlement instructions, grouping program instructions for virtual hubs and associated servers, transparent open access pricing servers and instructions, blockchain audit and safety servers and instructions, user identification history and instructions against crime databases and identity databases to confirm security of the system and users, virtual hub servers and instructions, no arbitrage constraint condition servers and instructions which form one system to implement a forward commodity transportation and freight capacity unit market system and method.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 35 illustrates an exemplary swap, forward and future valuation formula for a transformed transportation capacity unit in accordance with some embodiments.

FIG. 37 illustrates an exemplary plurality of index option and transportation capacity unit option constructions.

FIG. 41 illustrates an exemplary legal contract for fixed for floating swap transformations on transformed transportation capacity units.

FIG. 42 illustrates an exemplary legal contract for fixed for floating swap transformations on transformed transportation capacity units.

FIG. 43 illustrates an exemplary legal contract for fixed for floating swap transformations on transformed transportation capacity units.

FIG. 44 illustrates an exemplary legal contract for fixed for floating swap transformations on transformed transportation capacity units.

FIG. 45 illustrates an exemplary legal contract for fixed for floating swap transformations on transformed transportation capacity units.

FIG. 46 illustrates an exemplary legal contract for fixed for floating swap transformations on transformed transportation capacity units.

FIG. 47 illustrates an exemplary legal contract for fixed for floating swap transformations on transformed transportation capacity units.

DETAILED DESCRIPTION

Figure 1:
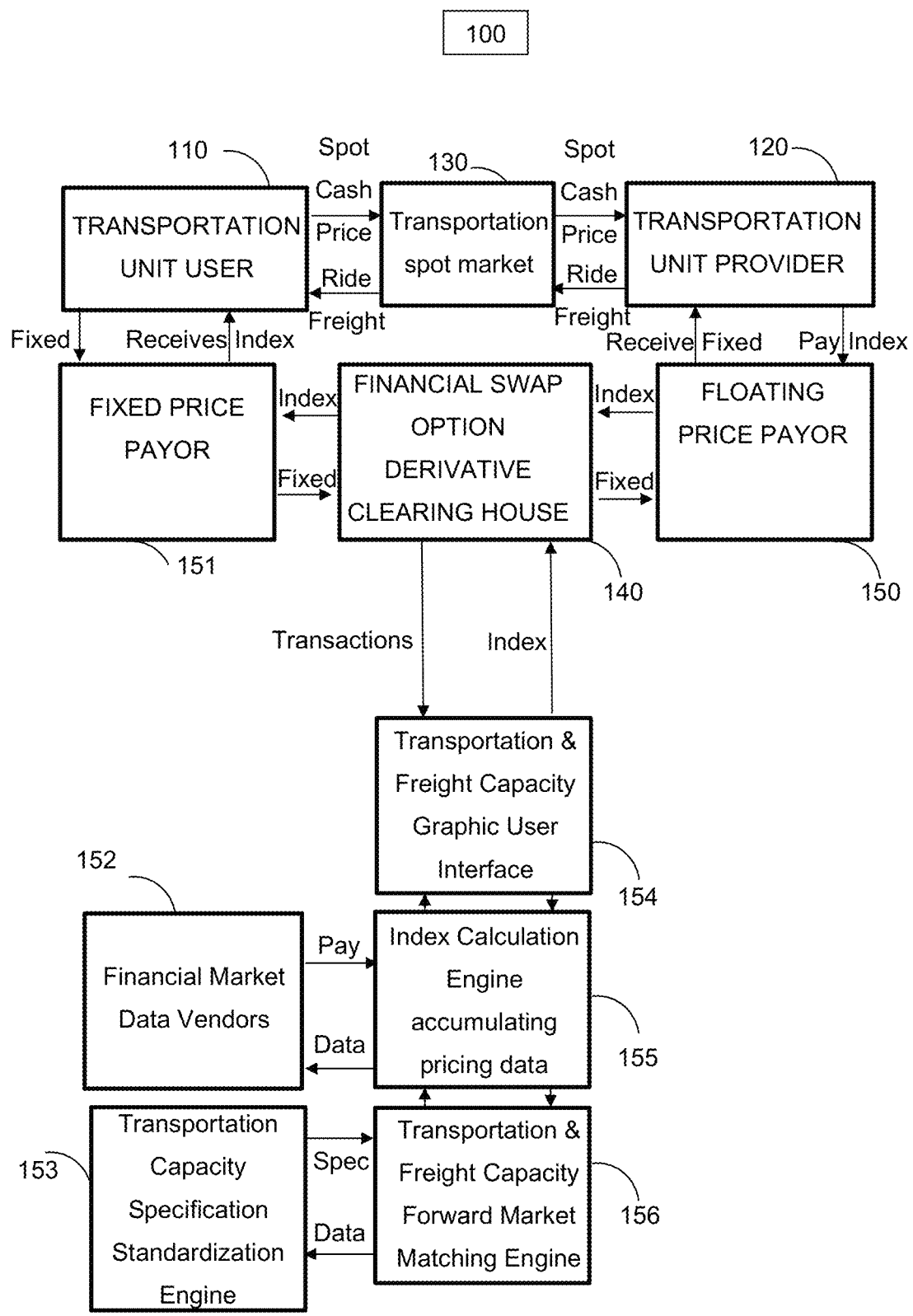
FIG. 1 illustrates a schematic diagram of the financial swap payment structure cash flows and index construction engine and data transformations on the underlying forward market for transportation capacity and transportation freight capacity in accordance with some embodiments.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade and transact transportation and freight capacity units as a physical forward commodity with swaps, futures, forwards, options, indexes and other derivatives. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a", "an" and "the" are intended to also include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a mobile computing device may be substituted for a fixed stationary computing device or a virtual reality headset or a mixed reality headset or an augmented reality headset or an audio interfaced computer device. Embodiments may also occur on a projection computing device or in any other method or system which communicates, transforms and integrates the use of a network, global positioning system network, mobile computing devices, servers, forward commodity forward market auction database, financial swap payment structure databases, index calculation instructions and database, grouping software instructions for hubs, virtual hub topology methods and systems, transparent open access user interface pricing systems, blockchain audit and safety methods, facial recognition, fingerprint recognition or photo recognition of users for security and identity check, algorithms for no arbitrage conditions and constraints with a user interface or graphical user interface formatted on mobile or stationary computing devices over various mediums which are connected through a network for the purpose of participating, transacting or trading transportation or freight capacity units between combinations of virtual hubs as a forward commodity in an auction and resulting financial swap payment structures, index construction and other derivative structures.

FIG. 1 illustrates in some embodiments the method and system communicates, transforms and integrates the use of a network, global positioning system network, mobile computing devices, servers, forward commodity forward market auction database, financial swap payment structure databases, index calculation instructions and database, grouping software instructions for hubs, virtual hub topology methods and systems, transparent open access user interface pricing systems, blockchain audit and safety methods, facial recognition, fingerprint recognition or photo recognition of users for security and identity check, algorithms for no arbitrage conditions and constraints with a user interface or graphical user interface formatted on mobile or stationary computing devices over various mediums which are connected through a network for the purpose of participating, transacting or trading transportation or freight capacity units between combinations of virtual hubs as a forward commodity in an auction and resulting financial swap payment structure, derivatives and index construction. The diagram shows the transportation capacity unit user 110 as a consumer of transportation capacity units in the form of freight or commute transportation as a commute rider or shipper in a transportation spot market 130 with a transportation capacity unit provider 120 such as a bus company, vanpool, carpool, freight hauler, freight company, train, airline, boat, autonomous vehicle, drone, moped, motorcycle, limo, boat, subway, bicycle or other transportation capacity unit provider. The transportation spot market 130 is how transportation in completed in prior art. Transformed transportation capacity units which have been modified with a transportation specification engine 153 may be matched in a transportation and freight capacity unit format market matching engine 156 with a logged history of matched transportation capacity units to form a transportation capacity unit index from the transportation capacity unit index calculation engine 155. The transportation capacity unit users 110 and transportation capacity unit providers 120 may be presented transformed transportation capacity unit data with a graphical user interface 154 to match transportation capacity units in the forward market matching engine 156 which may present transportation capacity unit transactions to a financial swap and option and forward and futures derivative clearing house 140. The matching engine 156 may generate transportation capacity unit swaps, futures, forwards, option and other derivative transactions for transportation capacity units with the clearing house 140 which may organize fixed price payor transactions 151 and floating price payor transactions 150. Transportation Capacity Unit market participants may desire to use the transportation capacity unit financial swap, forward, option, and futures market and clearing house 140 and transformed transportation capacity unit software that maintain matching instructions in the forward market matching engine 156, index calculation instructions in the index calculation engine 155 and transformed transportation unit graphical user interface 154 to manage financial and physical transportation exposures.

Figure 2:
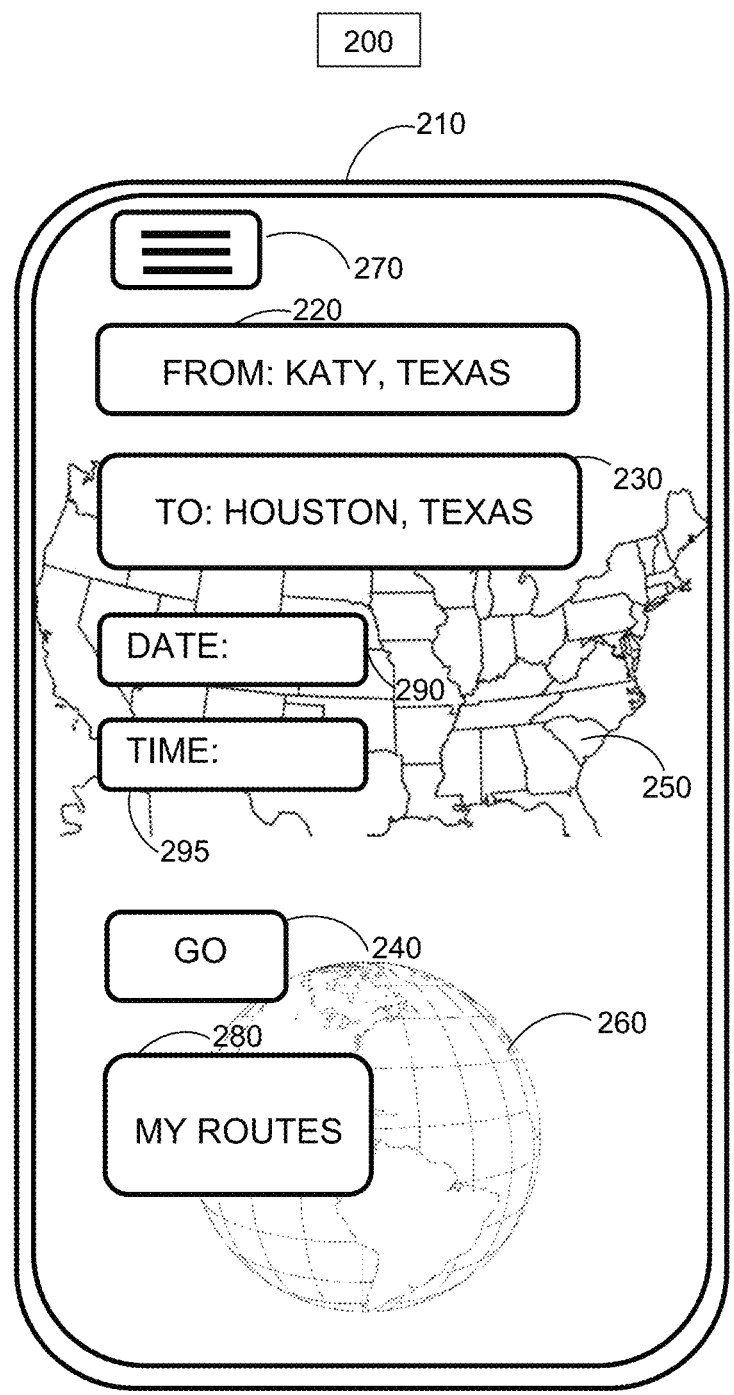
FIG. 2 illustrates an exemplary user interface to configure the origin and destination for a virtual hub to trade transportation and freight capacity in accordance with some embodiments.

FIG. 2 illustrates in some embodiments, exemplary user interfaces 210. In some embodiments, the user 3110 may select one or more of the user interface elements to enter an origin/from address 220 and a destination/to address 230 as well as having the GPS network 3150 autofill the origin location 220 from the users 3110 present location. The mobile computing device 3111 may be substituted for a fixed stationary computing device, an augmented reality projection device, virtual reality projection device, mixed reality projection device, audio computer computing interface or any computing device which renders a visualization to a user 3110 for the purpose of displaying the transportation or freight capacity unit trading market platform auction GUI 210. In some embodiments, the user 3110 may select the go button 240 after the origin/from address 220 and a destination/to address 230 have been input. In some embodiments, the GUI 210 may have a background map 250 relative to the location of the user 3110. In some embodiments, the user 3110 may scroll to a world 260 location using the world icon 260. In some embodiments, the user 3110 may select the "my routes" button 280 which may show the users 3110 most frequent transportation or freight capacity combinations so that the user can easily navigate to the most relevant transportation capacity markets. As an example, but not limiting by example, the user 3110 may have entered routes in the "my routes" 280 saved locations on the virtual hub database server 3120, transportation forward market database server 3130 and network member database server 3160 locations such as "home to work", or work to home" or "work to gym" or "gym to work" or "work to shopping" or "shopping to work" or "home to friend" or "home to school" or "home to downtown" or "downtown to home" or "home to shopping" or "home to yoga" or "home to airport" or "Freight facility to Delivery Route" or a plurality of the most common routes for a user 3110. The hamburger graphic button 270 may allow the user to set many additional settings to set the market constraints for participating, transacting, or trading forward transportation or freight as a commodity. The hamburger graphic button 270 on the GUI 210 may also serve as a menu function for the application GUI instructions. As described previously the hamburger graphic 270 may be used to navigate throughout the various settings of the GUI for transportation or freight capacity as a forward commodity 210 by a user 3110.

Figure 3:
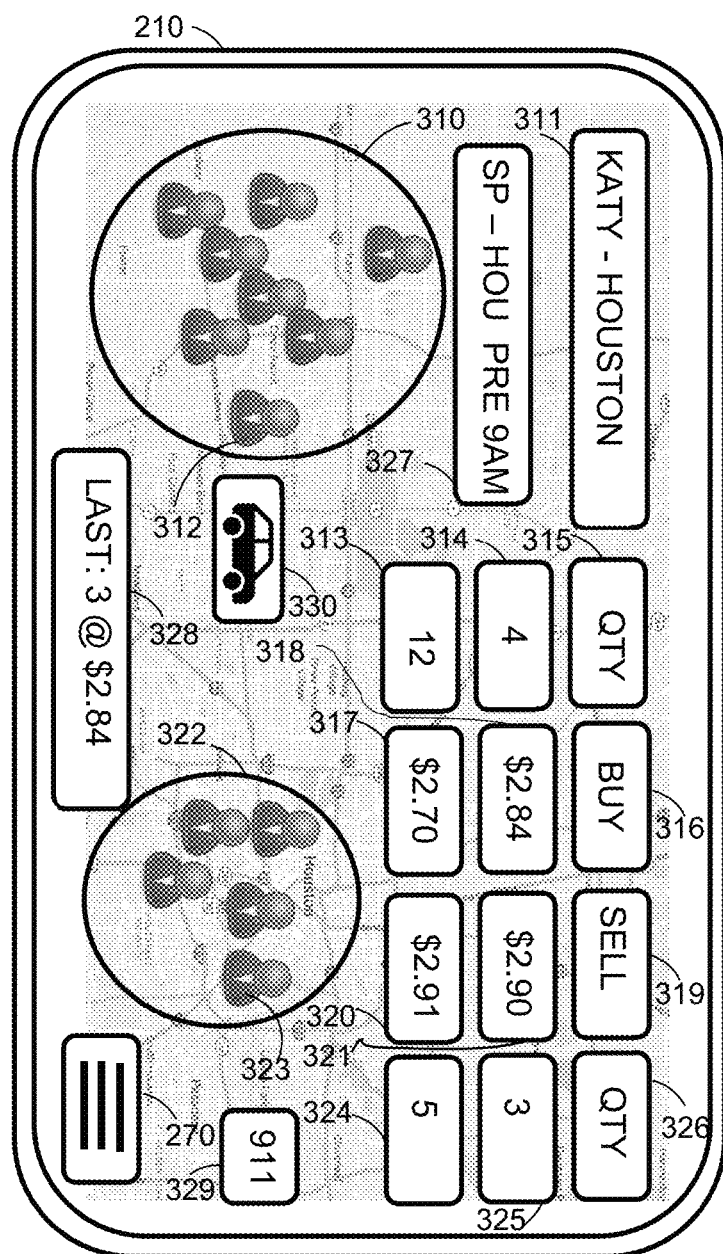
FIG. 3 illustrates an exemplary user interface to transact and trade automobile transportation or freight capacity with various domestic configurations in accordance with some embodiments.

FIG. 3 illustrates exemplary user interfaces 210 for participating, transacting and/or trading transportation or freight as a physical forward commodity between combinations of virtual hubs over various transportation modes. In some embodiments, user interface 210 includes the following elements, or a subset or superset thereof:

Exemplary virtual hub combination 311;

Exemplary virtual hub origin/from location 310 with users 312 within the virtual hub location 310;

Exemplary specification summary of the market, level of service and time of delivery commencement 327;

Exemplary mode of transportation capacity type 330;

Exemplary transaction summary of the last trades quantity and price 328;

Exemplary virtual hub destination/to location 322 and user who is being delivered on the transportation capacity unit 323;

Exemplary bid/buy quantity title header 315 for an exemplary virtual transportation hub market;

Exemplary bid/buy price title header 316 for an exemplary virtual transportation hub market;

Exemplary offer/sell price title header 319 for an exemplary virtual transportation hub market;

Exemplary offer/sell quantity title header 326 for an exemplary virtual transportation hub market;

Exemplary bid/buy quantity 314 for the best bid quantity from a plurality of users 3110 for an exemplary respective transportation or freight capacity virtual hub combination 311;

Exemplary bid/buy quantity 313 for the second-best bid quantity from a plurality of users 3110 for an exemplary respective transportation or freight capacity virtual hub combination 311;

Exemplary bid/buy price 318 for the best bid price from a plurality of users 3110 for an exemplary respective transportation or freight capacity virtual hub combination 311;

Exemplary bid/buy price 317 for the second-best bid price from a plurality of users 3110 for an exemplary respective transportation capacity virtual hub combination 311;

Exemplary offer/sell price 321 for the best offer price from a plurality of users 3110 for an exemplary respective transportation capacity virtual hub combination 311;

Exemplary offer/sell price 320 for the second-best offer price from a plurality of users 3110 for an exemplary respective transportation or freight capacity virtual hub combination 311;

Exemplary offer/sell quantity 325 for the best offer quantity from a plurality of users 3110 for an exemplary respective transportation or freight capacity virtual hub combination 311;

Exemplary offer/sell quantity 324 for the second-best offer quantity from a plurality of users 3110 for an exemplary respective transportation capacity virtual hub combination 311;

Exemplary safety dispatch "911" button 329 to enact video and audio recording of the user 3110 environment and dispatch of that information to authorities.

Exemplary hamburger menu button 270 to move back to menu options and settings away from the participation, transaction, trading GUI 210 embodiment.

In some embodiments the user 3110 may enter a transaction quantity and price for transportation or freight capacity units to participate, transact and/or trade by the GUI 210 detecting user 3110 contact with a bid/buy price 318 or offer/sell price 321. The GUI 210 detects user 3110 contact with any of the GUI 210 buttons which have been aforementioned. Upon user 3110 contact with buttons on the GUI 210, instructions are instantiated which allows the user 3110 to change the specifications of the respective virtual hub combination 311. A plurality of prices and markets may be presented based on a plurality of contract specifications by way of example but not limiting by example specifications for transportation capacity units may include swaps, options, forwards and futures 327. For any given contract specification 327 and virtual hub series combination 311 the transportation or freight units are substitutable which is unique and novel to the invention and unlike any other prior art. In some embodiments, the best bid/buy price 318 may be moving up in price or down in price depending on the market conditions at any given time. In some embodiments the last trade or last transacted price for a given specification is listed to help the user 3110 understand how the market is moving so that the user 3110 may submit a competitive offer/selling price 321 or bid/buying price 314. In some embodiments, users 3110 may adjust settings of the GUI 210 to show more bid/buying prices 317 or more offer/selling prices 320. In some embodiments the matrix of market quantities and prices 313, 314, 315, 316, 317, 318, 319, 320, 321, 324, 325, 326 may be referred to as market depth in the GUI 210 embodiment. In some embodiments the number of users 3110 may be displayed as user icons 312 or 323 for the amount of people logged in which desire to transact, trade or participate in a given virtual hub 310 to virtual hub 322 combination. In some embodiments, users 3110 may select the transportation mode 330 such that the user allows a market for only one form of transportation capacity as a commodity or the user 3110 may allow the system to show multiple forms of transportation capacity between two virtual transportation capacity hubs 310, 311, 322. In some embodiments the GUI 210 may detect a user 3110 selecting the 911 button 329 which may activate voice and video recording functions on the mobile or stationary device 3111 and transmit the data with a confirmation from the user 3110 to the authorities to provide enhanced security while participating, transacting or trading forward transportation or freight as a commodity. In some embodiments the user may toggle between the GUI 210 market view screen in FIG. 3 and other menu 270 options and settings by the user 3110 selecting the hamburger button 270 and the GUI 210 detecting the user 3110 input or contact. In some embodiments the GUI 210 may instantiate instructions in the memory of the mobile computing device 3111 which then transmits transportation or freight capacity data through the network 3140 or wireless GPS network 3150 to call upon instruction routines and instruction sub-routines on the transportation forward market database server 3130, virtual hub database server 3120, network member database server 3160, no arbitrage condition database server 3180 and/or instructions in the memory of the cloud and local CPUs 3190 which all interface together to make one system which may deliver transportation or freight capacity units to users 3110 from and to a plurality of virtual hubs 310, 322 with a plurality of specifications at specific market prices.

Figure 4:
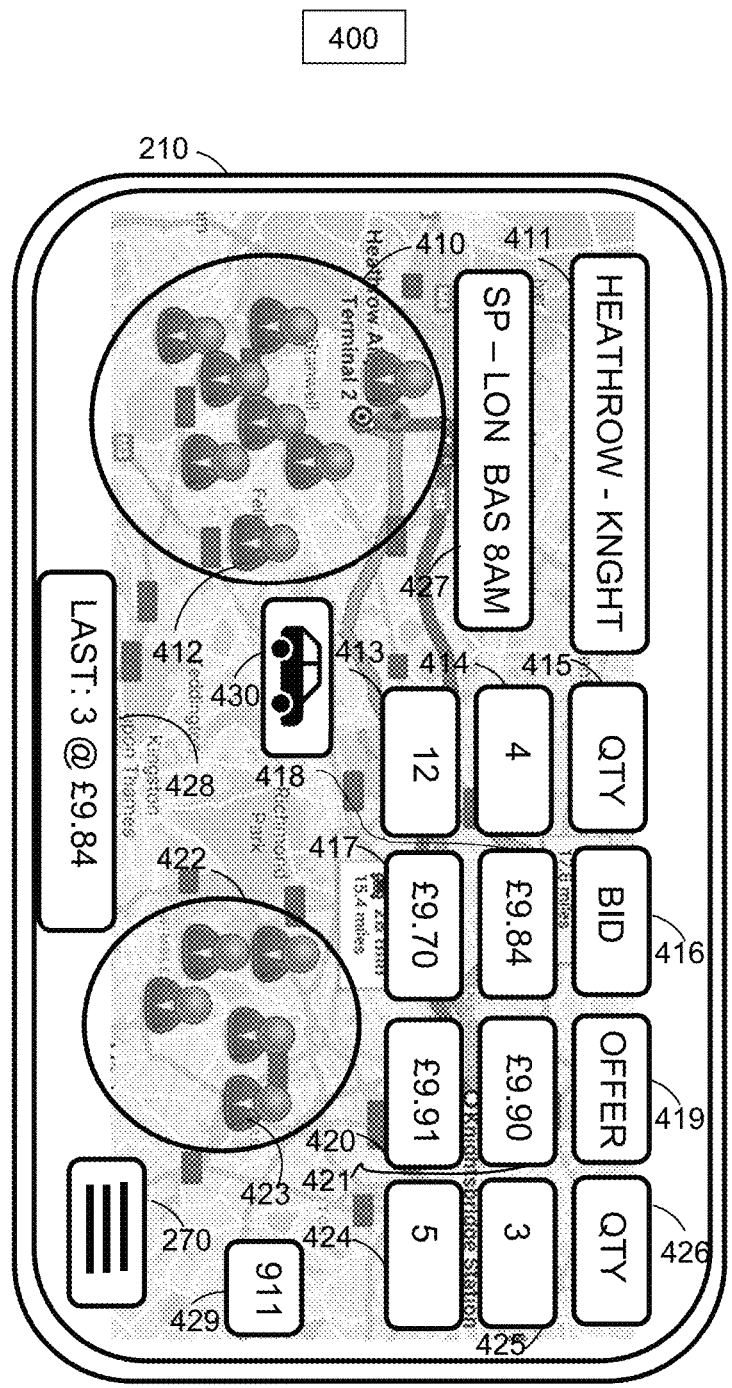
FIG. 4 illustrates an exemplary user interface with various international configurations of trading automobile or freight capacity in accordance with some embodiments.

FIG. 4 illustrates exemplary user interfaces 210 for participating, transacting and/or trading transportation as a physical forward commodity between combinations of virtual hubs over various transportation modes. In some embodiments, user interface 210 includes the following elements, or a subset or superset thereof:

Exemplary virtual hub combination 311;

Exemplary virtual hub origin/from location 410 with users 412 within the virtual hub location 310;

Exemplary specification summary of the market, level of service and time of delivery commencement 427, in this particular embodiment the GUI 210 has moved to an international virtual market hub combination market such as within London;

Exemplary mode of transportation capacity type 430;

Exemplary transaction summary of the last trade auction quantity and price 428 in the local currency or another currency set by the user 3110;

Exemplary virtual hub destination/to location 422 and user who is being delivered on the transportation or freight capacity unit 423;

Exemplary bid/buy quantity title header 415 for an exemplary virtual transportation hub market;

Exemplary bid/buy price title header 416 for an exemplary virtual transportation hub market;

Exemplary offer/sell price title header 419 for an exemplary virtual transportation hub market;

Exemplary offer/sell quantity title header 426 for an exemplary virtual transportation hub market;

Exemplary bid/buy quantity 414 for the best bid quantity from a plurality of users 3110 for an exemplary respective transportation capacity virtual hub combination 411;

Exemplary bid/buy quantity 413 for the second-best bid quantity from a plurality of users 3110 for an exemplary respective transportation or freight capacity virtual hub combination 411;

Exemplary bid/buy price 418 for the best bid price from a plurality of users 3110 for an exemplary respective transportation capacity virtual hub combination 411;

Exemplary bid/buy price 417 for the second-best bid price from a plurality of users 3110 for an exemplary respective transportation or freight capacity virtual hub combination 411;

Exemplary offer/sell price 421 for the best offer price from a plurality of users 3110 for an exemplary respective transportation or freight capacity virtual hub combination 411;

Exemplary offer/sell price 420 for the second-best offer price from a plurality of users 3110 for an exemplary respective transportation or freight capacity virtual hub combination 411;

Exemplary offer/sell quantity 425 for the best offer quantity from a plurality of users 3110 for an exemplary respective transportation or freight capacity virtual hub combination 411;

Exemplary offer/sell quantity 424 for the second-best offer quantity from a plurality of users 3110 for an exemplary respective transportation or freight capacity virtual hub combination 411;

Exemplary safety dispatch "911" button 429 to enact video and audio recording of the user 3110 environment and dispatch of that information to authorities.

Exemplary hamburger menu button 270 to move back to menu options and settings away from the participation, transaction, trading GUI 210 embodiment.

In some embodiments the user 3110 may enter a transaction quantity and price for transportation or freight capacity units to participate, transact and/or trade by the GUI 210 detecting user 3110 contact with a bid/buy price 418 or offer/sell price 421. The GUI 210 detects user 3110 contact with any of the GUI 210 buttons which have been aforementioned. The GUI 210 may detect user contact 3110 with any of the GUI 210 buttons 418, 417, 420,421 or user 3110 voice interface with the application 210 method. Upon user 3110 contact with buttons on the GUI 210, instructions are instantiated which allows the user 3110 to change the specifications of the respective virtual hub combination 411. A plurality of prices and markets may be presented based on a plurality of contract specifications by way of example but not limiting by example specifications for transportation capacity units may include swaps, options, forwards and futures 427. In some embodiments, the best bid/buy price 418 may be moving up in price or down in price depending on the market conditions at any given time. In some embodiments the last auction trade or last transacted price for a given specification is listed to help the user 3110 understand how the market is moving so that the user 3110 may submit a competitive offer/selling price 421 or bid/buying price 414. In some embodiments, users 3110 may adjust settings of the GUI 210 to show more bid/buying prices 417 or more offer/selling prices 420. In some embodiments the matrix of market quantities and prices 413, 414, 415, 416, 417, 418, 419, 420, 421, 424, 425, 426 may be referred to as market depth in the GUI 210 embodiment. In some embodiments the number of users 3110 may be displayed as user icons 412 or 423 for the amount of people logged in which desire to transact, trade or participate in a given virtual hub 410 to virtual hub 422 combination auction. In some embodiments, users 3110 may select the transportation mode 430 such that the user allows a market for only one form of transportation capacity as a commodity or the user 3110 may allow the system to show multiple forms of transportation capacity between two virtual transportation capacity hubs 410, 411, 422. In some embodiments the GUI 210 may detect a user 3110 selecting the 911 button 429 which may activate voice and video recording functions on the mobile or stationary device 3111 and transmit the data with a confirmation from the user 3110 to the authorities to provide enhanced security while participating, transacting or trading forward transportation or freight as a commodity. In some embodiments the user may toggle between the GUI 210 market view screen in FIG. 4 and other menu 270 options and settings by the user 3110 selecting the hamburger button 270 and the GUI 210 detecting the user 3110 input or contact. In some embodiments the GUI 210 may instantiate instructions in the memory of the mobile computing device 3111 which then transmits transportation or freight capacity data through the network 3140 or wireless GPS network 3150 to call upon instruction routines and instruction sub-routines on the transportation forward market database server 3130, virtual hub database server 3120, network member database server 160, no arbitrage condition database server 3180 and/or instructions in the memory of the cloud and local CPUs 3190 which all interface together to make one system which may deliver transportation or freight capacity units to users 3110 from and to a plurality of virtual hubs 410, 422 with a plurality of specifications 427 at specific market prices.

Figure 5:
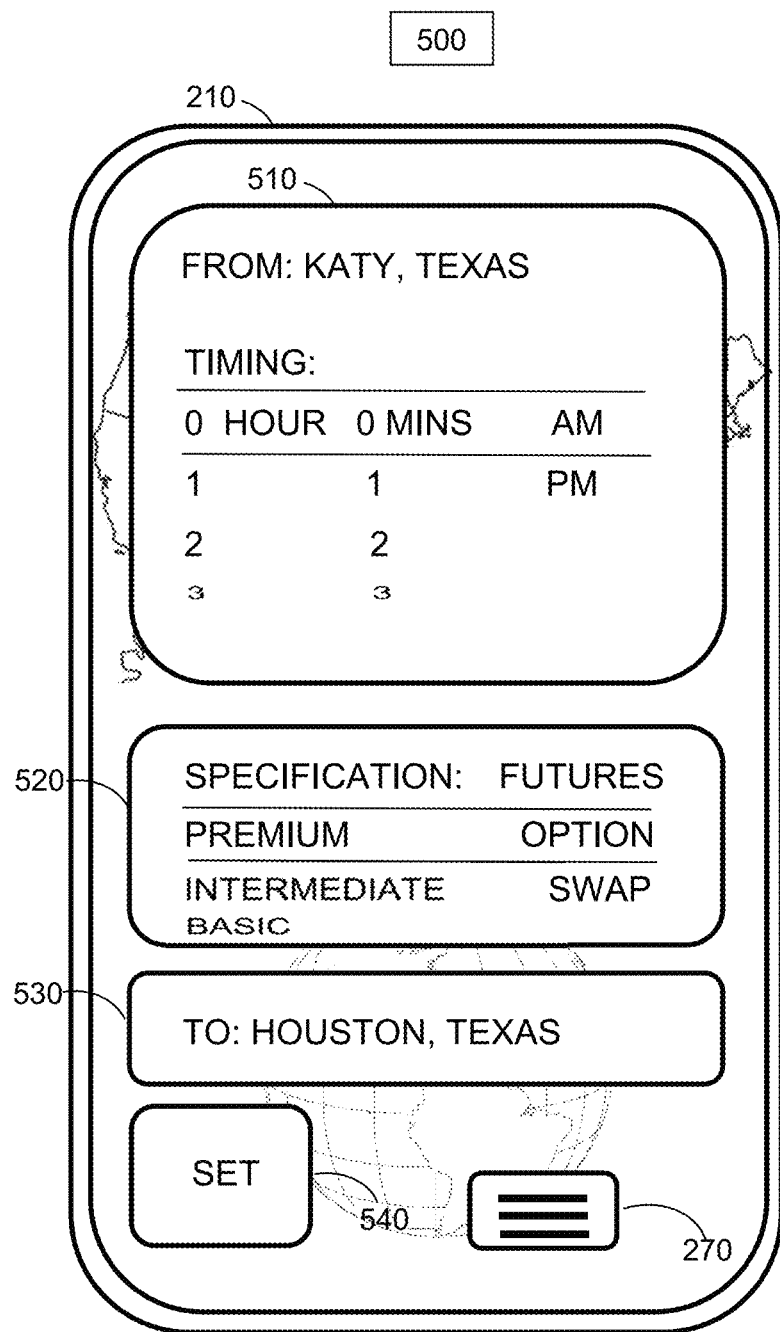
FIG. 5 illustrates an exemplary user interface to select a specification grade of transportation or freight capacity with various timing specifications and option, swap, forward or futures specification in accordance with some embodiments.

FIG. 5 illustrates an exemplary user interface 210 for listing timing specifications 510 on a portable multifunction device in accordance with some embodiments. In some embodiments, user interface 210 includes the following elements, or a subset or superset thereof:

Origin/From virtual hub timing 510;
Specification of quality of transportation capacity 520;
Destination/To virtual hub 530;
Setting button 540 to transmit the timings 510 and quality specification grade 520;
Hamburger button 270 to instruct the GUI 210 to take the user 3110 to the menu screen.

In some embodiments, the user 3110 may select a plurality of timing options in the timing selection specification 510. The timing specification constraint may be the time at which the transportation or freight capacity unit departs from the origin/from virtual hub 410. As in any commodity market, if a user 3110 is late and they have purchased the transportation capacity unit, the user must still pay for the transportation or freight capacity unit regardless if the user 3110 is present at the time of departure or not. The user has the option if they know they will be late to sell back the transportation or freight capacity unit to the market at the then current price. Accordingly, for the purpose of example, but not limiting by example, if a user 3110 bought a transportation capacity unit for £9.90 421 and the user 3110 realized they would be late for the 8 am departure specification 427, then the user 3110 may either pay for the transportation unit even though the user 3110 was present and did not take delivery of the transportation unit, or the user 3110 may preemptively sell back the transportation capacity unit to the market at the then current bid price 418. The user 3110 would then have offset their obligation in a timely manner and another user 3110 on the network 3140, 3160 may then purchase the available transportation or freight capacity unit. In some embodiments, virtual transportation or freight hub combination units may or may not have the available liquidity if the user 3110 were to wait too long before delivery of the transportation capacity unit to make an adjustment and therefore may need to take delivery even if they are not present. In some embodiments, the user 3110 may select a grade or type specification 520. For the purpose of example, but not limiting by example, a plurality of specification grades may exist such as "premium" which may be defined by certain classes of transportation capacity units and/or certain quality levels. Similarly, for the purpose of example, but not limiting by example, a plurality of specification grades may exist such as "intermediate" or "basic" which may be defined by certain classes of transportation or freight capacity units and/or certain quality levels. Specification types such as futures, options, swaps, forwards and other derivatives may also be selected in the specification 520. In some embodiments, the user 3110 may select the destination/to virtual hub 530 to change the virtual hub combination. In some embodiments, the user 3110, may contact the "set" button 540 to transmit the transportation capacity unit specification data by using the GUI 210 which may instantiate instructions in the memory of the mobile computing device 3111 which then transmits transportation capacity data through the network 3140 or wireless GPS network 3150 to call upon instruction routines and instruction sub-routines on the transportation forward market database server 3130, virtual hub database server 3120, network member database server 3160, no arbitrage condition database server 3180 and/or instructions in the memory of the cloud and local CPUs 3190 which all interface together to make one system which may deliver transportation capacity units to users 3110 from and to a plurality of virtual hubs 410, 422 with a plurality of specifications at specific market prices.

Figure 6:
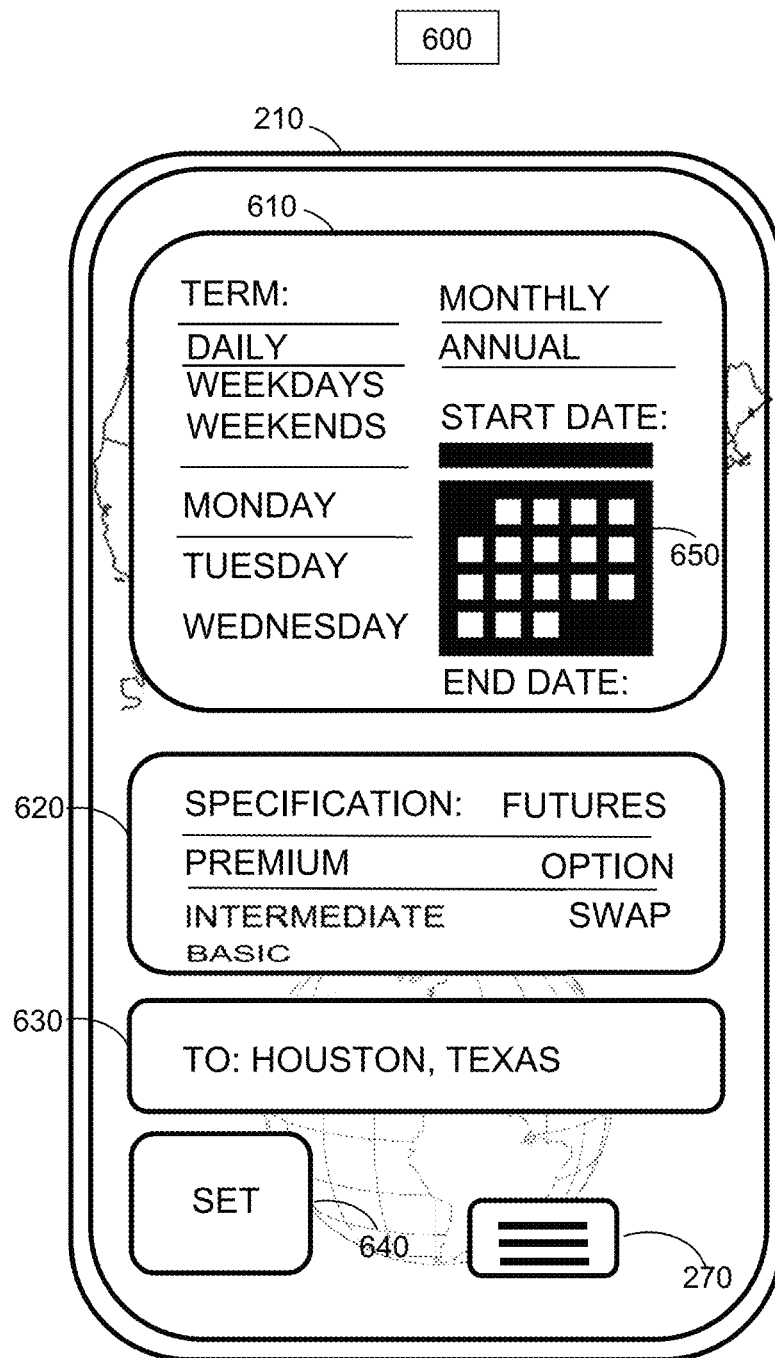
FIG. 6 illustrates an exemplary user interface with various term specifications and option, swap, forward or futures specification for transportation or freight capacity in accordance with some embodiments.

FIG. 6 illustrates an exemplary user interface 210 for selecting the term specification 610 on a portable multifunction device in accordance with some embodiments. In some embodiments, user interface 210 includes the following elements, or a subset or superset thereof:

Term specification options 610;
Specification of quality and type of transportation or freight capacity 620;
Destination/To virtual hub 630;
Setting button 640 to transmit the term 610 and quality specification grade 620;
Calendar button 650 to select specification start dates and end dates for a plurality of virtual transportation or freight hub combinations;
Hamburger button 270 to instruct the GUI 210 to take the user 3110 to the menu screen.

In some embodiments, the term specification 610 may be used to participate, transact and/or trade in a specific virtual hub combination for a specific time period specification. Users 3110 may set the term to daily, weekly, monthly, annual, weekdays, weekends, specific days such as Monday, Tuesday, Wednesday, Thursday, Friday, Saturday, Sunday or any combination of term selections the user 3110 sets as relevant for participating, transacting or trading in the transportation or freight capacity unit market. Not limiting by example, but for use of illustrating a possible subset of term selections, the user 3110 may select "weekdays" 610 during a specific calendar time period 650 of a given year. In some embodiments, specific time start dates and end dates may be set by the user with the calendar button 650. In some embodiments a user 3110 may select "Mondays" 610 within a specification date window 650. In some embodiments, the user 3110 may select "weekends" 610 during a specification calendar window of dates 650. In some embodiments, the transportation capacity unit specification may include transportation capacity unit grade such as premium, intermediate and basic as well as transaction type for futures, options, swaps, forwards and other derivatives 620. In some embodiments, the user 3110, may contact the "set" button 640 to transmit the transportation or freight capacity unit specification data by using the GUI 210 which may instantiate instructions in the memory of the mobile computing device 3111 which then transmits transportation capacity data through the network 3140 or wireless GPS network 3150 to call upon instruction routines and instruction sub-routines on the transportation forward market database server 3130, virtual hub database server 3120, network member database server 3160, no arbitrage condition database server 3180 and/or instructions in the memory of the cloud and local CPUs 3190 which all interface together to make one system which may deliver transportation capacity units to users 3110 from and to a plurality of virtual hubs 410, 422 with a plurality of specifications at specific market prices.

Figure 7:
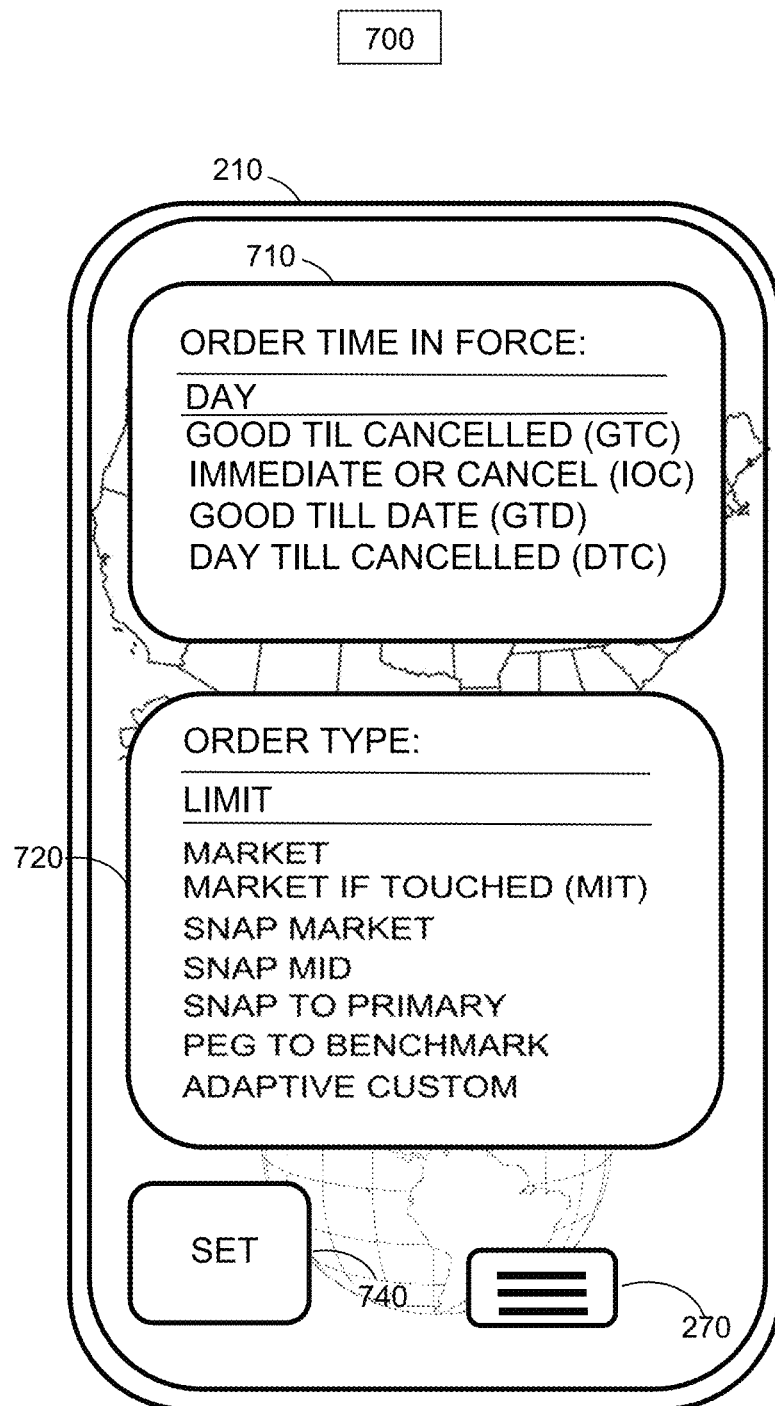
FIG. 7 illustrates an exemplary user interface with various order types and order time in force designations for transportation or freight capacity in accordance with some embodiments.

FIG. 7 illustrates an exemplary user interface 210 for selecting order time in force order types 710 as well as order types 720 on a portable multifunction device in accordance with some embodiments. In some embodiments, user interface 210 includes the following elements, or a subset or superset thereof:

Order time in force specification options 710;

Order type specification options 720;

Setting button 740 to transmit the order time in force specification 710 and Order type specification option 720;

Hamburger button 270 to instruct the GUI 210 to take the user 3110 to the menu screen.

In some embodiments, user interface 210 may be used by the user 3110 to select a plurality of order time in force 710 specifications. In some embodiments, order time in force selections 710 may include a subset or superset thereof: day (DAY) order 710; good till cancelled order (GTC) 710; immediate or cancel order (1OC) 710; good till date order (GTD) 710; day till cancelled order (DTC) 710. Order time in force 710 specifications may be used to designate how long a user 3110 order may be valid. In some embodiments, the GUI 210 may display the definitions of a plurality of order time in force 710 characteristics so that the user 3110 may select the appropriate order time in force 710 specification for the transportation or freight capacity unit that the user 3110 may participate, transact and/or trade. In some embodiments, the user interface 210 may be used to select the order type 720 specifications. In some embodiments, order type selections 720 may include a subset or superset thereof: Limit 720, Market 720, Market if Touched (MIT) 720; Snap to Market 720; Snap to Mid 720; Snap to primary 720; Peg to benchmark 720; adaptive custom 720. In some embodiments, the GUI 210 may display the definitions of a plurality of order types 720 characteristics so that the user 3110 may select the appropriate order type 720 specification for the transportation or freight capacity unit that the user 3110 may participate, transact and/or trade. In some embodiments, the user 3110, may contact the "set" button 740 to transmit the transportation or freight capacity unit specification data by using the GUI 210 which may instantiate instructions in the memory of the mobile computing device 3111 which then transmits transportation or freight capacity data through the network 3140 or wireless GPS network 3150 to call upon instruction routines and instruction sub-routines on the transportation forward market database server 3130, virtual hub database server 3120, network member database server 3160, no arbitrage condition database server 3180 and/or instructions in the memory of the cloud and local CPUs 3190 which all interface together to make one system which may deliver transportation capacity units to users 3110 from and to a plurality of virtual hubs 410, 422 with a plurality of specifications at specific market prices.

Figure 8:
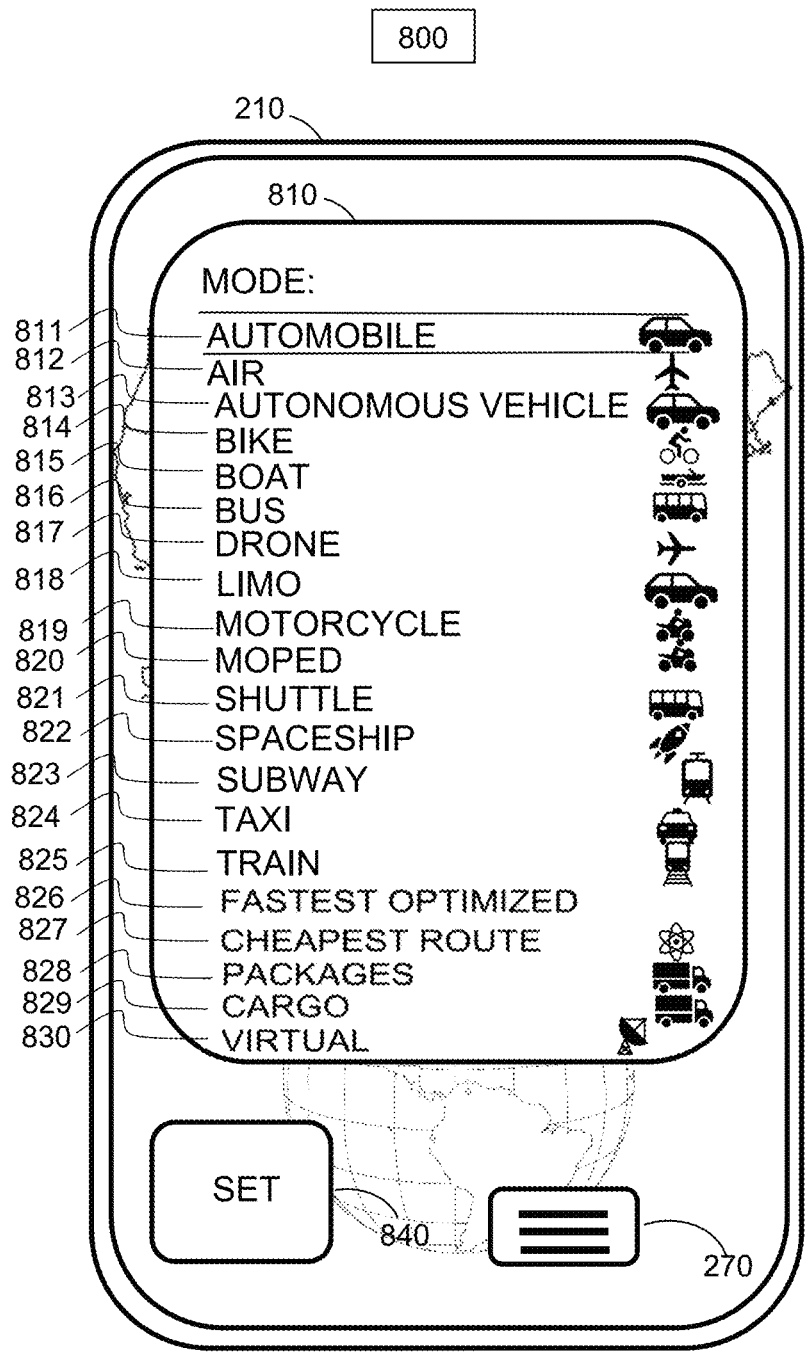
FIG. 8 illustrates an exemplary user interface with various modes of transportation or freight capacity in accordance with some embodiments.

FIG. 8 illustrates an exemplary user interface 210 for selecting virtual hub transportation capacity unit modes 810 on a portable multifunction device in accordance with some embodiments. In some embodiments, user interface 210 includes the following elements, or a subset or superset thereof:

Virtual hub transportation capacity unit modes 810;

Setting button 840 to transmit the virtual hub transportation capacity unit modes 810;

Hamburger button 270 to instruct the GUI 210 to take the user 3110 to the menu screen.

In some embodiments, user interface 210 may be used by the user 3110 to select a plurality of virtual hub transportation capacity unit modes 810 specifications. In some embodiments, virtual hub transportation capacity unit mode selections 810 may include a subset or superset thereof: Automobile 811; air 812; autonomous vehicle 813; bike 814; boat 815; bus 816; drone 817; limo 818; motorcycle 819; moped 820; shuttle 821; space 822; subway 823; taxi 824; train 825; fastest optimized 826; cheapest route 827; packages 828; cargo 829; virtual 830. In some embodiments, virtual hub transportation capacity unit modes are simply that a user 3110 would have a virtual transportation or freight capacity unit seat in an automobile or an airplane as examples, but not limiting by example. In some embodiments, the user 3110 may bid on cargo 829 or package capacity 828 in any mode of transportation or freight capacity between a combination of virtual transportation hub locations. In some embodiments, the user 3110 may use one or multiple modes of transportation between a combination of virtual transportation hub capacity points. In some embodiments, the user 3110, may contact the "set" button 840 to transmit the transportation or freight capacity unit specification mode data by using the GUI 210 which may instantiate instructions in the memory of the mobile computing device 3111 which then transmits transportation capacity data through the network 3140 or wireless GPS network 3150 to call upon instruction routines and instruction sub-routines on the transportation forward market database server 3130, virtual hub database server 3120, network member database server 3160, no arbitrage condition database server 3180 and/or instructions in the memory of the cloud and local CPUs 3190 which all interface together to make one system which may deliver transportation or freight capacity units to users 3110 from and to a plurality of virtual hubs 410, 422 with a plurality of specifications at specific market prices.

Figure 9:
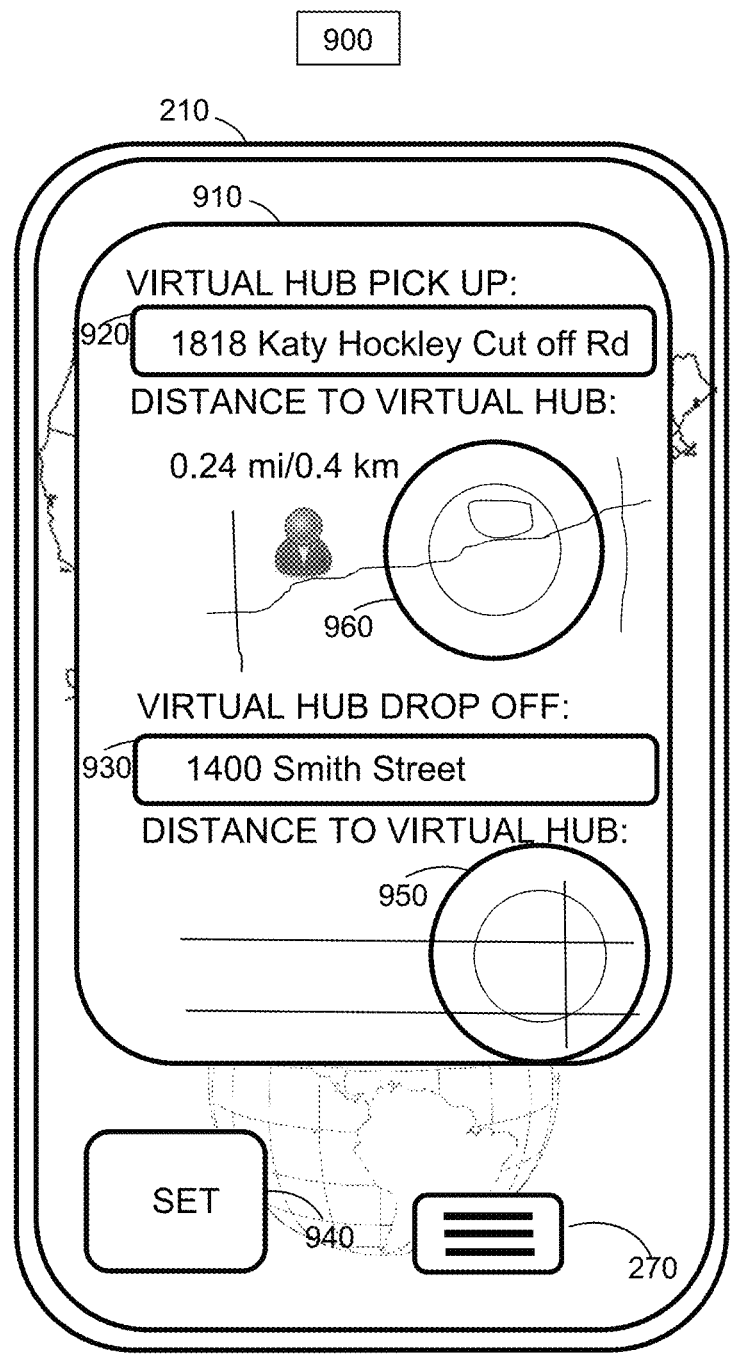
FIG. 9 illustrates an exemplary user interface with the distance between the user and a virtual hub pick up point for transportation or freight capacity as well as the distance between a user and a virtual drop off point for transportation or freight capacity in accordance with some embodiments.

FIG. 9 illustrates an exemplary user interface 210 for identifying the distance the user 3110 is from the virtual hub from a map and distance perspective on a portable multifunction device in accordance with some embodiments. In some embodiments, user interface 210 includes the following elements, or a subset or superset thereof:

Virtual hub transportation capacity unit pick up display 910;

Virtual hub transportation capacity unit pick up address 920;

Virtual hub transportation capacity unit drop off address 930;

Virtual hub transportation capacity pick-up target zone 960;

Virtual hub transportation capacity drop-off target zone 950;

Setting button 940 to transmit the virtual hub transportation capacity unit addresses 920, 930;

Hamburger button 270 to instruct the GUI 210 to take the user 3110 to the menu screen.

In some embodiments, user interface 210 may be used by the user 3110 to select a plurality of virtual hub transportation capacity unit address 910 specifications. In some embodiments, virtual hub transportation or freight capacity unit address selections 910 may include a subset or superset thereof: virtual hub pick up address 920; virtual hub drop off address 930. In some embodiments, virtual hub transportation capacity unit addresses 920 and 930 may be changed before delivery of a virtual transportation capacity unit. The user interface map and address tool 910 displays the users 3110 distance from the address of the virtual transportation or freight hub as well as a map to assist the user 3110 in finding the location of the virtual transportation hub. In some embodiments, user interface 210 displays the virtual hub pick up zone 960 on a map in context to the user's 3110 location. In some embodiments, user interface 210 displays the virtual hub drop off zone 950 on a map in context to the user's 3110 location. In some embodiments, the user 3110, may contact the "set" button 940 to transmit the transportation capacity unit specification address data by using the GUI 210 which may instantiate instructions in the memory of the mobile computing device 3111 which then transmits transportation or freight capacity data through the network 3140 or wireless GPS network 3150 to call upon instruction routines and instruction sub-routines on the transportation forward market database server 3130, virtual hub database server 3120, network member database server 3160, no arbitrage condition database server 3180 and/or instructions in the memory of the cloud and local CPUs 3190 which all interface together to make one system which may deliver transportation or freight capacity units to users 3110 from and to a plurality of virtual hubs 410, 422 with a plurality of specifications at specific market prices.

Figure 10:
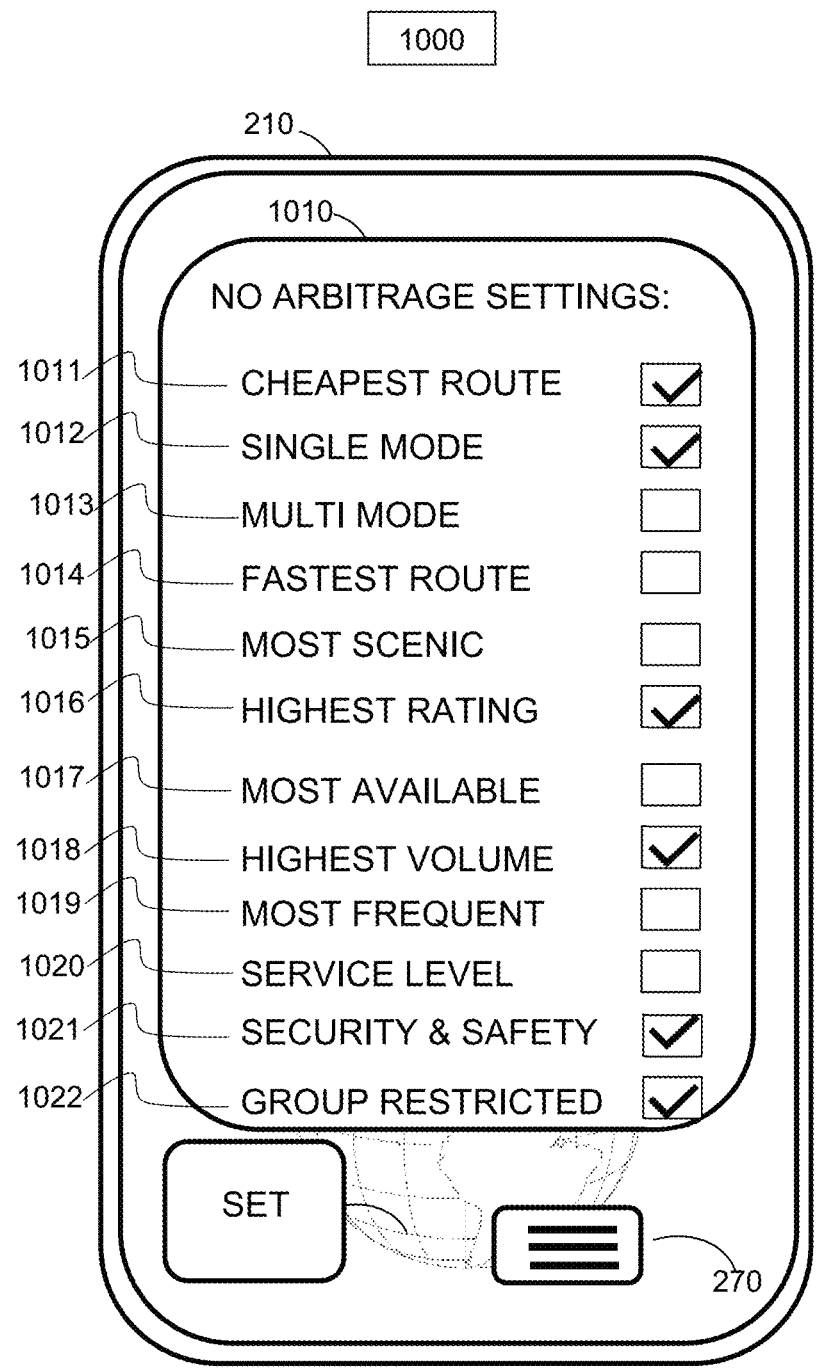
FIG. 10 illustrates an exemplary user interface for settings and constraints of the transportation or freight capacity trading method and system in accordance with some embodiments.

FIG. 10 illustrates an exemplary user interface 210 for identifying the constraints and no arbitrage settings 1010 the user 3110 selects on a portable multifunction device in accordance with some embodiments. In some embodiments, user interface 210 includes the following elements, or a subset or superset thereof:

Constraint and no arbitrage settings 1010;

Setting button 1040 to transmit the virtual hub transportation capacity constraints and no arbitrage settings;

Hamburger button 270 to instruct the GUI 210 to take the user 3110 to the menu screen.

In some embodiments, user interface 210 may be used by the user 3110 to select a plurality of virtual hub transportation capacity constraint and no arbitrage settings 1010. In some embodiments, virtual hub transportation capacity unit constraint and no arbitrage selections 1010 may include a subset or superset thereof: cheapest route 1011; single mode 1012; multi-mode 1013; fastest route 1014; most scenic 1015; highest rating 1016; most available 1017; highest volume 1018; most frequent 1019; service level 1020; security and safety 1021. In some embodiments, the "cheapest route setting" 1011 instantiates instructions in the memory of the CPU 3190 to complete a standard cost minimization linear program to assist the user 3110 to complete the transportation capacity unit between two virtual hubs with the lowest cost. In some embodiments, the "single mode" 1012 instantiates instructions in the memory of the CPU 3190 to set a constraint for the user 3110 to complete the transportation capacity unit between two virtual hubs with the only one mode of transportation. In some embodiments, the "multi mode" 1013 instantiates instructions in the memory of the CPU 3190 to set a constraint for the user 3110 to complete the transportation capacity unit between two virtual hubs with more than one mode of transportation. In some embodiments, the "fastest route" 1014 instantiates instructions in the memory of the CPU 3190 to complete standard linear programming equation to minimize travel time for the user 3110 to complete the transportation capacity unit between two virtual hubs with the shortest time. In some embodiments, the "most scenic" 1015 instantiates instructions in the memory of the CPU 3190 to complete an algorithm with the highest ratings for scenery to assist the user 3110 to complete the transportation capacity unit between two virtual hubs with highest scenery rating. In some embodiments, the "highest rating" 1016 instantiates instructions in the memory of the CPU 3190 to complete a rating algorithm to assist the user 3110 to complete the transportation capacity unit between two virtual hubs with the highest rating. In some embodiments, the "most available" 1017 instantiates instructions in the memory of the CPU 3190 to complete a algorithm to search for the route with the most open transportation capacity units to assist the user 3110 to complete the transportation capacity unit between two virtual hubs with the most available open seats or open transportation capacity units. In some embodiments, the "highest volume" 1018 instantiates instructions in the memory of the CPU 3190 to complete an algorithm to select the route with the highest volume of participants to assist the user 3110 to complete the transportation capacity unit between two virtual hubs with the largest number of users 3110. In some embodiments, the "most frequent" 1019 instantiates instructions in the memory of the CPU 3190 to complete most frequent route analysis from a timing constraint perspective to assist the user 3110 to complete the transportation capacity unit between two virtual hubs with the most frequent departures. In some embodiments, the "service level" 1020 instantiates instructions in the memory of the CPU 3190 to align the constraint to select the service level to assist the user 3110 to complete the transportation capacity unit between two virtual hubs with the correct level of service. In some embodiments, the "security and safety" 1021 instantiates instructions in the memory of the CPU 3190 to run safety and security algorithms on the user's 3110 based on block chain performance of drivers and riders to assist the user 3110 to complete the transportation capacity unit between two virtual hubs with the highest level of safety and security. In some embodiments, the "group restricted" 1022 instantiates instructions in the memory of the CPU 3190 to run grouping limitation algorithms on the user's 3110 market auction based on limiting the pool of drivers and riders or freight providers and shippers to assist the user 3110 to complete the transportation or freight capacity unit between two virtual hubs with a limit on the pool of available users. A user 3110 pool for group restricted 1022 settings may limit the user pool displayed by email, security, sex, rating or a plurality of other restrictions. In some embodiments, the user 3110, may contact the "set" button 1040 to transmit the transportation or freight capacity unit specification constraint and arbitrage data by using the GUI 210 which may instantiate instructions in the memory of the mobile computing device 3111 which then transmits transportation capacity security and safety data through the network 3140 or wireless GPS network 3150 to call upon instruction routines and instruction sub-routines on the transportation forward market database server 3130, virtual hub database server 3120, network member database server 160, no arbitrage condition database server 3180 and/or instructions in the memory of the cloud and local CPUs 3190 which all interface together to make one system which may deliver transportation or freight capacity units to users 3110 from and to a plurality of virtual hubs 410, 422 with a plurality of specifications at specific market prices in an auction format.

Figure 11:
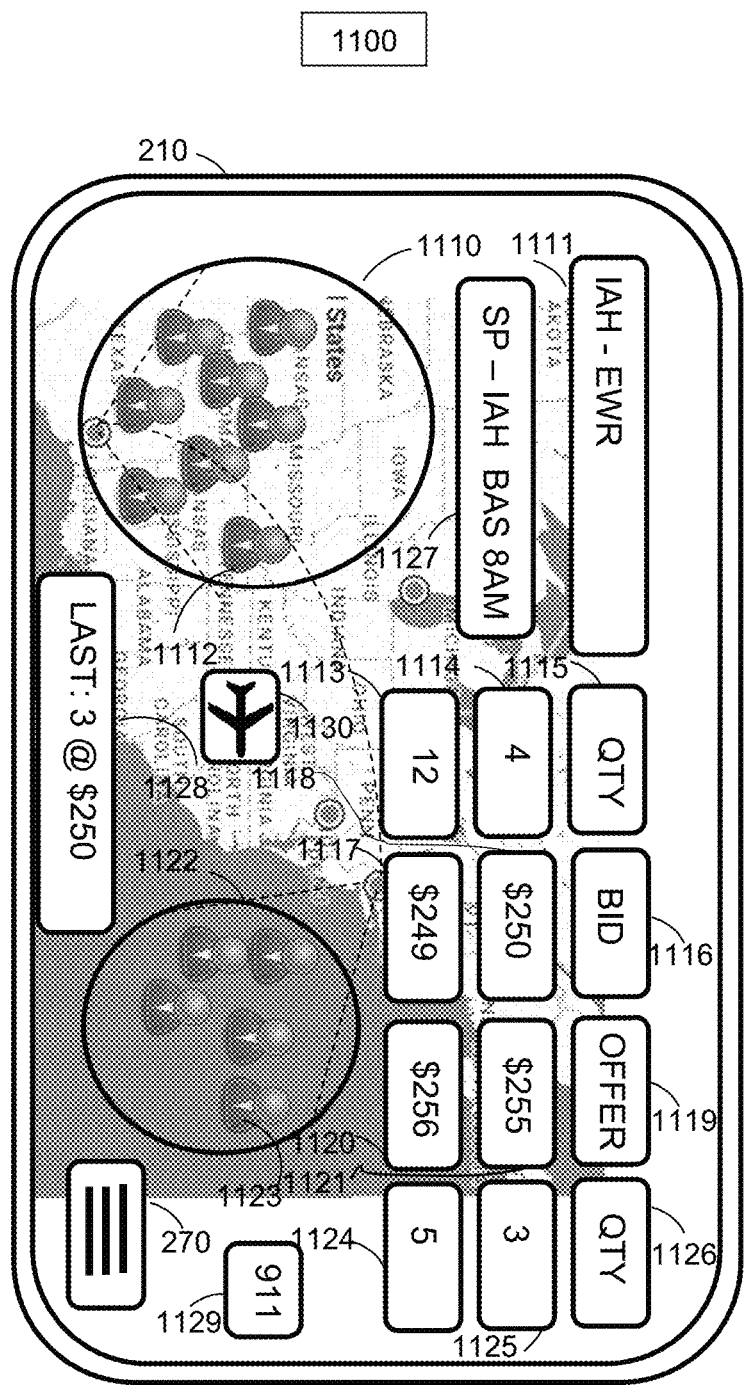
FIG. 11 illustrates an exemplary user interface for transacting and trading domestic air travel transportation or air freight capacity in accordance with some embodiments.

FIG. 11 illustrates exemplary user interfaces 210 for participating, transacting and/or trading transportation or freight as a physical forward commodity between combinations of virtual hubs over various transportation modes. In some embodiments, user interface 210 includes the following elements, or a subset or superset thereof:

Exemplary virtual hub combination 1111;

Exemplary virtual hub origin/from location 1 with users 1112 within the virtual hub location 1110;

Exemplary specification summary of the market, level of service and time of delivery commencement 1127;

Exemplary mode of air transportation or freight capacity type 1130;

Exemplary transaction summary of the last trades quantity and price 1128;

Exemplary virtual hub destination/to location 1122 and user who is being delivered on the transportation capacity unit 1123;

Exemplary bid/buy quantity title header 1115 for an exemplary virtual transportation hub market;

Exemplary bid/buy price title header 1116 for an exemplary virtual transportation or freight hub market;

[own] Exemplary offer/sell price title header 1119 for an exemplary virtual transportation or freight hub market;

Exemplary offer/sell quantity title header 1126 for an exemplary virtual transportation or freight hub market;

Exemplary bid/buy quantity 1114 for the best bid quantity from a plurality of users 3110 for an exemplary respective transportation or freight capacity virtual hub combination 1111;

Exemplary bid/buy quantity 1113 for the second-best bid quantity from a plurality of users 3110 for an exemplary respective transportation or freight capacity virtual hub combination 1111;

Exemplary bid/buy price 1118 for the best bid price from a plurality of users 3110 for an exemplary respective transportation or freight capacity virtual hub combination 1111;

Exemplary bid/buy price 1117 for the second-best bid price from a plurality of users 3110 for an exemplary respective transportation or freight capacity virtual hub combination 1111;

Exemplary offer/sell price 1121 for the best offer price from a plurality of users 3110 for an exemplary respective transportation or freight capacity virtual hub combination 1111;

Exemplary offer/sell price 1120 for the second-best offer price from a plurality of users 3110 for an exemplary respective transportation or freight capacity virtual hub combination 1111;

Exemplary offer/sell quantity 1125 for the best offer quantity from a plurality of users 3110 for an exemplary respective transportation or freight capacity virtual hub combination 1111;

Exemplary offer/sell quantity 1124 for the second-best offer quantity from a plurality of users 3110 for an exemplary respective transportation or freight capacity virtual hub combination 1111;

Exemplary safety dispatch "911" button 1129 to enact video and audio recording of the user 3110 environment and dispatch of that information to authorities.

Exemplary hamburger menu button 270 to move back to menu options and settings away from the participation, transaction, trading auction GUI 210 embodiment.

In some embodiments the user 3110 may enter a transaction quantity and price for transportation or freight capacity units to participate, transact and/or trade by the GUI 210 detecting user 3110 contact or audio interface with a bid/buy price 1118 or offer/sell price 1121. The GUI 210 detects user 3110 contact with any of the GUI 210 buttons which have been aforementioned. Upon user 3110 contact or audio interface with buttons on the GUI 210, instructions are instantiated which allow the user 3110 to change the specifications of the respective virtual hub combination 1111. A plurality of prices and markets may be presented based on a plurality of contract specifications by way of example but not limiting by example specifications for transportation capacity units may include swaps, options, forwards and futures 1127. In some embodiments, the best bid/buy price 1118 may be moving up in price or down in price depending on the market conditions at any given time. In some embodiments the last trade or last transacted price for a given specification is listed to help the user 3110 understand how the market is moving so that the user 3110 may submit a competitive offer/selling price 1121 or bid/buying price 1118. In some embodiments, users 3110 may adjust settings of the GUI 210 to show more bid/buying prices 1117 or more offer/selling prices 1120. In some embodiments the matrix of market quantities and prices 1113, 1114, 1115, 1116, 1117, 1118, 1119, 1120, 1121, 1124, 1125, 1126 may be referred to as market depth in the GUI 210 embodiment. In some embodiments the number of users 3110 may be displayed as user icons 1112 or 1123 for the amount of people logged in which desire to transact, trade or participate in a given virtual hub 1110 to virtual hub 1122 combination. In some embodiments, users 3110 may select the transportation mode 1130 such that the user allows a market for only one form of transportation capacity as a commodity or the user 3110 may allow the system to show multiple forms of transportation capacity between two virtual transportation capacity hubs 1110, 1111, 1122. In some embodiments the GUI 210 may detect a user 3110 selecting the 911 button 1129 which may activate voice and video recording functions on the mobile or stationary device 3111 and transmit the data with a confirmation from the user 3110 to the authorities to provide enhanced security while participating, transacting or trading forward transportation as a commodity. In some embodiments the user may toggle between the GUI 210 market view screen in FIG. 3 and other menu 270 options and settings by the user 3110 selecting the hamburger button 270 and the GUI 210 detecting the user 3110 input or contact or audio instruction. In some embodiments the GUI 210 may instantiate instructions in the memory of the mobile computing device 3111 which then transmits transportation or freight capacity data through the network 3140 or wireless GPS network 3150 to call upon instruction routines and instruction sub-routines on the transportation forward market database server 3130, virtual hub database server 3120, network member database server 3160, no arbitrage condition database server 3180 and/or instructions in the memory of the cloud and local CPUs 3190 which all interface together to make one system which may deliver transportation capacity units to users 3110 from and to a plurality of virtual hubs 1110, 1122 with a plurality of specifications at specific market prices.

Figure 12:
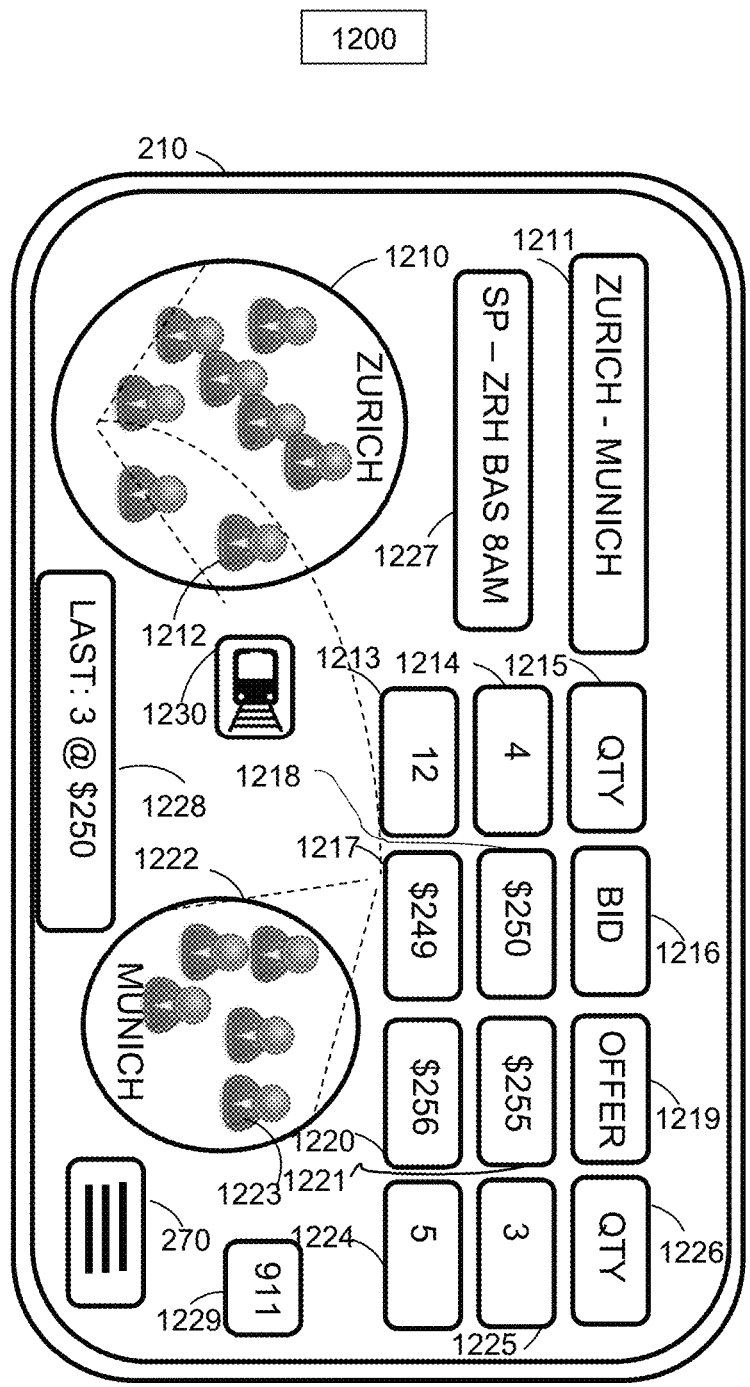
FIG. 12 illustrates an exemplary user interface for transacting and trading international train transportation or train freight capacity in accordance with some embodiments.

FIG. 12 illustrates exemplary user interfaces 210 for participating, transacting and/or trading transportation as a physical forward commodity between combinations of virtual hubs over various transportation modes. In some embodiments, user interface 210 includes the following elements, or a subset or superset thereof:

Exemplary virtual hub combination 1211;

Exemplary virtual hub origin/from location 1210 with users 1212 within the virtual hub location 1210;

Exemplary specification summary of the market, level of service and time of delivery commencement 1227;

Exemplary mode of train transportation capacity type 1230;

Exemplary transaction summary of the last trades quantity and price 1228;

Exemplary virtual hub destination/to location 1222 and user who is being delivered on the transportation or freight capacity unit 1223;

Exemplary bid/buy quantity title header 1215 for an exemplary virtual transportation or freight hub market;

Exemplary bid/buy price title header 1216 for an exemplary virtual transportation or freight hub market;

Exemplary offer/sell price title header 1219 for an exemplary virtual transportation or freight hub market;

Exemplary offer/sell quantity title header 1226 for an exemplary virtual transportation for freight hub market;

Exemplary bid/buy quantity 1214 for the best bid quantity from a plurality of users 3110 for an exemplary respective transportation or freight capacity virtual hub combination 1211;

Exemplary bid/buy quantity 1213 for the second-best bid quantity from a plurality of users 3110 for an exemplary respective transportation or freight capacity virtual hub combination 1211;

Exemplary bid/buy price 1218 for the best bid price from a plurality of users 3110 for an exemplary respective transportation or freight capacity virtual hub combination 1211;

Exemplary bid/buy price 1217 for the second-best bid price from a plurality of users 3110 for an exemplary respective transportation or freight capacity virtual hub combination 1211;

Exemplary offer/sell price 1221 for the best offer price from a plurality of users 3110 for an exemplary respective transportation or freight capacity virtual hub combination 1211;

Exemplary offer/sell price 1220 for the second-best offer price from a plurality of users 3110 for an exemplary respective transportation or freight capacity virtual hub combination 1211;

Exemplary offer/sell quantity 1225 for the best offer quantity from a plurality of users 3110 for an exemplary respective transportation or freight capacity virtual hub combination 1211;

Exemplary offer/sell quantity 1224 for the second-best offer quantity from a plurality of users 3110 for an exemplary respective transportation or freight capacity virtual hub combination 1211;

Exemplary safety dispatch "911" button 1229 to enact video and audio recording of the user 3110 environment and dispatch of that information to authorities.

Exemplary hamburger menu button 270 to move back to menu options and settings away from the participation, transaction, trading GUI 210 embodiment.

In some embodiments the user 3110 may enter a transaction quantity and price for transportation or freight capacity units to participate, transact and/or trade by the GUI 210 detecting user 3110 contact with a bid/buy price 1218 or offer/sell price 1221. The GUI 210 detects user 3110 contact with any of the GUI 210 buttons which have been aforementioned. Upon user 3110 contact with buttons or audio interface on the GUI 210, instructions are instantiated which allows the user 3110 to change the specifications of the respective virtual hub combination 1211. A plurality of prices and markets may be presented based on a plurality of contract specifications by way of example but not limiting by example specifications for transportation capacity units may include swaps, options, forwards and futures 1227. In some embodiments, the best bid/buy price 1118 may be moving up in price or down in price depending on the market conditions at any given time. In some embodiments the last trade or last transacted price for a given specification is listed to help the user 3110 understand how the market is moving so that the user 3110 may submit a competitive offer/selling price 1221 or bid/buying price 1214. In some embodiments, users 3110 may adjust settings of the GUI 210 to show more bid/buying prices 1217 or more offer/selling prices 1120. In some embodiments the matrix of market quantities and prices 1213, 1214, 1215, 1216, 1217, 1218, 1219, 1220, 1221, 1224, 1225, 1226 may be referred to as market depth in the GUI 210 embodiment. In some embodiments the number of users 3110 may be displayed as user icons 1212 or 1223 for the amount of people logged in which desire to transact, trade or participate in a given virtual hub 1210 to virtual hub 1222 combination. In some embodiments, users 3110 may select the transportation mode 1230 such that the user allows a market for only one form of transportation capacity as a commodity or the user 3110 may allow the system to show multiple forms of transportation capacity between two virtual transportation capacity hubs 1210, 1211, 1222. In some embodiments the GUI 210 may detect a user 3110 selecting the 911 button 1229 which may activate voice and video recording functions on the mobile or stationary device 3111 and transmit the data with a confirmation from the user 3110 to the authorities to provide enhanced security while participating, transacting or trading forward transportation or freight units as a commodity. In some embodiments the user may toggle between the GUI 210 market view screen in FIG. 3 and other menu 270 options and settings by the user 3110 selecting the hamburger button 270 and the GUI 210 detecting the user 3110 input or contact or audio instructions. In some embodiments the GUI 210 may instantiate instructions in the memory of the mobile computing device 3111 which then transmits transportation or freight capacity data through the network 3140 or wireless GPS network 3150 to call upon instruction routines and instruction sub-routines on the transportation forward market database server 3130, virtual hub database server 3120, network member database server 3160, no arbitrage condition database server 3180 and/or instructions in the memory of the cloud and local CPUs 3190 which all interface together to make one system which may deliver transportation or freight capacity units to users 3110 from and to a plurality of virtual hubs 1210, 1222 with a plurality of specifications at specific market prices.

Figure 13:
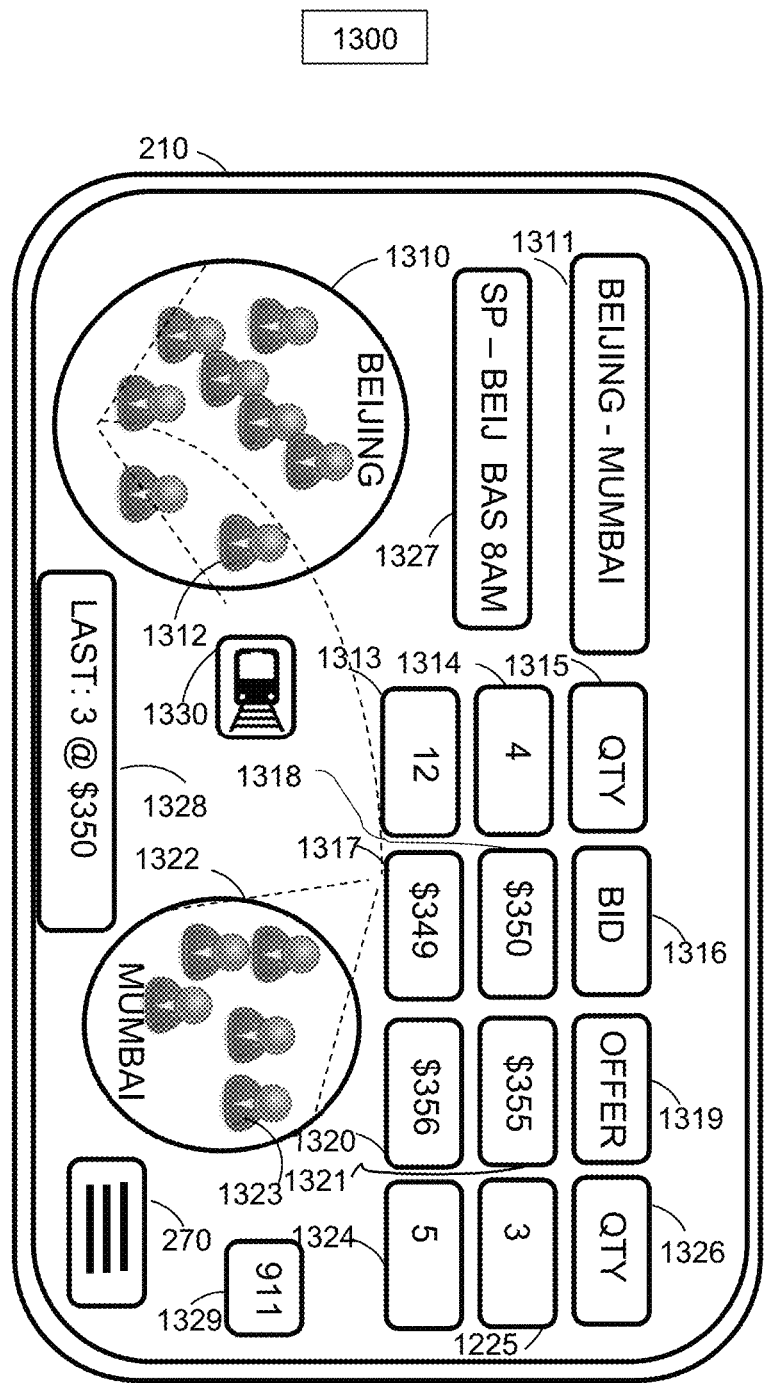
FIG. 13 illustrates an exemplary user interface for transacting and trading international train transportation or train freight capacity in accordance with some embodiments.

FIG. 13 illustrates exemplary user interfaces 210 for participating, transacting and/or trading transportation as a physical forward commodity between combinations of virtual hubs over various transportation modes. In some embodiments, user interface 210 includes the following elements, or a subset or superset thereof:

Exemplary virtual hub combination 1311;

Exemplary virtual hub origin/from location 1310 with users 1312 within the virtual hub location 1310;

Exemplary specification summary of the market, level of service and time of delivery commencement 1327;

Exemplary mode of train transportation capacity type 1330;

Exemplary transaction summary of the last trades quantity and price 1328;

Exemplary virtual hub destination/to location 1322 and user who is being delivered on the transportation or freight capacity unit 1323;

Exemplary bid/buy quantity title header 1315 for an exemplary virtual transportation or freight hub market;

Exemplary bid/buy price title header 1316 for an exemplary virtual transportation or freight hub market;

Exemplary offer/sell price title header 1319 for an exemplary virtual transportation or freight hub market;

Exemplary offer/sell quantity title header 1326 for an exemplary virtual transportation or freight hub market;

Exemplary bid/buy quantity 1314 for the best bid quantity from a plurality of users 3110 for an exemplary respective transportation or freight capacity virtual hub combination 1311;

Exemplary bid/buy quantity 1313 for the second-best bid quantity from a plurality of users 3110 for an exemplary respective transportation or freight capacity virtual hub combination 1311;

Exemplary bid/buy price 1318 for the best bid price from a plurality of users 3110 for an exemplary respective transportation or freight capacity virtual hub combination 1311;

Exemplary bid/buy price 1317 for the second-best bid price from a plurality of users 3110 for an exemplary respective transportation or freight capacity virtual hub combination 1311;

Exemplary offer/sell price 1321 for the best offer price from a plurality of users 3110 for an exemplary respective transportation or freight capacity virtual hub combination 1311;

Exemplary offer/sell price 1320 for the second-best offer price from a plurality of users 3110 for an exemplary respective transportation or freight capacity virtual hub combination 1311;

Exemplary offer/sell quantity 1325 for the best offer quantity from a plurality of users 3110 for an exemplary respective transportation or freight capacity virtual hub combination 1311;

Exemplary offer/sell quantity 1324 for the second-best offer quantity from a plurality of users 3110 for an exemplary respective transportation or freight capacity virtual hub combination 1311;

Exemplary safety dispatch "911" button 1329 to enact video and audio recording of the user 3110 environment and dispatch of that information to authorities.

Exemplary hamburger menu button 270 to move back to menu options and settings away from the participation, transaction, trading GUI 210 embodiment.

In some embodiments the user 3110 may enter a transaction quantity and price for transportation or freight capacity units to participate, transact and/or trade by the GUI 210 detecting user 3110 contact or audio instructions with a bid/buy price 1318 or offer/sell price 1321. The GUI 210 detects user 3110 contact with any of the GUI 210 buttons which have been aforementioned. Upon user 3110 contact or audio interface with buttons or audio instructions on the GUI 210, instructions are instantiated which allows the user 3110 to change the specifications of the respective virtual hub combination 1311. A plurality of prices and markets may be presented based on a plurality of contract specifications by way of example but not limiting by example specifications for transportation capacity units may include swaps, options, forwards and futures 1327. In some embodiments, the best bid/buy price 1318 may be moving up in price or down in price depending on the market conditions at any given time. In some embodiments the last trade or last transacted price for a given specification is listed to help the user 3110 understand how the market is moving so that the user 3110 may submit a competitive offer/selling price 1321 or bid/buying price 1314. In some embodiments, users 3110 may adjust settings of the GUI 210 to show more bid/buying prices 1317 or more offer/selling prices 1320. In some embodiments the matrix of market quantities and prices 1313, 1314, 1315, 1316, 1317, 1318, 1319, 1320, 1321, 1324, 1325, 1326 may be referred to as market depth in the GUI 210 embodiment. In some embodiments the number of users 3110 may be displayed as user icons 1312 or 1323 for the amount of people logged in which desire to transact, trade or participate in a given virtual hub 1310 to virtual hub 1322 combination. In some embodiments, users 3110 may select the transportation mode 1330 such that the user allows a market for only one form of transportation capacity as a commodity or the user 3110 may allow the system to show multiple forms of transportation or freight capacity between two virtual transportation capacity hubs 1310, 1311, 1322. In some embodiments the GUI 210 may detect a user 3110 selecting the 911 button 1329 which may activate voice and video recording functions on the mobile or stationary device 111 and transmit the data with a confirmation from the user 3110 to the authorities to provide enhanced security while participating, transacting or trading forward transportation or freight as a commodity. In some embodiments the user may toggle between the GUI 210 market view screen in FIG. 3 and other menu 270 options and settings by the user 3110 selecting the hamburger button 270 and the GUI 210 detecting the user 3110 input or contact. In some embodiments the GUI 210 may instantiate instructions in the memory of the mobile computing device 3111 which then transmits transportation or freight capacity data through the network 3140 or wireless GPS network 3150 to call upon instruction routines and instruction sub-routines on the transportation forward market database server 3130, virtual hub database server 3120, network member database server 3160, no arbitrage condition database server 3180 and/or instructions in the memory of the cloud and local CPUs 3190 which all interface together to make one system which may deliver transportation or freight capacity units to users 3110 from and to a plurality of virtual hubs 1310, 1322 with a plurality of specifications at specific market prices.

Figure 14:
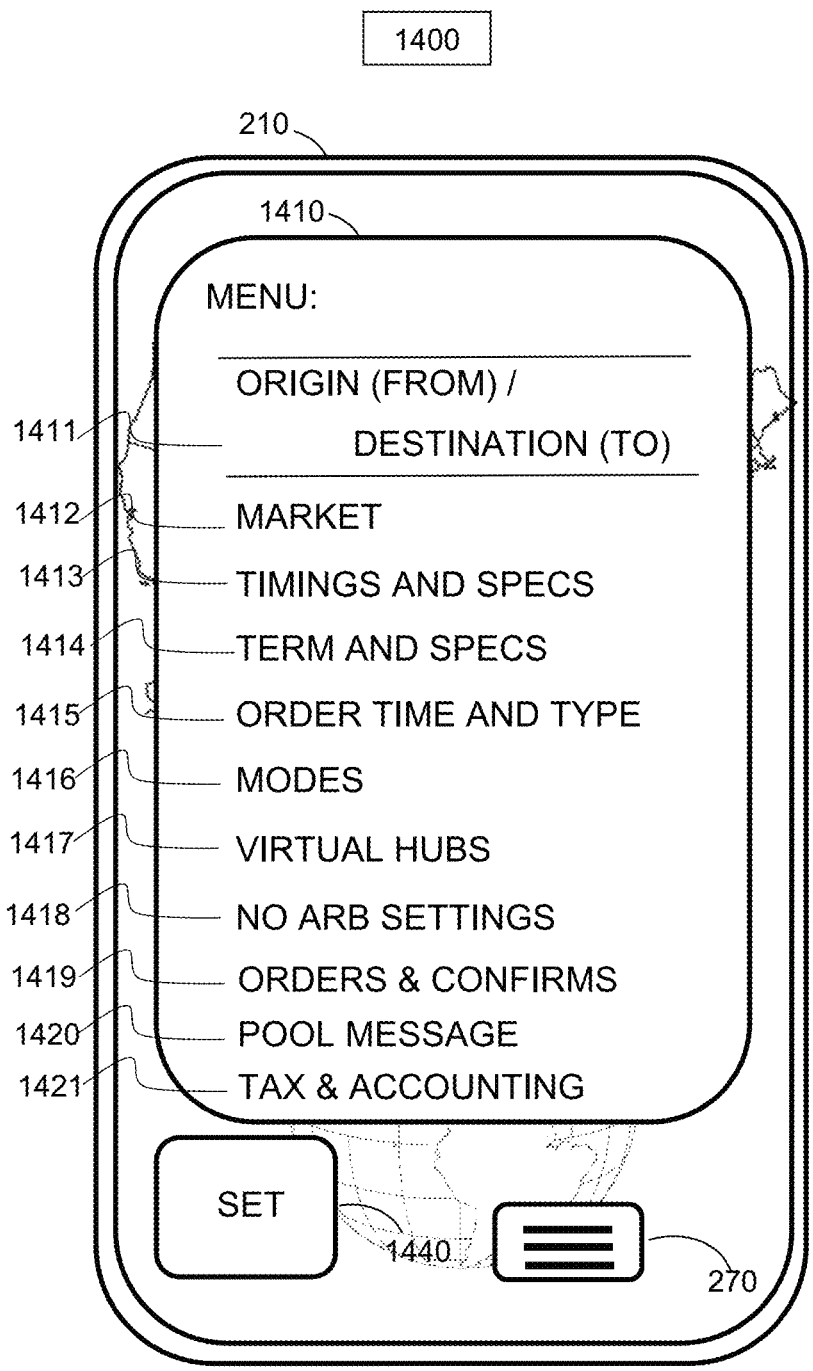
FIG. 14 illustrates an exemplary user interface for transacting and trading various menu options within the system and method in accordance with some embodiments.

FIG. 14 illustrates an exemplary user interface 210 for selecting menu options 1410 on a portable multifunction device in accordance with some embodiments. In some embodiments, user interface 210 includes the following elements, or a subset or superset thereof:

Menu options 1410;
Origin (From)/Destination (to) menu option 1411; Market menu option 1412;
Timings and Specs menu option 1413;
Term and Specs menu option 1414;
Order time and type menu option 1415;
Modes menu option 1416;
Virtual Hubs menu option 1417;
No arb settings menu option 1418;
Orders and Confirms menu option 1419;
Pool Message menu option 1420;
Tax and Accounting menu option 1421;
Setting button 1440 to transmit the menu option;

Hamburger button 270 to instruct the GUI 210 to take the user 3110 to the menu screen.

In some embodiments, user interface 210 may be used by the user 3110 to select a plurality of menu options 1410. In some embodiments, the user 3110 may select the origin (from)/destination (to) menu option 1411 which may instruct the GUI 210 to go to an address input rendering 910 and/or FIG. 2. In some embodiments, the user 3110, may contact the "market" menu option 1412 which my instruct the GUI 210 to render a market participation, transaction and/or trading screen such as 300, 400, 1100, 1200, or 1300. In some embodiments the user may toggle between the GUI 210 market view screen in FIG. 3 and other menu 270 options and settings by the user 3110 selecting the hamburger button 270 and the GUI 210 detecting the user 3110 input or contact. In some embodiments, the user 3110, may contact the "timings and specs" menu option 1413 which may instruct the GUI 210 to render a timings and specs screen such as 500. In some embodiments, the user 3110, may contact the "term and specs" menu option 1414 which may instruct the GUI 210 to render a term and specs screen such as 600. In some embodiments, the user 3110, may contact the "order time and type" menu option 1415 which may instruct the GUI 210 to render an order time and type screen such as 700. In some embodiments, the user 3110, may contact the "modes" menu option 1416 which may instruct the GUI 210 to render a mode screen such as 800. In some embodiments, the user 3110, may contact the "Virtual Hubs" menu option 1417 which may instruct the GUI 210 to render a virtual hubs screen such as 900. In some embodiments, the user 3110, may contact the "no arb settings" menu option 1418 which may instruct the GUI 210 to render a no arbitrage constraint screen such as 1000. In some embodiments, the user 3110, may contact the "orders and confirms" menu option 1419 which may instruct the GUI 210 to render the market orders and transaction confirmations for the user 3110. In some embodiments, the user 3110, may contact the "pool message" menu option 1420 which may instruct the GUI 210 to message either the actual transportation capacity unit 170 or the opposite seller user 3110 or buyer user 3110 depending on if the user 3110 was an opposite buyer or seller of the transportation capacity unit. In some embodiments, the user 3110, may contact the "tax and accounting" menu option 1421 which may instruct the GUI 210 to render tax and accounting information for the respective user 3110. In some embodiments the GUI 210 menu option selection 1410 may instantiate instructions in the memory of the mobile computing device 3111 which then transmits transportation capacity data through the network 3140 or wireless GPS network 3150 to call upon instruction routines and instruction sub-routines on the transportation forward market database server 3130, virtual hub database server 3120, network member database server 3160, no arbitrage condition database server 3180 and/or instructions in the memory of the cloud and local CPUs 3190 which all interface together to make one system which may deliver transportation or freight capacity units to users 3110 from and to a plurality of virtual hubs 410, 422 with a plurality of specifications at specific market prices.

Figure 15:
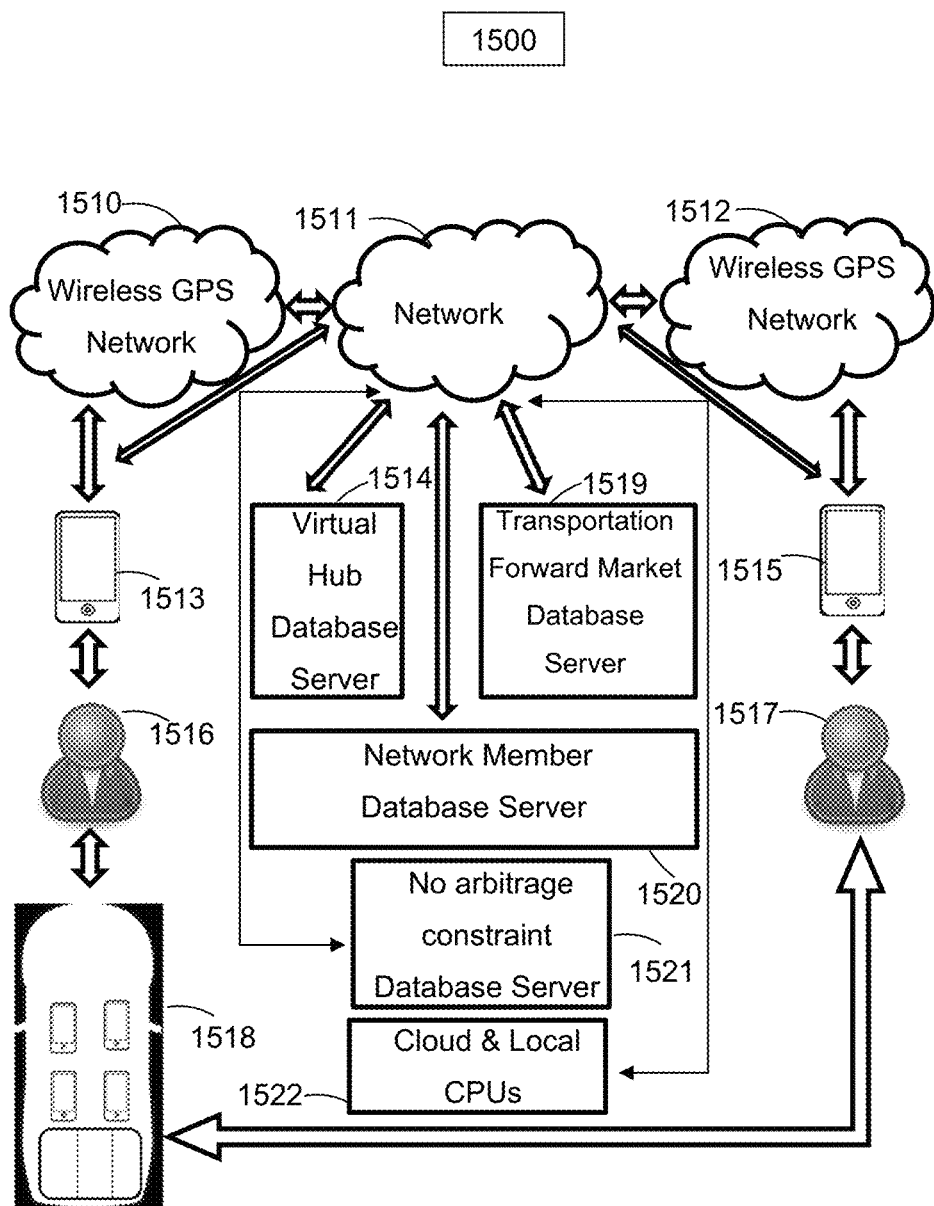
FIG. 15 illustrates a schematic diagram of a network configuration and implementations of methods which support the method and system of trading transportation capacity in accordance with some embodiments.

FIG. 15 illustrates an exemplary network configuration 1500 in one exemplary implementation of participating, transacting and/or trading transportation or freight capacity units in accordance with some embodiments. In some embodiments, network configuration 1500 includes the following elements, or a subset or superset thereof:

Wireless global positioning system (GPS) network 1510;
Network/s 1511;
Additional global positioning system (GPS) network 1512;
User member portable multifunction device 1513;
Virtual hub database server 1514;
Transportation forward market database server 1519;
Additional user member portable multifunction device 1515;
Network member database server 1520;
Network member user 1516;
Additional network member user 1517;
No arbitrage constraint database server 1521;
Cloud and Local CPUs 1522;
Transportation or freight capacity unit mode 1518.

In some embodiments, the software and/or instructions stored in memory of the cloud & local CPUs 1522 and portable multifunction devices 1513, 1515 may include additional instructions to instantiate specification requirements, participation, transactions, and/or trading on the transportation or freight capacity unit network 1511. In some embodiments, instructions may include standard database web services with the database as service provider (i.e. calling from the outside in, which lets the client GUI 210 or 1513 call each of the virtual hub database server 1514 and/or transportation forward market database server 1519 and/or network member database server 1520 and/or no arbitrage constraint database server 1521 and/or cloud & local CPUs 1522 through the wireless GPS network 1510 or network 1511. In some embodiments, each of the virtual hub database server 1514 and/or transportation forward market database server 1519 and/or network member database server 1520 and/or no arbitrage constraint database server 1521 and/or cloud & local CPUs 1522 may instruct the network to instantiate the database servers 1514, 1519, 1520, 1521, 1522 as service consumers (i.e. calling from the inside out, which lets a SQL query or application module in the database session consume an external web service. In some embodiments, users 1516 and/or 1517 may use portable multifunction devices 1513 and/or 1515 to access the transportation or freight capacity unit market GUI 210 so that the users 1516 and/or 1517 may participate, transact and/or trade transportation or freight capacity units. In some embodiments, the virtual hub database server 1514 stores map tile data in addition to user location data which is utilized by the GUI 210 to display or render location of virtual hubs and user 1516 proximity to those virtual hubs 200, 300, 400, 900, 1100, 1200, 1300. In some embodiments, the transportation forward market database server 1519 stores bid and offer data for respective quantities of users as well as transaction data and a plurality of market data for each virtual hub combination. In some embodiments, the network member database server 1520 stores user profile, user transaction, user trade, user settings, user specifications, user rating, user criminal history or background check data or facial recognition data or fingerprint recognition data or photo scan recognition data or ride history data, user track record, user bank data, user credit card data, user history data, user tax data and a plurality of other data. In some embodiments, the no arbitrage constraint database server 1521 stores data and algorithms to identify user 3110 constraints 1000 and run algorithm calculations for users on specific constraints to check for compliance with constraints. In some embodiments, network servers and CPUs 1514, 1519, 1520, 1521, 1522, 1513, 1515 my interface through the network 1511 and/or wireless GPS networks 1510, 1512 such that transportation or freight capacity units may be participated in, transacted and/or traded efficiently in the context of a market for transportation capacity units. Included aforementioned data elements may be a subset or superset of data used for any specific calculation to participate, transact or trade transportation or freight capacity units.

Figure 16:
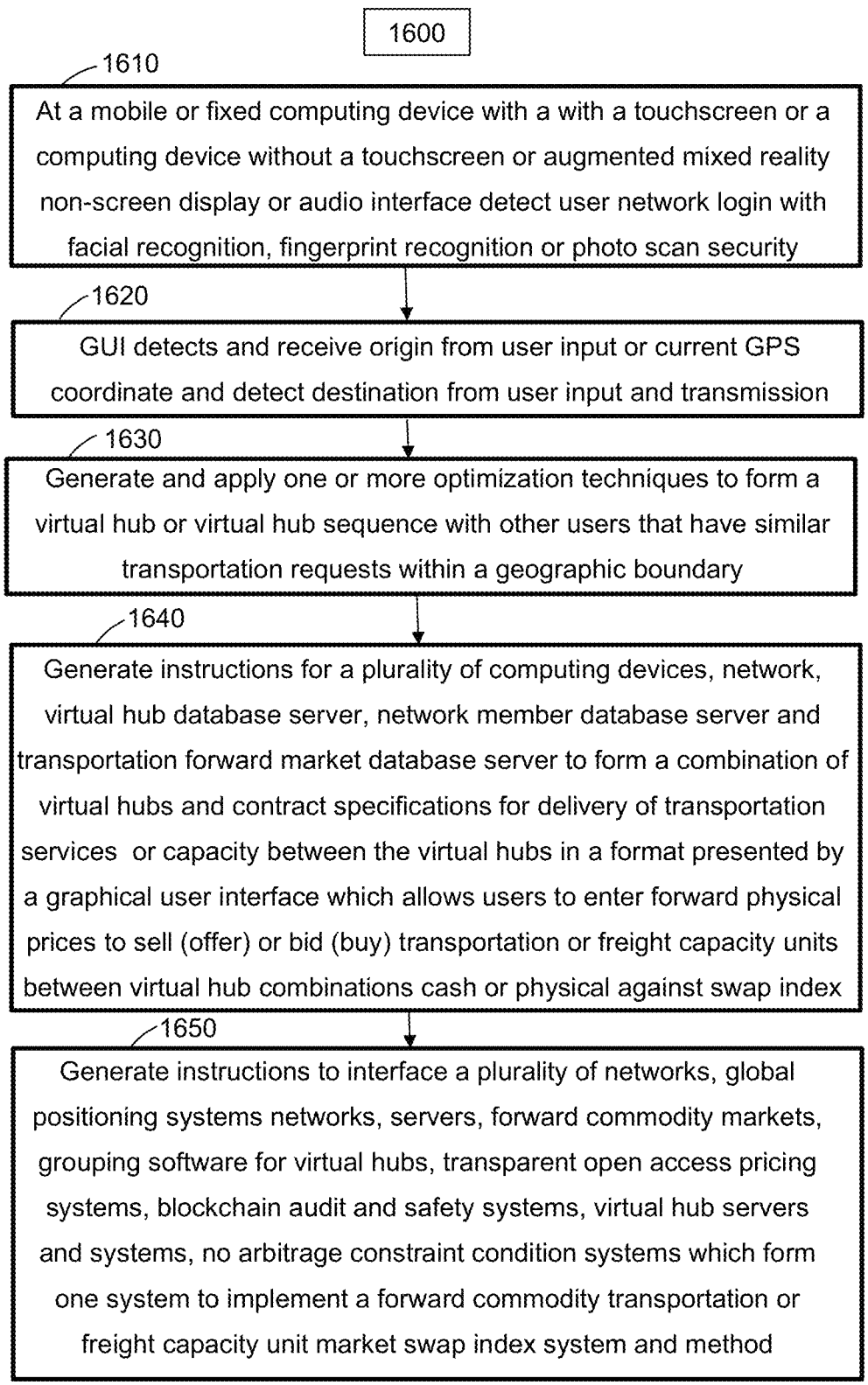
FIG. 16 is a flow diagram illustrating methods exemplary users move through while participating, transacting and trading transportation or freight capacity as option, swap, forward or futures specification with an index in accordance with some embodiments.

FIG. 16 illustrates a flowchart embodiment of steps a user may perform to participate, transact and/or trade transportation capacity units between virtual hub combinations. In some embodiments a user at a mobile or portable multifunction device and/or fixed computing device with a touchscreen or a computing device without a touchscreen or augmented, audio interface computing device, mixed reality non-screen display may detect user login to the transportation capacity unit network 1610. In some embodiments, the GUI of the transportation capacity unit network may detect and receive origin location from user input or current GPS coordinate information and detect destination address from user input and transmission of data 1620. In some embodiments, the GUI and/or CPUs and/or databases may generate and apply one or more optimization techniques to form a virtual hub with other users that have similar transportation requests within a geographic boundary 1630. In some embodiments, the GUI and/or CPUs and or databases may generate instructions for a plurality of computing devices, network, virtual hub database server, network member database server and transportation forward market database server 130 to form a combination of virtual hubs and contract specifications for delivery of transportation services or transportation or freight capacity between the virtual hubs in a format presented by a graphical user interface which allows users to enter forward physical prices to sell (offer) or bid (buy) transportation capacity units between virtual hub combinations 1640 in an open market auction format. In some embodiments, the GUI and/or CPUs and or databases may generate instructions to interface a plurality of networks, global positioning systems networks, servers, forward commodity market auctions, grouping instruction software for virtual hubs, transparent open access pricing systems, blockchain audit and safety systems, virtual hub servers and systems, no arbitrage constraint condition systems which form one system to implement a forward commodity transportation or freight capacity unit forward market system and method 1650.

Figure 17:
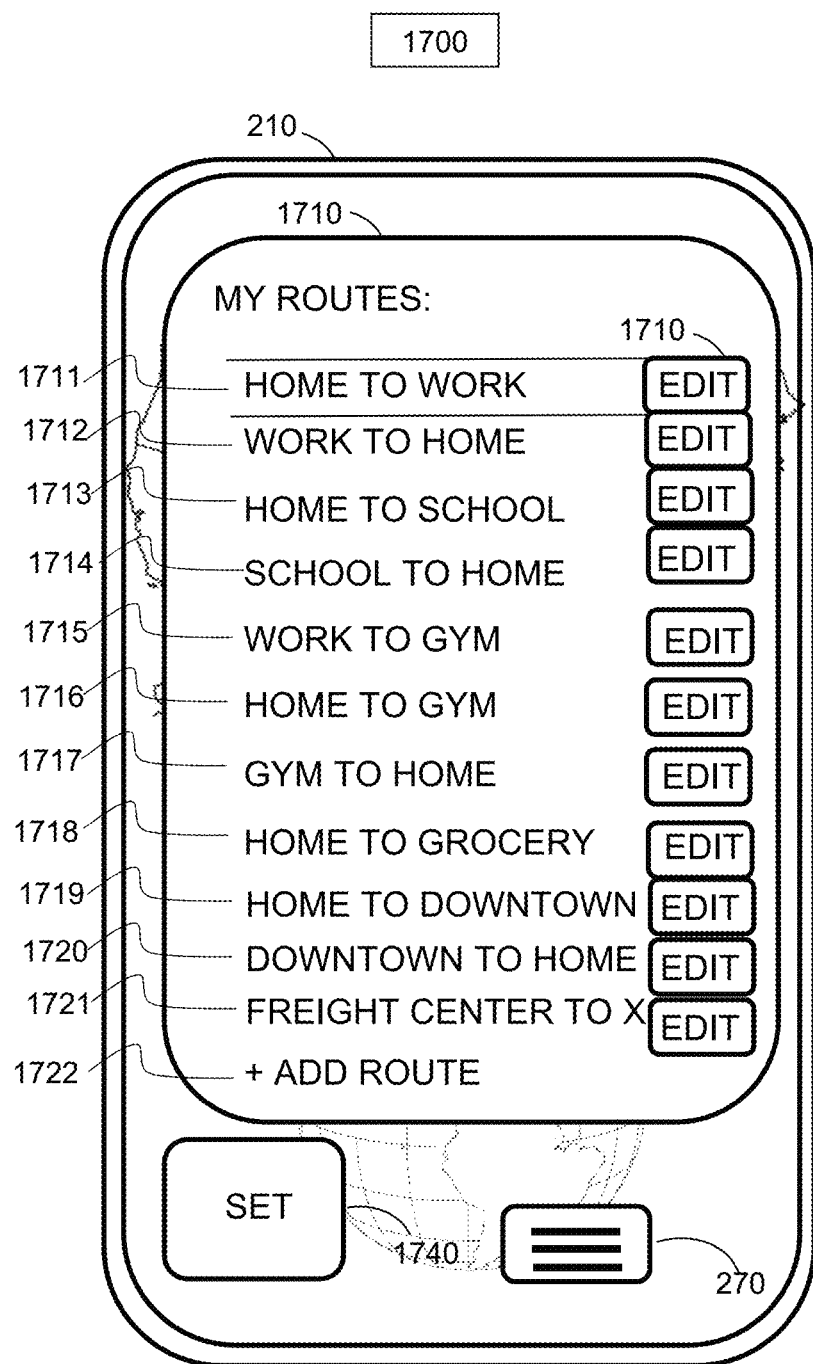
FIG. 17 illustrates an exemplary user interface for displaying most frequent routes in accordance with some embodiments.

FIG. 17 illustrates an exemplary embodiment of a user 3110 most frequent transportation or freight unit routes 1710 in one exemplary implementation of participating, transacting and/or trading transportation or freight capacity units in accordance with some embodiments. In some embodiments, most frequent my routes include the following elements, or a subset or superset thereof:

Home to Work 1711;
Work to Home 1712;
Home to School 1713;
School to Home 1714;
Work to Gym 1715;
Home to Gym 1716;
Gym to Home 1717;
Home to Grocery 1718;
Home to Downtown 1719;
Downtown to Home 1720;
Freight Center to X where X is a delivery route or multi virtual hub combination 1721;
+Add Route 1722;
Edit 1723;
Setting button 1740 to transmit the My Routes data;
Hamburger button 270 to instruct the GUI 210 to take the user 3110 to the menu screen.

In some embodiments, the GUI 210 may be used to select, store and/or edit user 3110 frequent or preferred routes ("MY ROUTES") 1710 for more efficient access to transportation capacity unit markets over various modes and specifications of transportation capacity. In some embodiments, the user 3110 may select, store and/or edit address and specification data for "Home to Work" 1711 and/or "Work to Home" 1712 and/or "Home to School" 1713 and/or "School to Home" 1714 and/or "Work to Gym" 1715 and/or "Home to Gym" 1716 and/or "Gym to Home" 1717 and/or "Home to Grocery" 1718 and/or "Home to Downtown" 1719 and/or "Downtown to Home" 1720 and/or "Freight Center to X" 1721 and/or "+Add Route" 1722. In some embodiments, the My Routes 1710 module may include any route a user 3110 may request on any transportation or freight capacity unit mode and/or specification. In some embodiments the user may toggle between the GUI 210 market view screen in FIG. 3 and other menu 270 options and settings by the user 3110 selecting the hamburger button 270 and the GUI 210 detecting the user 3110 input or contact.

Figure 18:
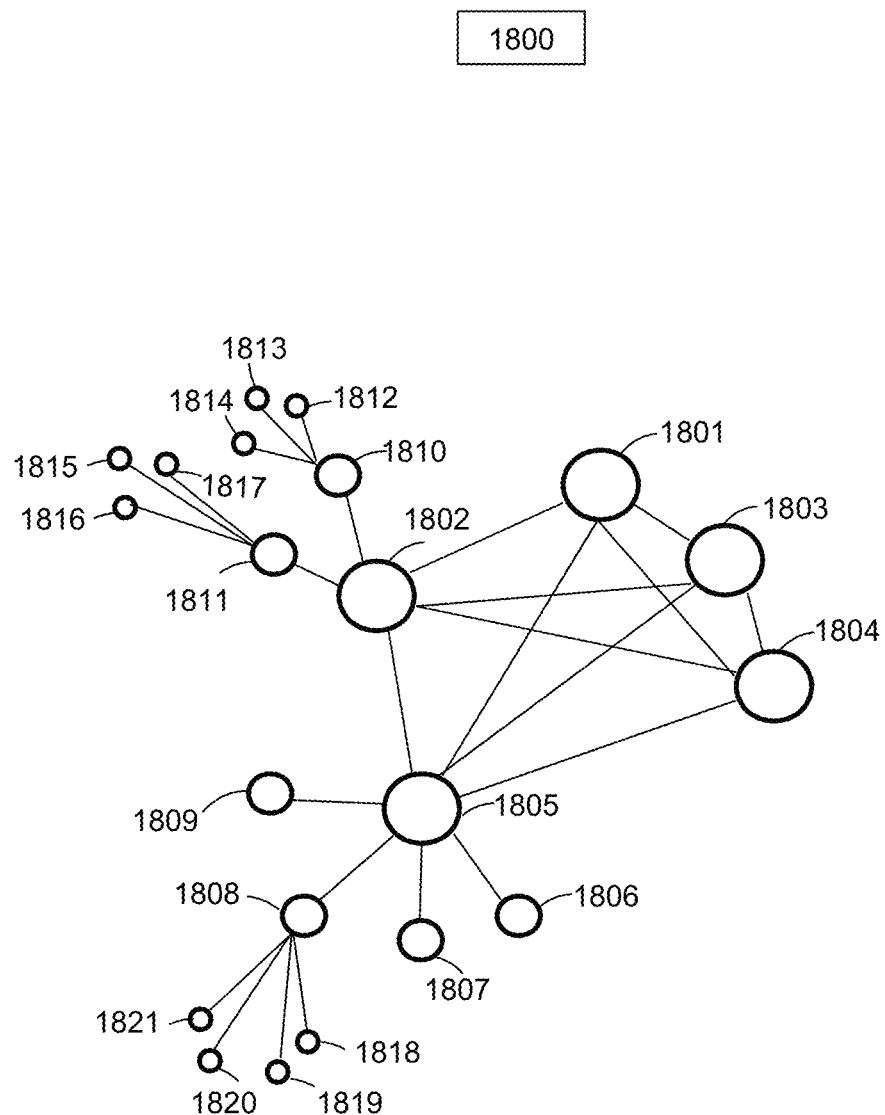
FIG. 18 illustrates an exemplary network topology of a virtual hub combination or series of multiple virtual hub combinations for use in the market auction platform for forward transportation or freight capacity method in accordance with some embodiments.

FIG. 18 illustrates an exemplary network topology configuration 1800 in one exemplary implementation of participating, transacting and/or trading transportation or freight capacity units in accordance with some embodiments. In some embodiments, network configuration 1800 includes the following elements, or a subset or superset thereof:

Large Virtual Hub nodes such as 1801, 1802, 1803, 1804, 1805;

Medium Virtual Hub nodes such as 1810, 1811, 1809, 1808, 1807, 1806;

Small Virtual Hub nodes such as 1812, 1813, 1814, 1815, 1816, 1816, 1817, 1818, 1819, 1820, 1821;

In some embodiments, the overall network node topology 1800 is comprised of large virtual hub nodes 1801, 1802, 1803, 1804, 1805 and medium virtual hub nodes 1810, 1811, 1809, 1808, 1807, 1806 and small virtual hub nodes 1812, 1813, 1814, 1815, 1816, 1816, 1817, 1818, 1819, 1820, 1821, or a subset or superset thereof. In some embodiments a user may input a starting point of 1815 and an ending point of 1818 which represent specific geographic virtual hub locations in a city, multiple cities or even countries or multiple countries. In some embodiments, forward transportation market auctions may occur directly between two exemplary points such as 1815 and 1818 or the method and system may combine a series of smaller auctions to comprise a larger auction between two endpoints on the system. In some embodiments, a series of smaller auctions may be combined between 1815 and 1811 as well as 1811 and 1802 as well as 1802 and 1805 as well as 1805 and 1808 as well as 1808 and 1818 which would be added together to make a combined virtual hub auction. A combined series of smaller auctions may be constrained by instructions which form auctions based on cheapest transportation or freight route 1011, single mode transport or freight auctions 1012, multi-mode transport or freight 1013, fastest transport or freight constraints 1014, most scenic auctions 1015, highest rating auctions 1016, most available or liquid auctions 1017, highest volume auctions 1018, most frequent auctions 1019, service level auctions 1020, security and safety level auctions 1021, group restricted auctions by sex, email, organization, gender or other 1022. In some embodiments, the constraints allow for many types of auctions which are unique and novel for transportation and freight capacity units in a forward transportation and freight market. In some embodiments, the user 3110 may specify instructions that set forward market auction constraints based on one or a plurality of constraints. In some embodiments, the constrained auctions may have fungible units which allow many participants to transact in the auctions. In some embodiments, the transportation or freight unit auction substitutability dynamic creates a unique and novel invention that does not exist in the world today. In some embodiments, user 3110 input 220, 230 instructions use constrained optimization to form one auction between two points or a series of multiple auctions that form one larger auction.

In some embodiments, the forward transportation and freight unit auctions subject to various constraints may be presented as a linear programming cost minimization problem in the exemplary case where the user 3110 selects the cheapest route 1011 constraint. In such exemplary case, the series of auctions may be combined that utilize the lowest cost path between the start point 1815 and the ending point 1818. In such exemplary case, the linear programming cost minimization function may select the following path of 1815 to 1811 to 1802 to 1804 to 1805 to 1808 to 1818 if that combination is the lowest cost auction path. In another such exemplary case, the user 3110 may select instructions for the auction to minimize both cost and shortest route. In such exemplary case the linear programming function may minimize cost subject to a constraint that time is the shortest along the path and the resulting auction may combine a different and unique series of auctions between the starting point of 1815 and ending point 1818. Accordingly, the path may be optimized to minimize cost subject to the shortest path that yields a path of 1815 to 1811 to 1802 to 1805 to 1808 to 1818. The plurality of combinations of linear programming sequences of auctions for transportation or freight units between two points may consider an infinite set of combinations and permutations.

Figure 19:
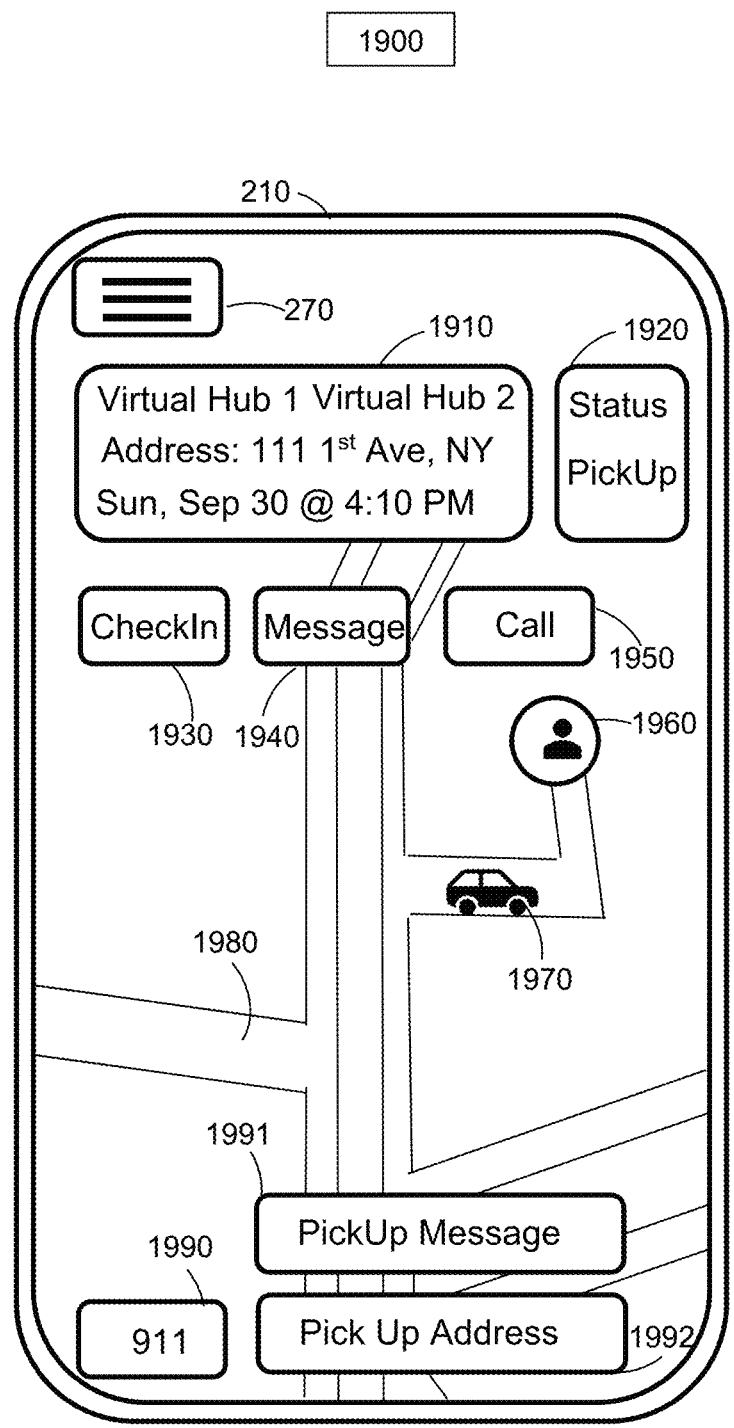
FIG. 19 illustrates an exemplary user interface to display the map of the virtual hub to virtual hub route of a given transaction for forward transportation or freight capacity units in accordance with some embodiments.

FIG. 19 illustrates an exemplary delivery and pick up status configuration 1900 in one exemplary implementation of participating, transacting and/or trading transportation or freight capacity units in accordance with some embodiments. In some embodiments, the delivery and pick up status configuration 1900 includes the following elements, or a subset or superset thereof:

Computing device unit GUI 210 to display method of multi layered network node topology for forward market of transportation and freight units.

Hamburger menu toggle 270 to move between different application configurations;

Virtual Hub 1 pickup address and Virtual Hub 2 destination address at a contract specification with regards to quality, day, date and time 1910;

Trip status for PickUp of transportation or freight unit 1920;

CheckIn passenger or freight status for transportation unit 1930;

Messaging texts and instructions between users to make pick up and delivery of transportation or freight capacity units 1940;

Call between users with number masking for privacy security 1950;

GPS map location of user 3110 who is a rider or if freight cargo location 1960;

GPS map location of user 3110 who is a driver or if freight, cargo carrier unit location 1970;

GPS map of transportation or freight unit delivery and pickup 1980;

Texting message window for freight or transportation unit communication between users 1991;

PickUp address data window during PickUp status 1992;

Security button to report security issues to 911 and system database 1990;

In some embodiments, the GUI 210 transmits delivery instructions to the users 3110 to help the user have a rendering or map of their GPS location 1960 relative to the selling user 1970 of freight or transportation units. In some embodiments, the GUI 210 displays the trips status such as PickUp 1920 status, the trip status may include subsets or supersets of various status conditions such as PickUp, start, leaving, on-going, in-progress, arriving, arrived or a plurality of other trip status conditions. In some embodiments, the trip view of the GUI 210 may include a CheckIn 1930 button to confirm a passenger or freight transportation unit has been moved into the transportation unit object which could be a car, airplane, autonomous vehicle, bike, boat, ship, bus, drone, limo, motorcycle, moped, shuttle, spaceship, subway, taxi, train, cargo or other type of transportation mode. In some embodiments, the user 3110 may transmit a message using the message 1940 button which may transmit audio, visual or text messages between users 3110, 1970, 1960. In some embodiments, the users 3110, 1960, 1970 may call each other using the call 1950 button to communicate pickup or delivery instructions. In some embodiments, a user 3110, 1960, 1970 may message another user 3110, 1960, 1970 to communicate using the PickUp Message window 1991 which may utilize visual, audio or text communication modes as well as log a message history between users. In some embodiments the users 3110, 1960, 1970 may toggle to other modes of the application using the menu hamburger button 270. In some embodiments the GPS display of a map with the relative position of a transportation or freight unit seller 1970 and a transportation or freight unit buyer 1960 are displayed to help users 3110 understand each others relative position and location on a map 1980. In some embodiments the GPS location of the transportation and freight unit seller 1970 and transportation or freight unit buyer 1960 are tracked in real time with location updates on the map 1980.

Figure 20:
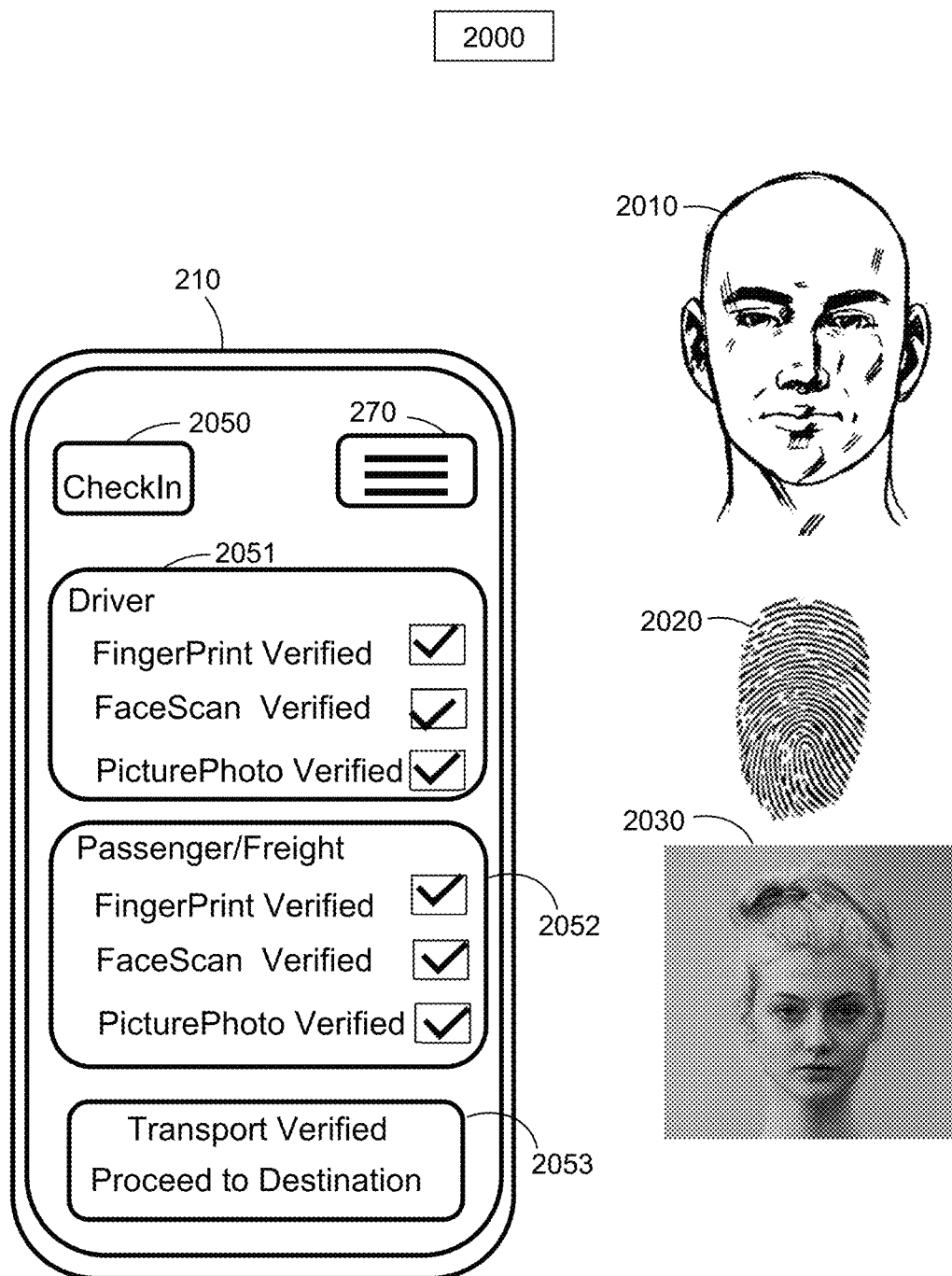
FIG. 20 illustrates an exemplary user interface to display the results of a security check and verification of users identity for forward transportation or freight capacity units in accordance with some embodiments.

FIG. 20 illustrates an exemplary CheckIn configuration 2000 in one exemplary implementation of participating, transacting and/or trading transportation or freight capacity units in accordance with some embodiments. In some embodiments, the CheckIn 2050 for a buyer or seller of a transportation or freight unit includes the following elements, or a subset or superset thereof:

Computing device unit GUI 210 to display method of multi layered network node topology for forward market of transportation and freight units with security CheckIn.

Hamburger menu toggle 270 to move between different application configurations;

Driver or Seller of transportation or freight unit scan check for finger print, face scan or picture photo scan to verify identity of user 2051;

Passenger or freight and transportation unit buyer unit scan check for finger print, face scan or picture photo scan to verify identity of user 2052;

Transport Verification confirmation window to confirm identities of users in the system at the application system level 2053;

Buyer and Seller of transportation or freight unit facial recognition confirmation 2010;

Buyer and Seller of transportation or freight unit finger print recognition confirmation 2020;

Buyer and Seller of transportation or freight unit photo recognition confirmation 2030;

In some embodiments, the GUI 210 of a computing device transmits and confirms the identity of users against identity records in the Network Member Database Server 3160 which also confirms security checks for criminal records or other activity that would suspend a user from the platform environment. In some embodiments, the driver verification window 2051 may fail an identity verification due to a user not being the registered user 2010 on the Network Member Database Server 3160. In some embodiments, the passenger or freight verification window 2052 may fail an identity verification due to a user 2010 not being the registered user on the network member database server 3160. In some embodiments, the transport verification window 2053 may instruct the user 2010 to proceed to destination if verification is successful. In some embodiments, the transport verification window 2053 may instruct the user not to proceed to the destination if the verification is not successful. The identity verification system is unique and novel and dependent on a novel and unique auction forward market for transportation or freight over multiple nodes or virtual hubs topologies.

Figure 21:
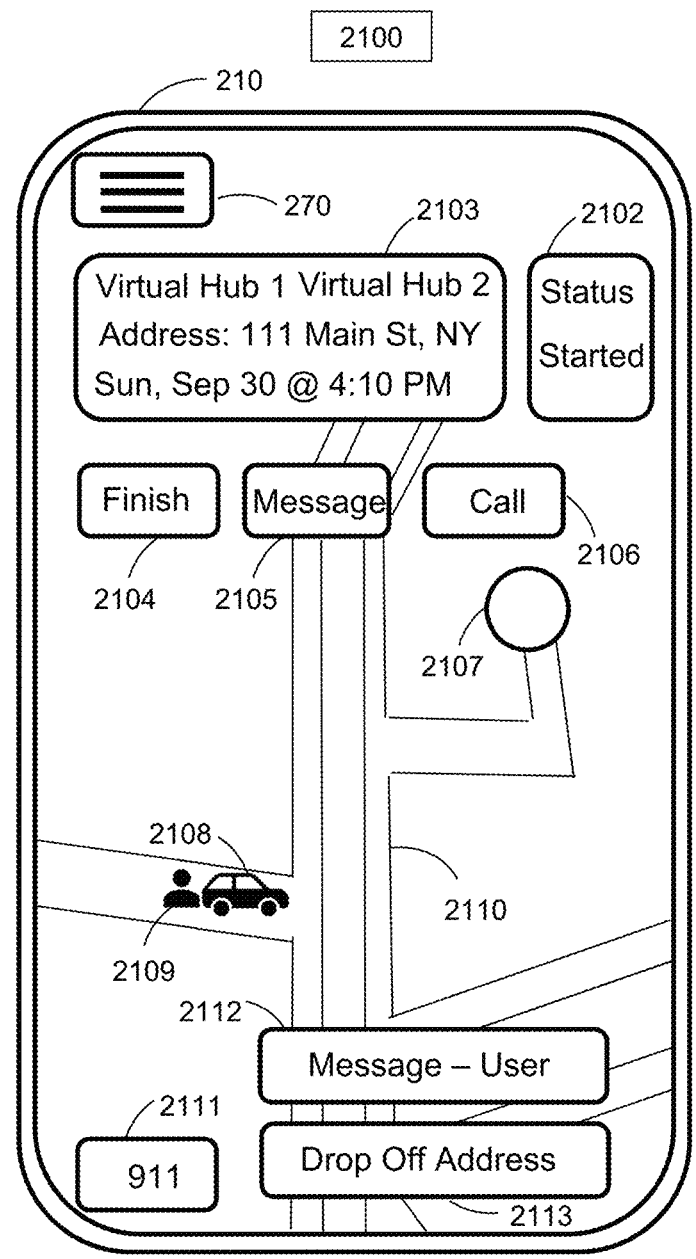
FIG. 21 illustrates an exemplary user interface to display the status of the virtual hub to virtual hub route of a given transaction for forward transportation or freight capacity units in accordance with some embodiments.

FIG. 21 illustrates an exemplary delivery and pick up status configuration 2100 once a transportation or freight unit delivery has started in one exemplary implementation of participating, transacting and/or trading transportation or freight capacity units in accordance with some embodiments. In some embodiments, the delivery and pick up status configuration 2100 includes the following elements, or a subset or superset thereof:

Computing device unit GUI 210 to display method of multi layered network node topology for forward market of transportation and freight units.

Hamburger menu toggle 270 to move between different application configurations;

Virtual Hub 1 pickup address and Virtual Hub 2 destination address at a contract specification with regards to quality, day, date and time 2103 of delivery of a transportation or freight unit;

Trip status of started of transportation or freight unit 2102;

Finish trip passenger or freight status for transportation unit 2104 once a transportation or freight unit has been delivered;

Messaging texts and instructions between users to make pick-up, on-going route status and delivery complete of transportation or freight capacity units 2105;

Call between system users with number masking for privacy security 2106;

GPS map location of user 2109 who is a rider or if freight, cargo location 2109;

GPS map location of user 2108 who is a driver or if freight, cargo carrier unit location 2108;

GPS map of transportation or freight unit delivery and pickup 2110;

Texting message window for freight or transportation unit communication between users 2112;

Starting point of virtual hub for forward transportation or freight units 2107;

Security button to report security issues to 911 and system database 2111;

Drop off address for delivery of passenger or freight for transportation or freight unit 2111.

In some embodiments, the GUI 210 transmits delivery instructions to the users 3110 to help the user have a rendering or map of their GPS location 2109 relative to the selling user 2108 of freight or transportation units. In some embodiments, the GUI 210 displays the trips status such as Started 2102 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2104 button to confirm a passenger or freight transportation unit has been delivered or completed by the transportation unit object which could be a car, airplane, autonomous vehicle, bike, boat, ship, bus, drone, limo, motorcycle, moped, shuttle, spaceship, subway, taxi, train, cargo or other types of transportation modes. In some embodiments, the user 3110 may transmit a message using the message 2105 button which may transmit audio, visual or text messages between users 3110, 2109, 2108. In some embodiments, the users 3110, 2109, 2109 may call each other using the call 2106 button to communicate pickup or delivery instructions or other necessary communication. In some embodiments, a user 3110, 2109, 2108 may message another user 3110, 2109, 2108 to communicate using the Message—User window 2112 which may utilize visual, audio or text communication modes as well as log a message history between users. In some embodiments the users 3110, 2109, 2108 may toggle to other modes of the application using the menu hamburger button 270. In some embodiments the GPS display of a map with the relative position of a transportation or freight unit seller 2108 and a transportation or freight unit buyer 2109 are displayed to help users 3110 understand each others relative position and location on a map 2110. In some embodiments the GPS location of the transportation and freight unit seller 2108 and transportation or freight unit buyer 2109 are tracked in real time with location updates on the map 2110.

Figure 22:
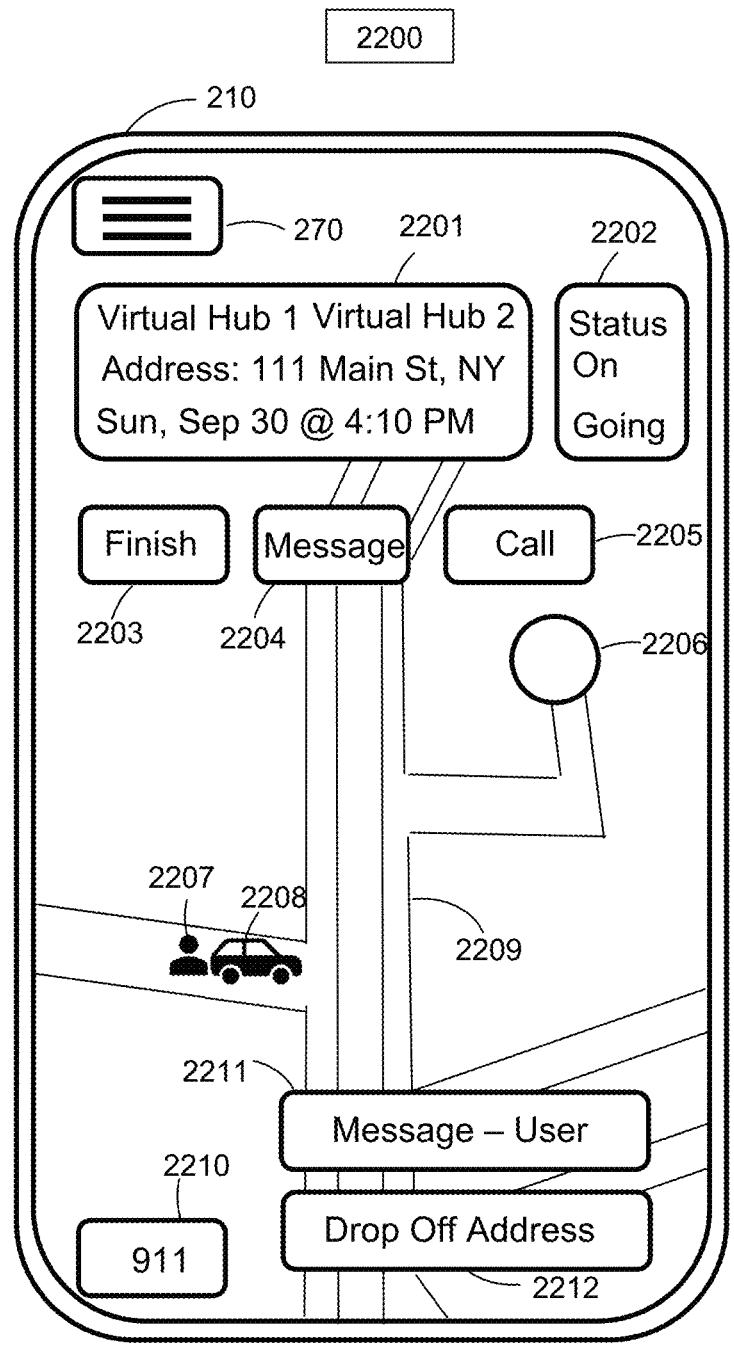
FIG. 22 illustrates an exemplary user interface to display the status of the virtual hub to virtual hub route of a given transaction for forward transportation or freight capacity units in accordance with some embodiments.

FIG. 22 illustrates an exemplary delivery and pick up status configuration 2200 once a transportation or freight unit delivery is ongoing in one exemplary implementation of participating, transacting and/or trading transportation or freight capacity units in accordance with some embodiments. In some embodiments, the delivery and pick up status configuration 2200 includes the following elements, or a subset or superset thereof:

Computing device unit GUI 210 to display method of multi layered network node topology for forward market of transportation and freight units.

Hamburger menu toggle 270 to move between different application configurations;

Virtual Hub 1 pickup address and Virtual Hub 2 destination address at a contract specification with regards to quality, day, date and time 2201 of delivery of a transportation or freight unit;

Trip status of ongoing for transportation or freight unit 2202;

Finish trip passenger or freight status button for transportation unit 2203 once a transportation or freight unit has been delivered;

Messaging texts and instructions between users to make pick-up, on-going route status and delivery complete of transportation or freight capacity units 2204;

Call between system users with number masking for privacy security 2205;

GPS map location of user 2209 who is a rider or if freight, cargo location 2209;

GPS map location of user 2208 who is a driver or if freight, cargo carrier unit location 2207;

GPS map of transportation or freight unit delivery and pickup 2206;

Texting message window for freight or transportation unit communication between users 2211;

Starting point of virtual hub for forward transportation or freight units 2206;

Security button to report and record security issues to 911 and system database 2210;

Drop off address for delivery of passenger or freight for transportation or freight unit 2212.

In some embodiments, the GUI 210 transmits delivery instructions to the users 3110 to help the user 3110 have a rendering or map of their GPS location 2207 relative to the selling user 2208 of freight or transportation units. In some embodiments, the GUI 210 displays the trips status such as On-Going 2202 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2203 button to confirm a passenger or freight transportation unit has been delivered or completed by the transportation unit object which could be a car, airplane, autonomous vehicle, bike, boat, ship, bus, drone, limo, motorcycle, moped, shuttle, spaceship, subway, taxi, train, cargo or other types of transportation modes. In some embodiments, the user 3110 may transmit a message using the message 2204 button which may transmit audio, visual or text messages between users 3110, 2207, 2208. In some embodiments, the users 3110, 2207, 2208 may call each other using the call 2205 button to communicate pickup or delivery instructions or other necessary communication. In some embodiments, a user 3110, 2207, 2208 may message another user 3110, 2207, 2208 to communicate using the Message—User window 2211 which may utilize visual, audio or text communication modes as well as log a message history between users 3110, 2207, 2208. In some embodiments the users 3110, 2207, 2208 may toggle to other modes of the application using the menu hamburger button 270. In some embodiments the GPS display of a map with the relative position of a transportation or freight unit seller 2208 and a transportation or freight unit buyer 2207 are displayed to help users 3110 understand each others relative position and location on a map 2209. In some embodiments the GPS location of the transportation and freight unit seller 2208 and transportation or freight unit buyer 2207 are tracked in real time with location updates on the map 2209. In some embodiments, the GUI 210 may display the Drop Off Address 2212 of the transportation or freight unit. In some embodiments a user 3110, 2207, 2208 may use a 911 button 2210 to submit a recording to the system servers and to authorities who are connected to the system if anything has occurred that may compromise the security of any user or transportation unit.

Figure 23:
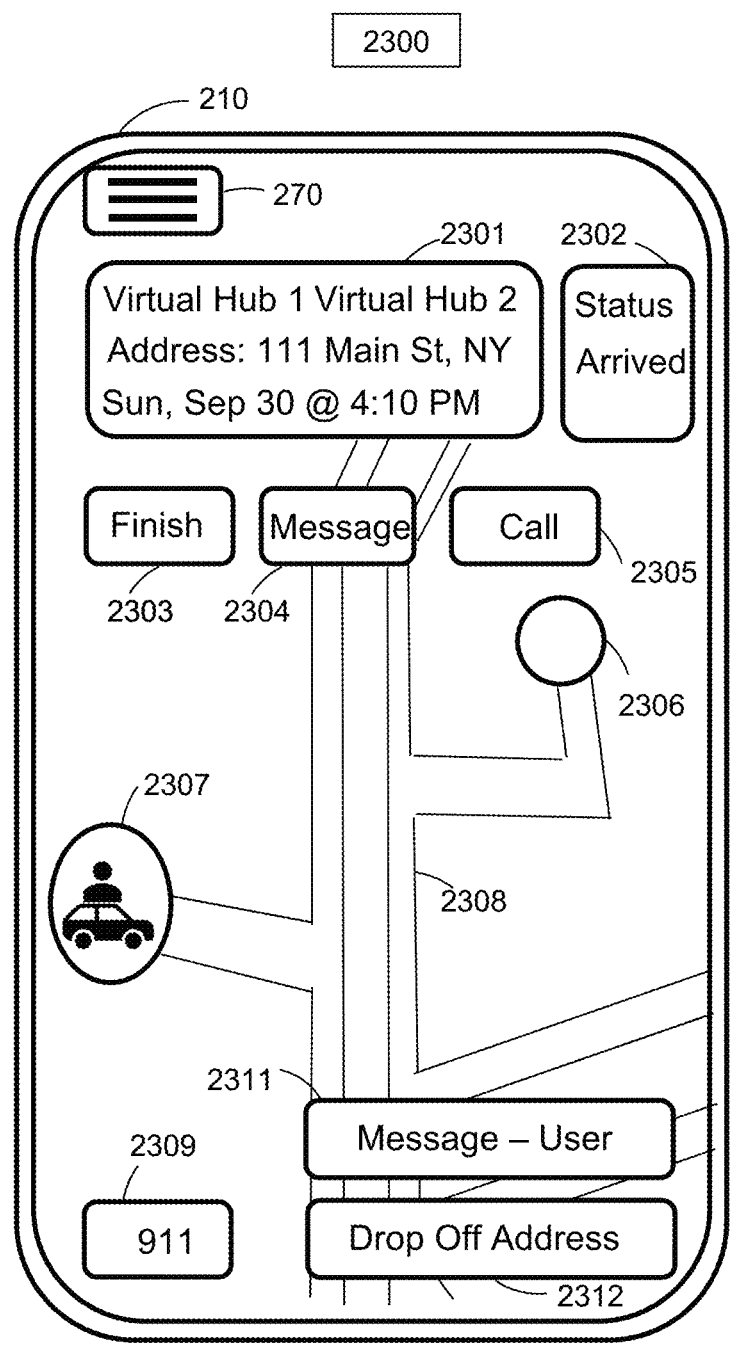
FIG. 23 illustrates an exemplary user interface to display the status of the virtual hub to virtual hub route of a given transaction for forward transportation or freight capacity units in accordance with some embodiments.

FIG. 23 illustrates an exemplary delivery and pick up status configuration 2300 once a transportation or freight unit delivery has arrived in one exemplary implementation of participating, transacting and/or trading transportation or freight capacity units in accordance with some embodiments. In some embodiments, the delivery and pick up status configuration 2300 includes the following elements, or a subset or superset thereof:

Computing device unit GUI 210 to display method of multi layered network node topology for forward market of transportation and freight units.

Hamburger menu toggle 270 to move between different application configurations;

Virtual Hub 1 pickup address and Virtual Hub 2 destination address at a contract specification with regards to quality, day, date and time 2301 of delivery of a transportation or freight unit;

Trip status of arrived for transportation or freight unit 2302;

Finish trip passenger or freight status button for transportation unit 2303 once a transportation or freight unit has been delivered;

Messaging texts and instructions between users to make pick-up, on-going route status and delivery complete of transportation or freight capacity units 2304;

Call between system users with number masking for privacy security 2305;

GPS map location of user 2307 who is a rider or if freight, cargo location 2307;

GPS map location of user 2307 who is a driver or if freight, cargo carrier unit location 2307;

GPS map of transportation or freight unit delivery and pickup 2308;

Texting message window for freight or transportation unit communication between users 2311;

Starting point of virtual hub for forward transportation or freight units 2306;

Ending point of virtual hub for forward transportation or freight units 2307;

Security button to report and record security issues to 911 and system database 2309;

Drop off address for delivery of passenger or freight for transportation or freight unit 2312;

In some embodiments, the GUI 210 transmits delivery instructions to the users 3110 to help the user 3110 have a rendering or map of their GPS location 2307 relative to the selling user 2307 of freight or transportation units. In some embodiments, the GUI 210 displays the trips status such as Arrived 2302 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2303 button to confirm a passenger or freight transportation unit has been delivered or completed by the transportation unit object which could be a car, airplane, autonomous vehicle, bike, boat, ship, bus, drone, limo, motorcycle, moped, shuttle, spaceship, subway, taxi, train, cargo or other types of transportation modes. In some embodiments, the user 3110 may transmit a message using the message 2304 button which may transmit audio, visual or text messages between users 3110, 2307. In some embodiments, the users 3110, 2307 may call each other using the call 2305 button to communicate pickup or delivery instructions or other necessary communication. In some embodiments, a user 3110, 2307 may message another user 3110, 2307 to communicate using the Message—User window 2311 which may utilize visual, audio or text communication modes as well as log a message history between users 3110, 2307. In some embodiments the users 3110, 2307 may toggle to other modes of the application using the menu hamburger button 270. In some embodiments the GPS display of a map with the relative position of a transportation or freight unit seller 2307 and a transportation or freight unit buyer 2307 are displayed to help users 3110 understand each others relative position and location on a map 2308. In some embodiments the GPS location of the transportation and freight unit seller 2307 and transportation or freight unit buyer 2307 are tracked in real time with location updates on the map 2308. In some embodiments, the GUI 210 may display the Drop Off Address 2312 of the transportation or freight unit. In some embodiments a user 3110, 2307 may use a 911 button 2309 to submit a recording to the system servers and to authorities who are connected to the system if anything has occurred that may compromise the security of any user or transportation unit.

Figure 24:
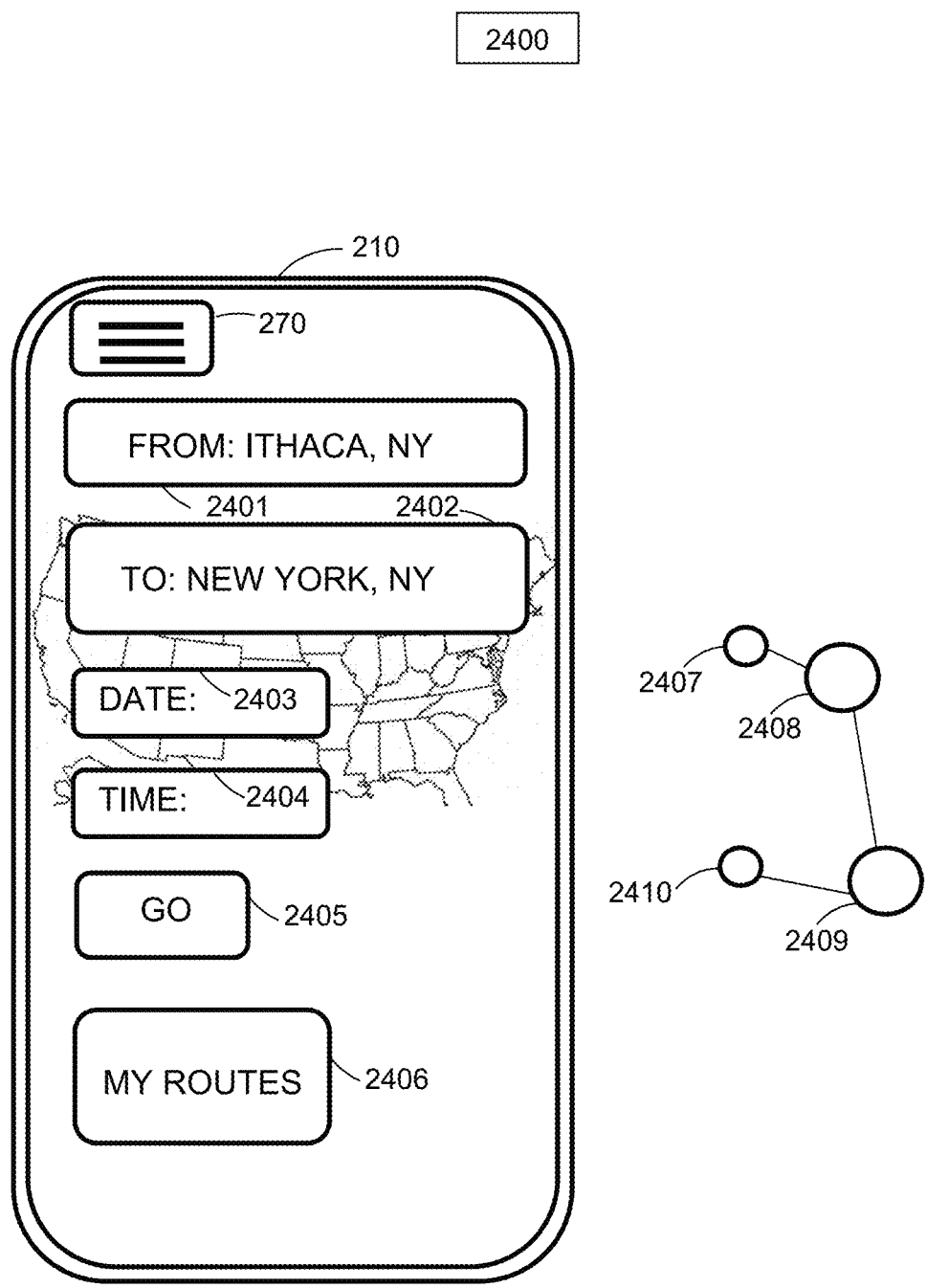
FIG. 24 illustrates an exemplary user interface to display a multi-hub, virtual-hub sequence given a start and end point for a transaction auction for forward transportation or freight capacity units in accordance with some embodiments.

FIG. 24 illustrates an exemplary delivery and pick up configuration 2400 for a transportation or freight unit multi layered network node topology in one exemplary implementation of participating, transacting and/or trading transportation or freight capacity units in accordance with some embodiments. In some embodiments, the multi layered network node topology of participating, transacting and/or trading transportation or freight capacity configuration 2400 includes the following elements, or a subset or superset thereof:

Computing device unit GUI 210 to display method of multi layered network node topology for forward market of transportation and freight units;

Hamburger menu toggle 270 to move between different application configurations;

From node starting point 2401 of a multi layered network node topology for forward market of transportation and freight units;

TO or destination node ending point 2402 of a multi layered network node topology for forward market of transportation and freight units;

Date module 2403 in GUI 210 of an auction for a multi layered network node topology for forward market of transportation and freight units;

Time module 2404 in GUI 210 of pickup and delivery of an auction for a multi layered network node topology for forward market of transportation and freight units;

Go button 2405 to form an auction for a multi layered network node topology for forward market of transportation and freight units;

My Routes button 2406 to quickly obtain common From 2401 or To 2402 points in an auction for a multi layered network node topology for forward market of transportation and freight units for a user on the system;

Multi-Hub network 2407, 2408, 2409, 2410 which may form a single dual node auction 2407 to 2408 or 2407 to 2410 or any possible node combination or a multi-node auction series for a multi layered network node topology for forward market of transportation and freight units for a user on the system.

In some embodiments, the GUI 210 transmits a From node 2401 and To node 2402 with instructions to the users 3110 with a specific date 2403 and time 2404 of a multi layered network node topology for forward market of transportation and freight units for a user on the system to perform an auction by pressing the Go button 2405. The system may use a plurality of constraints such as but not limited by cheapest route 1011, single mode of transportation 1012, multi method mode of transportation 1013, fastest route 1014, most scenic route 1015, highest rated route or highest rated driver 1016, most available route 1017, highest volume route 1018, most frequent route 1019, service level route 1020, security and safety of route 1021, group restricted email or group criteria 1022 to use any two node points 2407, 2408, 2409, 2410 or any combination of points 2407, 2408, 2409, 2410. In some embodiments the system may use no constraint, one constraint or a plurality of constraints to allow the user 3110 to participate, transact or trade in a multi layered network node topology for forward market of transportation and freight units in an auction. In some embodiments the auction for forward market transportation or freight units may be comprised of an auction between only two points or a plurality of points subject to a plurality of constraints. In some embodiments the from or starting point or starting virtual hub may be 2407, but the system selects an auction between 2408 and 2409 rather than starting at 2407 because one or more constraints were selected to frame the auction for forward market transportation or freight units. In some embodiments, an auction may be comprised of multiple modes of transportation comprising a car ride transportation or freight unit auction between 2407 and 2408 points, followed by an airplane transportation or freight unit auction between 2408 and 2409, followed by a ship auction between 2410 and 2409 for transportation or freight units. In some embodiments the various plurality of auctions may be displayed as one auction or a series of auctions. In some embodiments, auctions for a multi layered network node topology for a forward market of transportation and freight units may consist of any subset or superset of the aforementioned possibilities including any constraints 1000 or any plurality of modes 800.

Figure 25:
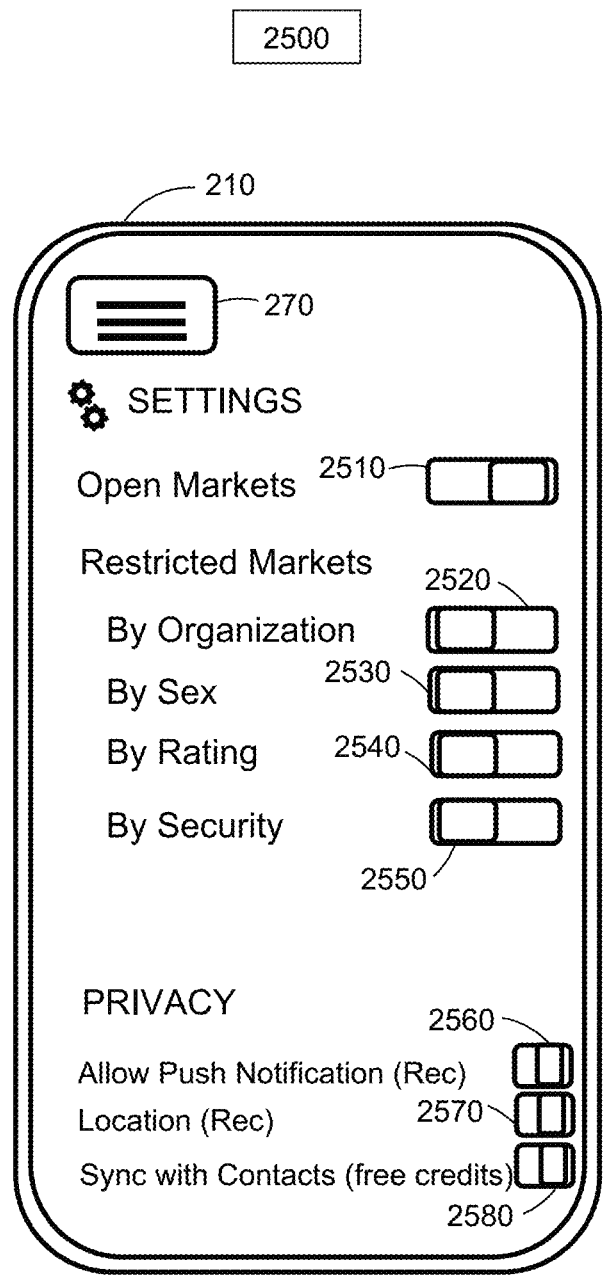
FIG. 25 illustrates an exemplary user interface to display open or restriction settings for auctions of the transportation or freight forward market system and method in accordance with some embodiments.

FIG. 25 illustrates an exemplary setting configuration 2500 for a transportation or freight unit multi layered network node topology in one exemplary implementation of participating, transacting and/or trading transportation or freight capacity units in accordance with some embodiments. In some embodiments, the multi layered network node topology of participating, transacting and/or trading transportation or freight capacity configuration 2500 includes the following setting elements, or a subset or superset thereof:

Computing device unit GUI 210 to display method of multi layered network node topology for forward market of transportation and freight units.

Hamburger menu toggle 270 to move between different application configurations;

Open markets setting toggle 2510 which allows a user to see all market participants of a given auction on a multi layered network node topology for a forward market of transportation and freight units;

Restricted markets setting By Organization 2520, By Sex 2530, By Rating 2540, By Security 2550 or by any other restriction the user 3110 defines which limit the auction participants for the user;

Privacy settings which restrict push notifications 2560, location information 2570; Sync with contacts 2580, or other privacy settings;

In some embodiments, a user 3110 may select open markets 2510 which show every participant in a given auction for a multi layered network node topology for a forward market of transportation and freight units. In some embodiments, participants or users 3110 may select to restrict the market view of the GUI such as 400 by organization email 2520 or by sex 2530 or by rating of driver 2540 or rating of user 2540 or by security 2550 or by a plurality of other restrictions but not limited to those restrictions. In some embodiments, users 3110 may change privacy settings which restrict push notifications 2560, location settings 2570, Sync with Contacts settings 2580 or a plurality of other settings. In some embodiments, the toggle switches 2510, 2520, 2530, 2540, 2550, 2560, 2570, 2580 may be set to off or on depending on if they hold a right or left toggle switch position. The restricted market settings 2520, 2530, 2540, 2550 may be a subset or superset of the aforementioned in the formation of an open market auction for a multi layered network node topology for a forward market of transportation and freight units.

Figure 26:
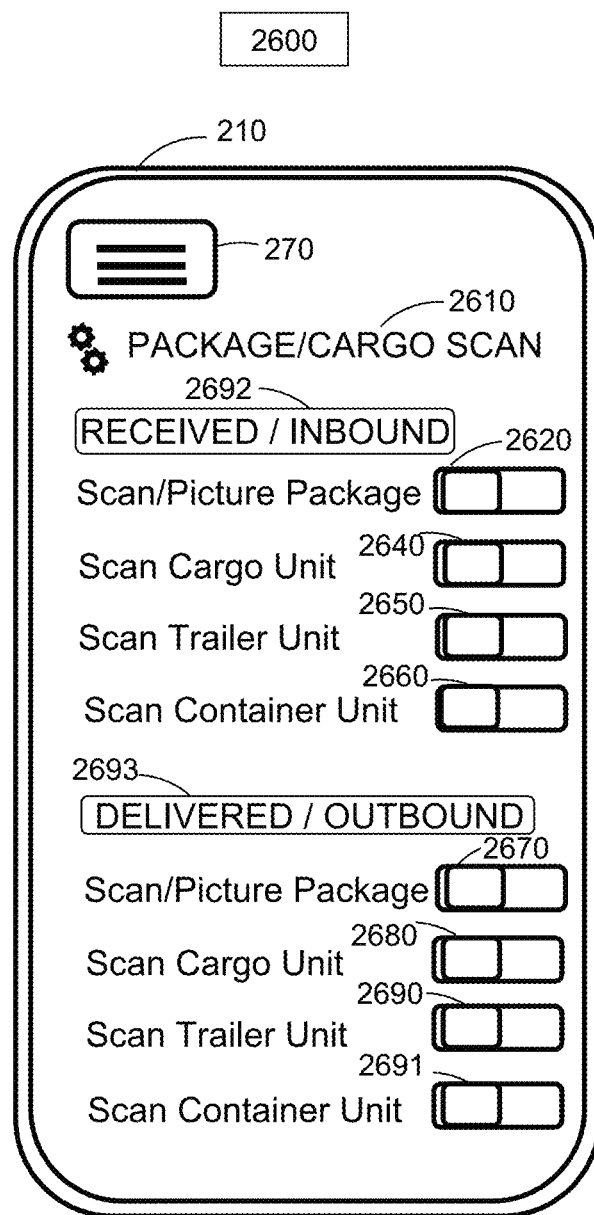
FIG. 26 illustrates an exemplary user interface to display inbound and outbound package, cargo or freight QR scans or UPC scans or pictures to document freight units in which are delivered against the forward market auction for two or more virtual hubs in accordance with some embodiments.

FIG. 26 illustrates an exemplary setting for a package or cargo scan configuration 2600 for a transportation or freight unit multi layered network node topology in one exemplary implementation of participating, transacting and/or trading transportation or freight capacity units in accordance with some embodiments. In some embodiments, the multi layered network node topology of participating, transacting and/or trading transportation or freight capacity configuration 2600 includes the following setting for a package or cargo scan elements, or a subset or superset thereof:

Computing device unit GUI 210 to display method of multi layered network node topology for forward market of transportation and freight units.

Hamburger menu toggle 270 to move between different application configurations;

Package or Cargo Scan module 2610 to document the status and position of forward market freight or transportation units;

Package or Cargo Inbound or received module 2692 to scan a picture, universal product code barcode, QR code, or other transportation or freight unit identifier;

Package or Cargo Inbound scan toggle switch 2620 to scan a picture, universal product code barcode, QR code, or other transportation or freight unit identifier;

Cargo unit Inbound scan toggle switch 2640 to scan a picture, universal product code barcode, QR code, or other transportation or freight unit identifier;

Trailer unit Inbound scan toggle switch 2650 to scan a picture, universal product code barcode, QR code, or other transportation or freight unit identifier;

Container unit Inbound scan toggle switch 2660 to scan a picture, universal product code barcode, QR code, or other transportation or freight unit identifier;

Package or Cargo Outbound or delivered module 2693 to scan a picture, universal product code barcode, QR code, or other transportation or freight unit identifier;

Package or Cargo Outbound or delivered scan toggle 2670 to scan a picture, universal product code barcode, QR code, or other transportation or freight unit identifier;

Cargo Outbound or delivered scan toggle 2680 to scan a picture, universal product code barcode, QR code, or other transportation or freight unit identifier;

Trailer Outbound or delivered scan toggle 2690 to scan a picture, universal product code barcode, QR code, or other transportation or freight unit identifier;

Container Unit Outbound or delivered scan toggle 2691 to scan a picture, universal product code barcode, QR code, or other transportation or freight unit identifier;

In some embodiments, a user 3110 may select the package or cargo unit scan module 2610 to scan or take a picture of a package or cargo identification code such as a QR code, Uniform Product code or other identifying package or cargo characteristic. In some embodiments, the user 3110 may select the inbound Scan/Picture Package toggle 2620 which captures the identification characteristic which may include QR Codes, Uniform Product Codes, Serial Numbers or other cargo identification characteristics of a package or cargo transportation or freight unit. In some embodiments, inbound cargo may include a larger unit structure than a package such as a crate or large movable unit with identification characteristics which may include QR Codes, Uniform Product Codes, Serial Numbers or other cargo identification characteristics, for such larger units a user 3110 may use the Scan Cargo Unit toggle 2640 to capture the cargo identification characteristic for inbound receipt of the transportation or freight unit. In some embodiments, an inbound Scan Trailer Unit toggle 2650 option may be used by a user 3110 to instruct the system configuration that receipt of a large trailer unit such as an eighteen wheel trailer unit or smaller trailer, may be scanned to identify the transportation or freight unit. In some embodiments, an inbound Scan Container Unit 2660 toggle may be utilized to track the receipt or location of a shipping container. In some embodiments, a user 3110 may select the outbound package or cargo unit scan module 2693 to scan or take a picture of a package or cargo identification code such as a QR code, Uniform Product code or other identifying package or cargo characteristic to confirm delivery to a delivery address of the transportation or freight unit. In some embodiments, the user 3110 may select the outbound Scan/Picture Package toggle 2670 which captures the identification characteristic of a package or cargo transportation or freight unit once the unit is delivered to the delivery address. In some embodiments, cargo may include a larger unit structure than a package such as a crate or large movable unit with identification characteristics which may include QR Codes, Uniform Product Codes, Serial Numbers or other cargo identification characteristics, for such larger units a user 3110 may use the outbound Scan Cargo Unit toggle 2680 to capture the cargo identification characteristic for outbound receipt of the transportation or freight unit. In some embodiments, a outbound Scan Trailer Unit toggle 2690 option may be used by a user 3110 to instruct the system configuration that delivery of a large trailer unit such as an eighteen wheel trailer unit or smaller trailer, may be scanned to identify the transportation or freight unit and confirm delivery. In some embodiments, an outbound Scan Container Unit 2691 toggle may be utilized to track the delivery or location of a shipping container which has been delivered. In some embodiments, transportation or freight units may be a subset or superset of the aforementioned in the formation of an open forward market auction for a multi layered network node topology for a forward market of transportation and freight units.

Figure 27:
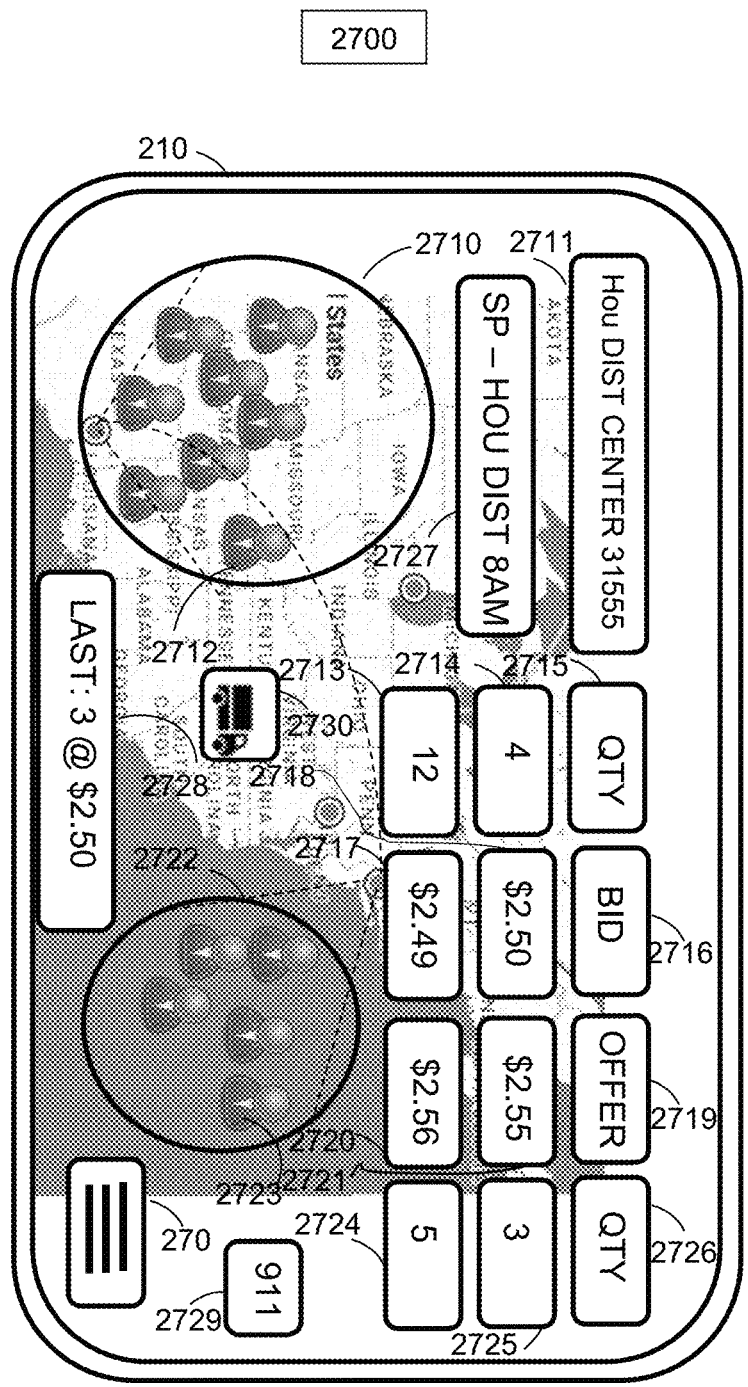
FIG. 27 illustrates an exemplary user interface to display a forward freight auction for a transportation unit a given hub or multi-hub combination in accordance with some embodiments.

FIG. 27 illustrates an exemplary setting for a package or cargo market configuration 2700 for a transportation or freight unit multi layered network node topology in one exemplary implementation of participating, transacting and/or trading transportation or freight capacity units in accordance with some embodiments. In some embodiments, user interface 210 includes the following elements, or a subset or superset thereof:

Exemplary virtual hub combination from a shipping center location 2711;

Exemplary virtual hub origin/from location 2710 with users or freight originators 2712 within the virtual hub location 2710;

Exemplary specification summary of the market, level of service and time of delivery commencement 2727;

Exemplary mode of ground transportation or freight capacity type 2730;

Exemplary transaction summary of the last trades quantity and price 2728;

Exemplary virtual hub destination/to location 2722 and user who is being delivered on the transportation or freight capacity unit 2723;

Exemplary bid/buy quantity title header 2715 for an exemplary virtual transportation or freight unit hub market;

Exemplary bid/buy price title header 2716 for an exemplary virtual transportation or freight hub market;

Exemplary offer/sell price title header 2719 for an exemplary virtual transportation or freight hub market;

Exemplary offer/sell quantity title header 2726 for an exemplary virtual transportation or freight hub market;

Exemplary bid/buy quantity 2414 for the best bid quantity from a plurality of users 3110 for an exemplary respective transportation or freight capacity virtual hub combination 2711;

Exemplary bid/buy quantity 2713 for the second-best bid quantity from a plurality of users 3110 for an exemplary respective transportation or freight capacity virtual hub combination 2711;

Exemplary bid/buy price 2718 for the best bid price from a plurality of users 3110 for an exemplary respective transportation or freight capacity virtual hub combination 2711;

Exemplary bid/buy price 2717 for the second-best bid price from a plurality of users 3110 for an exemplary respective transportation or freight capacity virtual hub combination 2711;

Exemplary offer/sell price 2721 for the best offer price from a plurality of users 3110 for an exemplary respective transportation or freight capacity virtual hub combination 2711;

Exemplary offer/sell price 2720 for the second-best offer price from a plurality of users 3110 for an exemplary respective transportation or freight capacity virtual hub combination 2711;

Exemplary offer/sell quantity 2725 for the best offer quantity from a plurality of users 3110 for an exemplary respective transportation or freight capacity virtual hub combination 2711;

Exemplary offer/sell quantity 2724 for the second-best offer quantity from a plurality of users 3110 for an exemplary respective transportation or freight capacity virtual hub combination 2711;

Exemplary safety dispatch "911" button 2729 to enact video and audio recording of the user 3110 environment and dispatch of that information to authorities and system servers.

Exemplary hamburger menu button 270 to move back to menu options and settings away from the participation, transaction, trading auction GUI 210 embodiment.

In some embodiments, the user 3110 may enter a transaction quantity and price for transportation or freight capacity units to participate, transact and/or trade by the GUI 210 detecting user 3110 contact or audio interface with a bid/buy price 2718 or offer/sell price 2721. The GUI 210 detects user 3110 contact with any of the GUI 210 buttons which have been aforementioned. Upon user 3110 contact or audio interface with buttons on the GUI 210, instructions are instantiated which allow the user 3110 to change the specifications of the respective virtual hub combination 2711. A plurality of prices and markets may be presented based on a plurality of contract specifications by way of example but not limiting by example specifications for transportation capacity units may include swaps, options, forwards and futures 2727. In some embodiments, the best bid/buy price 2718 may be moving up in price or down in price depending on the market conditions at any given time. In some embodiments the last trade or last transacted price for a given specification is listed to help the user 3110 understand how the market is moving so that the user 3110 may submit a competitive offer/selling price 2721 or bid/buying price 2718. In some embodiments, users 3110 may adjust settings of the GUI 210 to show more bid/buying prices 2717 or more offer/selling prices 2720. In some embodiments the matrix of market quantities and prices 2713, 2714, 2715, 2716, 2717, 2718, 2719, 2720, 2721, 2724, 2725, 2726 may be referred to as market depth in the GUI 210 embodiment. In some embodiments the number of users 3110 may be displayed as user icons 2712 or 2723 for the amount of people logged in which desire to transact, trade or participate in a given virtual hub 2710 to virtual hub 2722 combination for transportation or freight units. In some embodiments, users 3110 may select the transportation mode 2730 such that the user allows a market for only one form of transportation or freight capacity as a commodity or the user 3110 may allow the system to show multiple forms of transportation or freight capacity between two virtual transportation capacity hubs 2710, 2711, 2722. In some embodiments the GUI 210 may detect a user 3110 selecting the 911 button 2729 which may activate voice and video recording functions on the mobile or stationary device 111 and transmit the data with a confirmation from the user 3110 to the authorities and system servers to provide enhanced security while participating, transacting or trading forward transportation or freight as a commodity. In some embodiments the user may toggle between the GUI 210 market view screen in FIG. 3 and other menu 270 options and settings by the user 3110 selecting the hamburger button 270 and the GUI 210 detecting the user 3110 input or contact or audio instruction. In some embodiments the GUI 210 may instantiate instructions in the memory of the mobile computing device 3111 which then transmits transportation or freight capacity data through the network 3140 or wireless GPS network 3150 to call upon instruction routines and instruction sub-routines on the transportation forward market database server 3130, virtual hub database server 3120, network member database server 3160, no arbitrage condition database server 3180 and/or instructions in the memory of the cloud and local CPUs 3190 which all interface together to make one system which may deliver transportation capacity units to users 3110 from and to a plurality of virtual hubs 2710, 2722 with a plurality of specifications at specific market prices.

Figure 28:
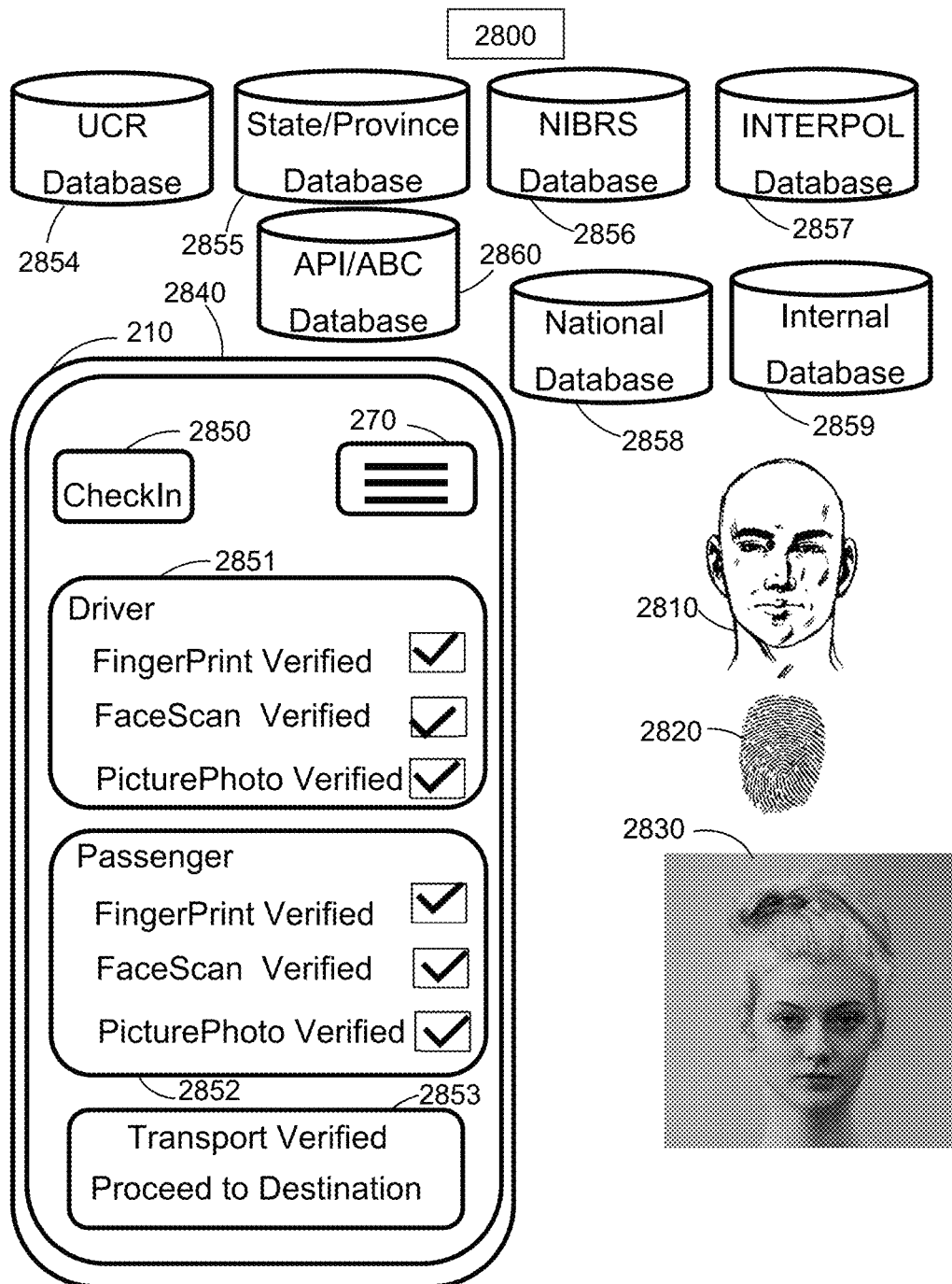
FIG. 28 illustrates an exemplary user interface and database configuration which allow user identity or criminal record or transaction history to be verified in accordance with some embodiments.

FIG. 28 illustrates an exemplary check in and security database configuration 2800 for a transportation or freight unit multi layered network node topology in one exemplary implementation of participating, transacting and/or trading transportation or freight capacity units in accordance with some embodiments. In some embodiments, the multi layered network node topology of participating, transacting and/or trading transportation or freight capacity configuration 2800 includes the following security configuration elements, or a subset or superset thereof:

Exemplary uniform crime reporting ("UCR") database 2854 from international agencies who report crime;

Exemplary International State or Provincial crime reporting database 2855 from international governments who report crime;

Exemplary International National Incident Based Reporting System ("NIBRS") crime reporting database 2856 from international governments who report crime;

Exemplary Interpol crime reporting database 2857 from international governments who report crime which connects National Central Bureaus ("NCBs");

Exemplary International application program interface and ABC ("API/ABC") crime reporting database 2860 from international governments who report crime;

Exemplary national crime reporting database 2858 from international governments who report crime;

Exemplary internal system crime reporting database 2859 from crimes which occurred on system;

Exemplary facial scan to identify user 2810 against a plurality of crime databases;

Exemplary fingerprint scan to identify user 2820 against a plurality of crime databases;

Exemplary photo or photo scan to identify user 2830 against a plurality of crime databases;

Exemplary voice scan to identify user 2810 against a plurality of crime databases;

Exemplary Computing device unit GUI 210 to display method of multi layered network node topology for forward market of transportation and freight units.

Hamburger menu toggle 270 to move between different application configurations;

Exemplary Driver or Freight transport or freight or transport seller unit user interface 2851 to confirm identity verification against a plurality of crime databases;

Exemplary passenger unit or freight unit user interface 2852 to confirm identity verification against a plurality of crime databases;

Exemplary handshake verification user interface 2853 to confirm both buyer and seller of transportation or freight units were correctly verified against crime databases;

In some embodiments, a plurality of crime databases UCR Database 2854, State and Province Database 2855, NIBRS database 2856, INTERPOL database 2857, API/ABC database 2860, National database 2858, Internal system database 2859 are used to confirm a user 3110, has been confirmed not to have criminal history in accordance with instructions on the method and system. In some embodiments, transportation or freight unit security may be a subset or superset of the aforementioned in the formation of an open forward market auction for a multi layered network node topology for a forward market of transportation and freight units. Such security checks are standard in airports, but they are not automated and they are not utilized in other modes of transportation which degrades the overall safety of other transportation methods if they are not utilized. In some embodiments, the check in instructions may reject a user from confirmed verified transport if they fail the plurality of safety checks. In some embodiments, confirmed no crime history users 3110 do not have activity reported in the plurality of crime databases UCR Database 2854, State and Province Database 2855, NIBRS database 2856, INTERPOL database 2857, API/ABC database 2860, National database 2858, Internal system database 2859 and are confirmed to transport verified status 2853 in the system.

Figure 29:
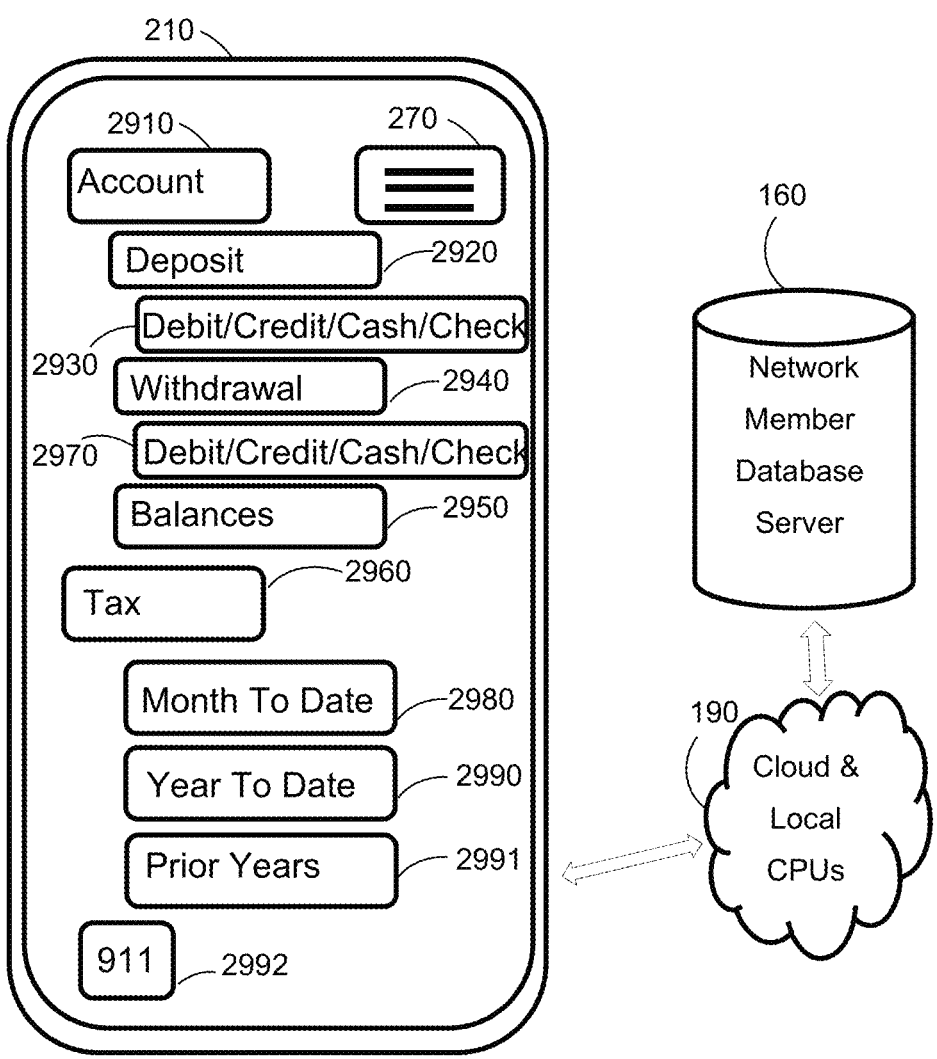
FIG. 29 illustrates an exemplary user interface and database configuration for account balances and payment for the forward market auctions of transportation and freight capacity between virtual hubs in accordance with some embodiments.

FIG. 29 illustrates an exemplary user accounting configuration 2900 for a transportation or freight unit multi layered network node topology in one exemplary implementation of participating, transacting and/or trading transportation or freight capacity unit auctions in accordance with some embodiments. In some embodiments, the multi layered network node topology of participating, transacting and/or trading transportation or freight capacity configuration 2900 includes the following accounting elements, or a subset or superset thereof:

Computing device unit GUI 210 to display method of multi layered network node topology for forward market of transportation and freight units.

Exemplary hamburger menu toggle 270 to move between different application configurations;

Exemplary account button 2910 to edit or confirm user account data;

Exemplary deposit button 2920 to add transaction funds or transaction currency or transaction balances to the user account;

Exemplary deposit method button 2930 to add transaction funds or transaction currency or transaction balances to the user account through Debit, Credit, Cash, Check, virtual currency, digital currency or a plurality of other payment methods;

Exemplary withdrawal button 2940 to send transaction funds or transaction currency or transaction balances to the user account in a different institution;

Exemplary withdrawal method button 2970 to send transaction funds or transaction currency or transaction balances to the user account at a different institution through Debit, Credit, Cash, Check, virtual currency, digital currency or a plurality of other payment methods;

Exemplary balances button 2950 to confirm user account balances;

Exemplary tax button 2960 to track user account activity for taxation reporting;

Exemplary month to date tax reporting button 2980;

Exemplary year to date tax reporting button 2990;

Exemplary prior year tax reporting button 2991;

Exemplary "911" security button 2991;

Exemplary Network Member Database Server 160;

Exemplary cloud and CPU and Network configuration 3190 to send and receive Network Member account data;

In some embodiments, user account 2910 data may be displayed with voice or screen or non-screen computing devices with instructions from the GUI 210 in accordance with instructions on the method and system. In some embodiments, user deposit 2920 data may be displayed with voice or screen or non-screen computing devices with instructions from the GUI 210 in accordance with instructions on the method and system. In some embodiments, user deposit method 2930 data such as Debit, Credit, Cash, Check, virtual currency, digital currency or a plurality of other payment methods may be displayed with voice or screen or non-screen computing devices with instructions from the GUI 210 in accordance with instructions on the method and system. In some embodiments, user withdrawal 2940 data may be displayed with voice or screen or non-screen computing devices with instructions from the GUI 210 in accordance with instructions on the method and system. In some embodiments, user withdrawal method 2970 data such as Debit, Credit, Cash, Check, virtual currency, digital currency or a plurality of other payment methods may be displayed with voice or screen or non-screen computing devices with instructions from the GUI 210 in accordance with instructions on the method and system to place money in the system account into a different institution specified by the user 3110. In some embodiments, user balances 2950 data may be displayed with voice or screen or non-screen computing devices with instructions from the GUI 210 in accordance with instructions on the method and system. In some embodiments, user tax button 2960 data may be displayed with voice or screen or non-screen computing devices with instructions from the GUI 210 in accordance with instructions on the method and system. In some embodiments, user month to date tax data button 2980, year to date tax data button 2990, prior year tax data button 2991 may be displayed with voice or screen or non-screen computing devices with instructions from the GUI 210 in accordance with instructions on the method and system. In some embodiments, the accounting and tax information may be stored in the Network Member Database Server 3160 and transmitted through the cloud, network and CPUs 3190 to the GUI computing device 210. In some embodiments, transportation or freight unit accounting and fund interfaces may be a subset or superset of the aforementioned in the formation of an open forward market auction for a multi layered network node topology for a forward market of transportation and freight units.

Figure 30:
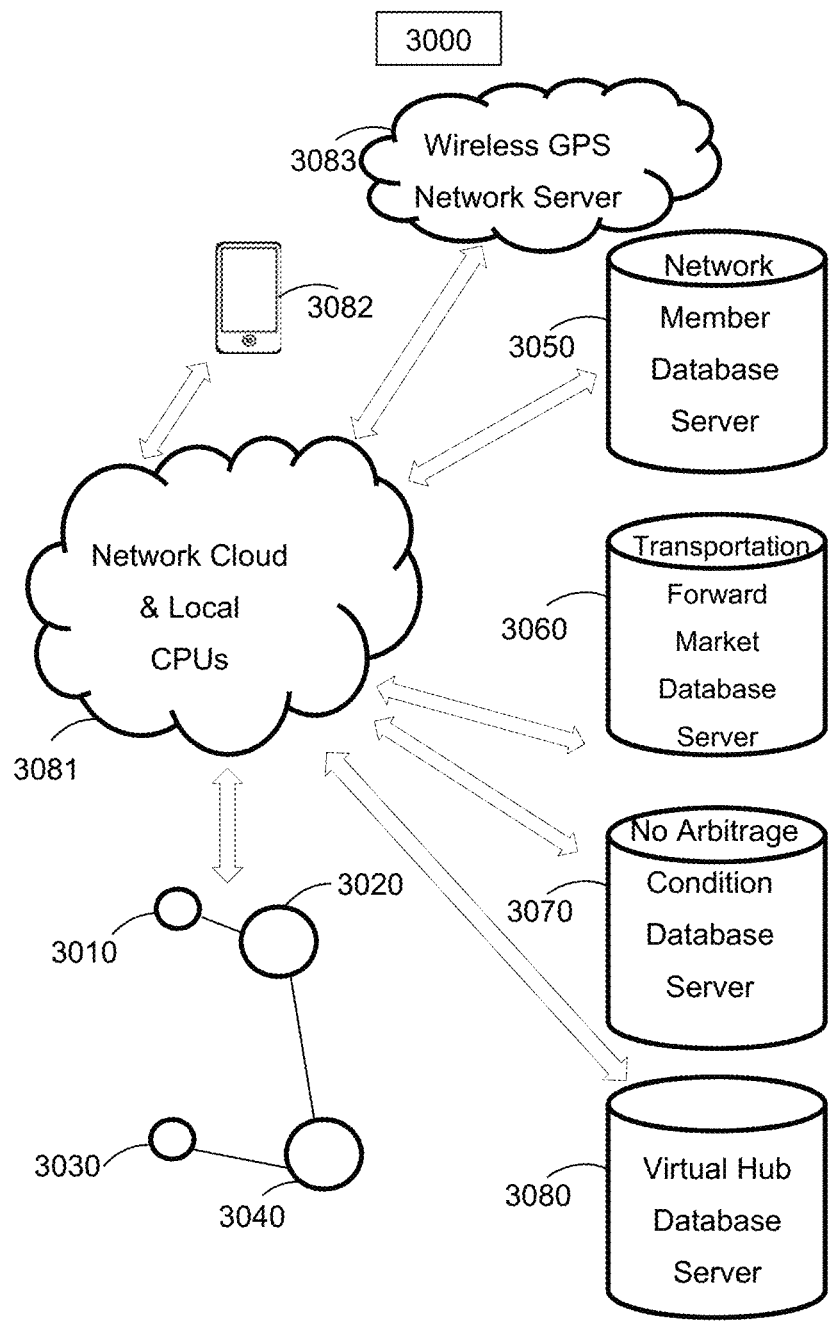
FIG. 30 illustrates an exemplary method and system configuration of multiple virtual hub topology auctions in accordance with some embodiments.

FIG. 30 illustrates an exemplary network configuration 3000 for a transportation or freight unit multi layered network node topology in one exemplary implementation of participating, transacting and/or trading transportation or freight capacity unit auctions in accordance with some embodiments. In some embodiments, the multi layered network node topology of participating, transacting and/or trading transportation or freight capacity configuration 2900 includes the following accounting elements, or a subset or superset thereof:

Exemplary Wireless GPS Network and Server 3083;

Exemplary Wireless computing device that is audio, video, screen or non-screen interfaced 3082;

Exemplary Network Member Database Server 3050;

Exemplary Transportation Forward Market Database Server 3060;

Exemplary Transportation Forward Market Database Server 3060;

Exemplary No Arbitrage Condition Database Server 3070;

Exemplary Virtual Hub Database Server 3080;

Exemplary Network, Network Cloud, and local CPUs 3081;

Exemplary Network Multi Layered Network Virtual Hub Node Topology for forward market transportation of freight unit auctions 3010, 3020, 3030, 3040.

In some embodiments, the network topology 3010 may utilize a voice or screen or non-screen computing device 3082 to interface with system and method instructions over a Network and Network Cloud and Networked CPUs 3081 to use instructions on CPUs to order a constrained or unconstrained virtual hub network topology auction over two or more virtual hub nodes 3010, 3020, 3030, 3040 over one or multiple modes of transportation or freight with instructions and data from the Virtual Hub Database Server 3080, the No Arbitrage Condition Database Server 3070, the Transportation Forward Market Database Server 3060, the Network Member Database Server 3050 and the Wireless GPS Network Server 3083. Network Data may be displayed with voice or screen or non-screen computing devices with instructions from the GUI 210 in accordance with instructions on the method and system.

Figure 31:
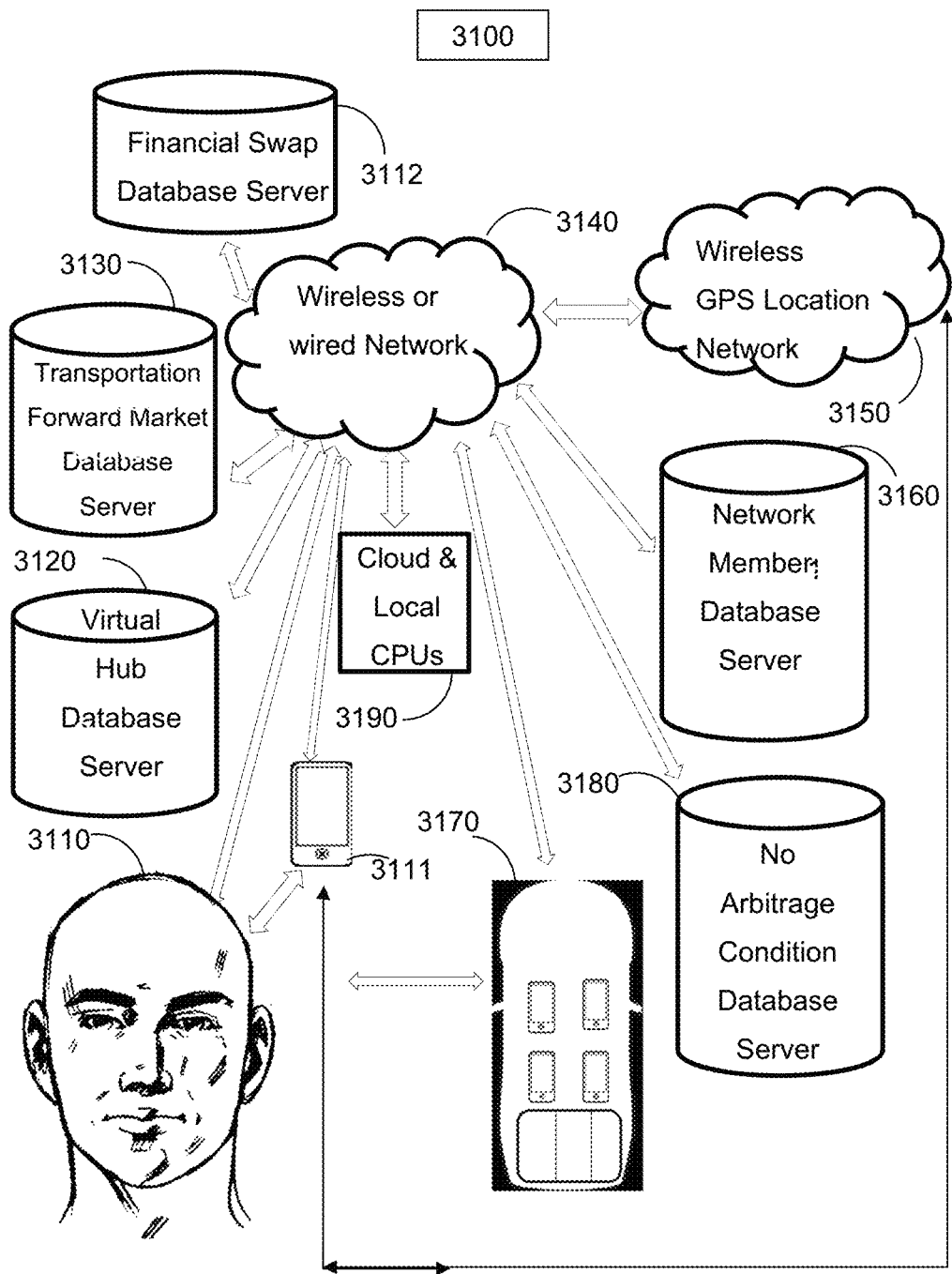
FIG. 31 illustrates an exemplary data element transformation system requirement to perform a financial swap payment structure and index on transportation and freight capacity units in accordance with some embodiments.

FIG. 31 illustrates an exemplary user in context of the an exemplary network configuration. In one implementation as illustrated in 3100, a user 3110 may use a mobile computing device 3111 to login through a network 3140 to a network member database server 3160. The mobile computing device 3111 may be substituted for a fixed stationary computing device, an augmented reality projection device, virtual reality projection device, voice interface computing device, mixed reality projection device, or any computing device which renders a visualization to a user 3110. Once the user 3110 has logged into the network member database server which confirms user identity through multi-factor facial recognition, passwords, fingerprint recognition and photo scan 3160 through the wireless or wired network 3140, a token will be passed to the mobile computing device 3111 and an authenticated session commences which allows the user 3110 access to an exemplary graphical user interface FIG. 2. The user 3110 may input an origin/from location 220 and a destination/to location 230 on the mobile computing device 210 GUI. The user 3110 may also allow the instructions from the GUI on the mobile computing device 3111 locate the users origin/from address automatically through communication with the wireless GPS location network 3150. The user 3110 may transmit the from/origin address location 220 and to/destination address location information 230 by depressing the go representation 240 on the GUI. The from/origin address location 220 and to/destination address location information 230 are transmitted by the user 3110 to the wireless or wired network 3140 to a cloud based CPU 3190 or a local CPU 3190 such that instructions may be performed in the memory of the CPU 3190 to form a virtual hub 310 with other users 3110 that are a part of the network member database server 3160. The virtual hub location information is then saved in the virtual hub database server 3120 by the CPUs 3190 transmitting the corresponding data to the virtual hub database server 3120. Once two or more virtual hubs have been logged into the virtual hub database server 3120 with corresponding physical location data, the instructions on the CPU 3190 request the corresponding pricing information from the transportation forward market database server 3130 through the network 3140 to present the current series of bid/buy and offer/sell prices for the combination of virtual hubs the user 3110 has requested. The user 3110 may set a series of conditions and constraints to give specific instructions to the CPU 3190 through the mobile computing device GUI 3111. The specific conditions and constraints set by the user 3110 form the basis for the forward commodity contract between other users 3110 on the network member database server 3160 which form the basis for participating, transacting and/or trading transportation or freight capacity as a forward commodity and resulting financial swap payment structures from the transformation and interface with the financial swap database server 3112. Further the user 3110 may set additional constraints on the mobile computing device GUI 3111 which then are transmitted through the network 3140 to the no arbitrage condition database server 3180 such that the commodity transaction may have important attributes which assist in increasing the liquidity of various transactions on the system and various financial swap payment incentives. Once a transaction has been completed using the plurality of CPUs, instructions, servers and networks, the user 3110 may then physically take delivery of the transportation or freight capacity commodity by getting into the vehicle 3170 and taking a unit of capacity as defined by the contract commodity specifications which were set by the user 3110 using the mobile computing device 3111 network 3140 and plurality of database servers such as the transportation database server 3130, CPUs 3190, instructions on CPUs 3190, virtual hub database server 3120, wireless GPS location network 3150, network member database server 3160 and no arbitrage condition database server 3180. Further a user 3110 may not only take physical delivery of the transportation capacity unit in a vehicle 3170 but they may also make physical delivery of the transportation capacity unit if the user 3110 is the owner of the transportation capacity unit. If the user 3110 is the buyer of the transportation capacity unit, they are taking physical delivery of the transportation capacity unit in the vehicle 3170. To avoid confusion, the specifications for the transportation capacity unit mode may have been set for automobile, air, autonomous vehicle, bike, boat, bus, drone, limo, motorcycle, moped, shuttle, space, subway, taxi, train, fastest optimized, cheapest route, packages, cargo or virtual modes. Accordingly the vehicle 3170 in the diagram in FIG. 31 may be an automobile, air, autonomous vehicle, bike, boat, bus, drone, limo, motorcycle, moped, shuttle, space, subway, taxi, train, fastest optimized, cheapest route, packages, cargo, virtual, or other form of transportation. To be approved as a network member on the network member database server 3160, the user 3110 must have input financial information into the network member database server 3160 such that the user 3110 has the ability to take payment for delivery of the transportation unit commodity or make payment for the transportation unit commodity from the transformation of the financial swap payment structure database 3112. Safety and security also have preset configurations and approval levels for network members in the network member database server 3160 which are multi-factor to include passwords, facial recognition, fingerprint recognition and photo recognition and no arbitrage condition database server 3180 which are covered in more detail later in the drawings and detailed description. Virtual hub database server 3120 locations are added as a user 3110 requests transportation or freight capacity units or offers transportation or freight capacity units from various locations from the GUI on the mobile computing device 3111 in accordance with some embodiments.

Figure 32:
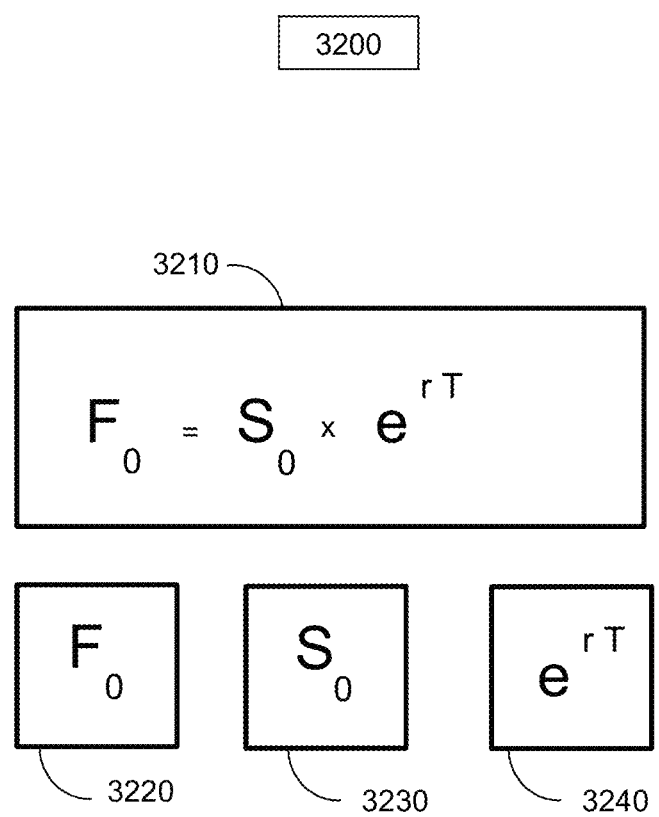
FIG. 32 illustrates an exemplary forward contract valuation on the relationship between a spot forward price and forward price in the future of a transformed transportation capacity unit in accordance with some embodiments.

FIG. 32 illustrates an exemplary relationship between the forward price for the transportation or freight capacity unit and the spot price of the transportation or freight capacity unit. In some embodiments, the multi layered network node topology of participating, transacting and/or trading transportation or freight and resulting transformed financial swap payment structure capacity configuration 3200 includes the following transformed math and transportation unit elements, or a subset or superset thereof:

Exemplary general relationship between spot and forward price for the transportation or freight unit 3210;

Exemplary forward price at time zero for the transportation or freight unit 3220;

Exemplary spot price at time zero for the transportation or freight unit 3230;

Exemplary mathematical irrational constant ~2.7183 approximation e to the power of the relevant interest rate multiplied by the year time period for the transportation or freight unit 3240;

In some embodiments, the transportation unit forward contract may be valued at $100 per unit in accordance with instructions on the method and system. A user discloses they want to enter into a forward contract that expires in one year. In some embodiments the current annual risk-free rate may be 6%. Using the formula 3210 the forward price of the transportation unit is calculated as follows: F equals $100 multiplied by the irrational constant e to the power of six percent multiplied by 1 which equals $106.18 by way of example but not limiting by example in accordance with instructions on the method and system.

Figure 33:
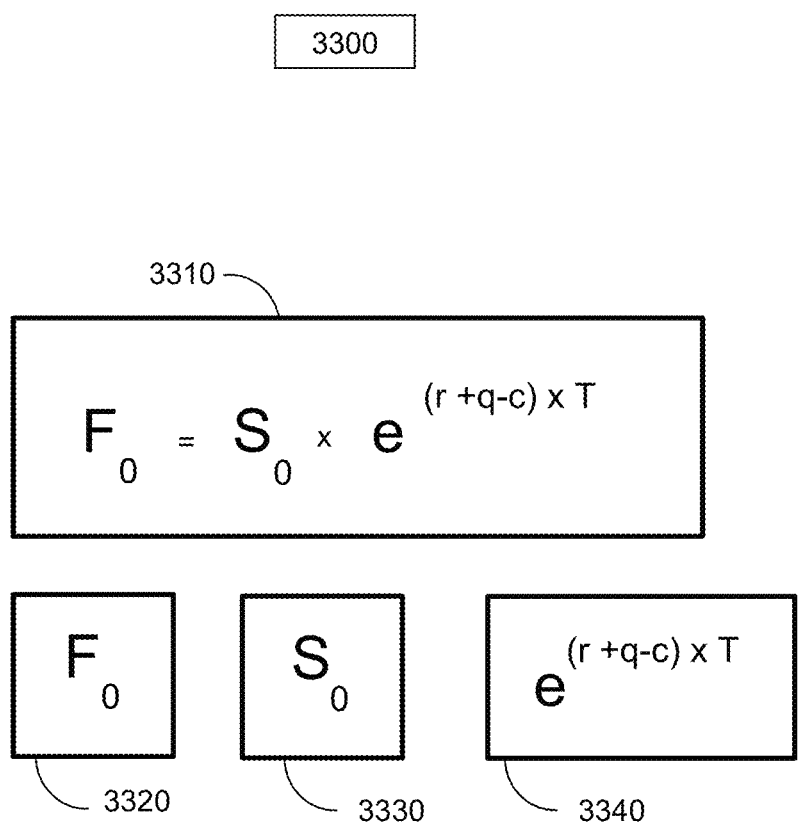
FIG. 33 illustrates an exemplary forward contract valuation on the relationship between a spot forward price with cost of carry and forward price in the future of a transformed transportation capacity unit in accordance with some embodiments.

FIG. 33 illustrates an exemplary relationship between the forward price for the transportation or freight unit and the spot price of the transportation or freight unit considering carrying costs. In some embodiments, the multi layered network node topology of participating, transacting and/or trading transportation or freight and resulting transformed financial swap payment structure capacity configuration 3300 includes the following transformed math and transportation unit elements, or a subset or superset thereof:

Exemplary general relationship between spot and forward price for the transportation or freight unit considering the cost of carry 3310;

Exemplary forward price at time zero for the transportation or freight unit 3320;

Exemplary spot price at time zero for the transportation or freight unit 3330;

Exemplary mathematical irrational constant ~2.7183 approximation e to the power of the relevant interest rate plus the storage cost q less the convenience yield c which is an adjustment to the cost of carry, multiplied by the year time period for the transportation or freight unit 3340;

In some embodiments, the transportation unit forward contract may be valued at $1000 per unit in accordance with instructions on the method and system. A user discloses they want to enter into a forward contract that expires in one year. In some embodiments the current annual risk free rate may be 2%. Using the formula 3310 the forward price of the transportation unit is calculated as follows: F equals $1000 multiplied by the irrational constant e to the power of two percent plus 0.5% which is the storage cost q less the convenience yield c which is 0.25% multiplied by one which equals $1022.80 by way of example but not limiting by example in accordance with instructions on the method and system.

Figure 34:
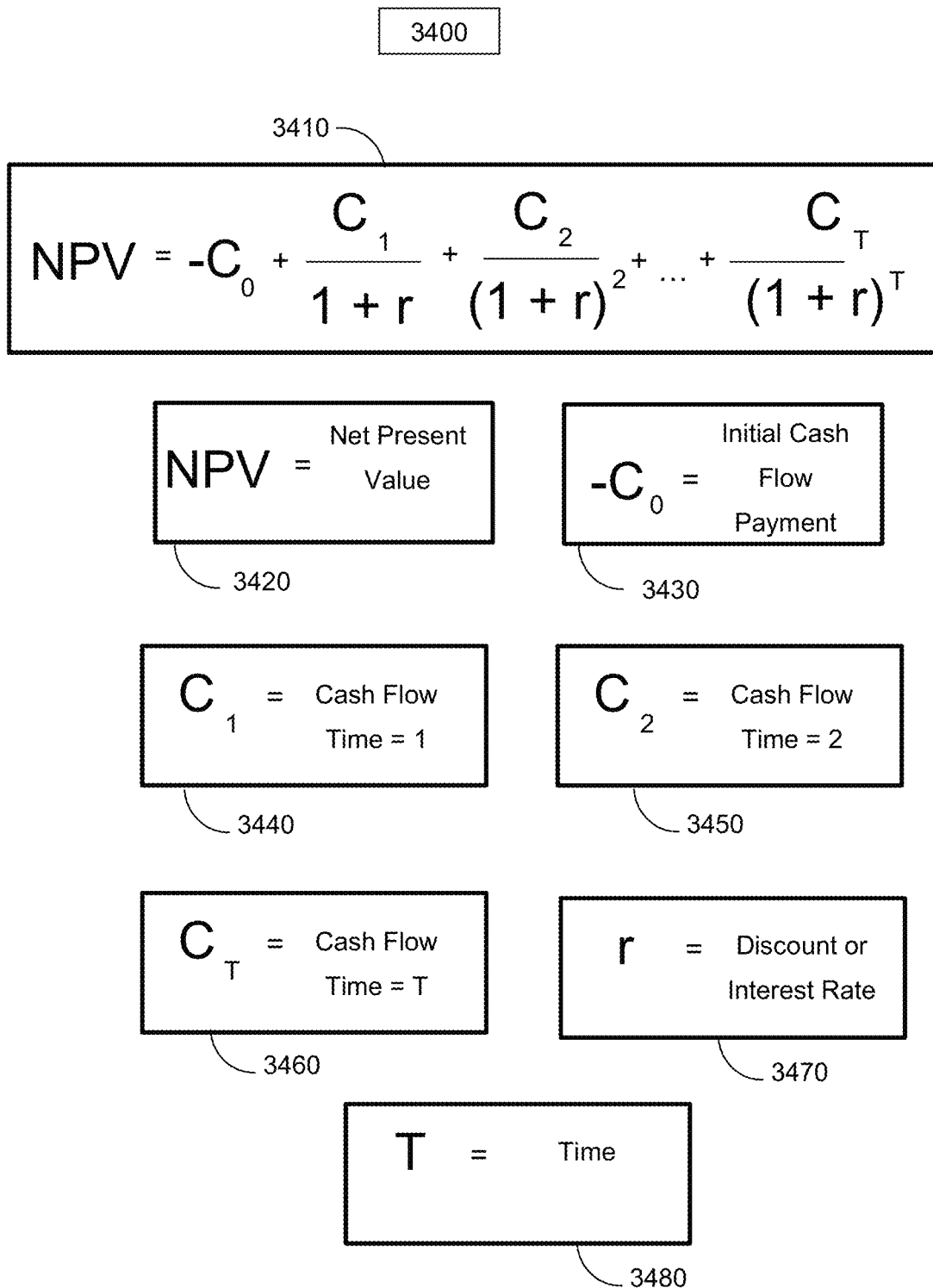
FIG. 34 illustrates an exemplary forward discounted cash flows to a financial swap payment structure of a transformed transportation capacity unit in accordance with some embodiments.

FIG. 34 illustrates an exemplary net present value of the financial swap payment structure considering the transformed transportation units and cash flows from the forward prices of those transformed transportation units. In some embodiments, the multi layered network node topology of participating, transacting and/or trading transportation or freight and resulting transformed financial swap payment structure capacity configuration 3400 includes the following transformed math and transportation unit elements, or a subset or superset thereof:

Exemplary general formula for the net present value of the financial swap payment structure for transportation and freight units 3410;

Exemplary net present value element or variable NPV 3420;

Exemplary initial cash flow C sub zero of the financial swap payment 3430 at time t equals zero;

Exemplary cash flow C sub one of the financial swap repayment 3440 at time equals one;

Exemplary cash flow C sub two of the financial swap repayment 3450 at time equals two;

Exemplary cash flow C sub T of the financial swap payment 3460 at time equals T;

Exemplary interest rate or discount rate which equals the variable r 3470;

Exemplary time to delivery of the transportation unit which equals the variable T 3480;

In some embodiments, the transportation unit forward contract 3320 may be a cash flow at time equals one 3440 or C sub one of $100 and another transportation unit forward contract 3320 which may or may not have a different value than the cash flow at time equals one 3440 and for purposes of example we will define that second cash flow as 3450 or C sub two with a value of $105. Each of the cash flows 3440 and 3450 would be discounted at a time of r 3470 at time t 3480 in accordance with a standard but transformed data structure to represent a physical forward contract for a transportation or freight unit. In some embodiments such as the aforementioned example the interest rate or discount rate r 3470 is 10% and time T 3480 is two years. The transformed resulting addition of the cash flows using the discounted cash flow model 3410 for transformed transportation units would yield the amount of payment that could be made to the user as the initial cash flow payment 3430. The initial cash flow 3430 may be the financial swap payment in accordance with some embodiments which is then paid back by the delivery of transportation or freight units and resulting cash flows 3440, 3450 and 3460.

FIG. 35 illustrates an exemplary relationship between the forward price 3510 for the transportation or freight capacity unit and the futures price 3520 and the swap price 3530 of the transportation or freight capacity unit. In some embodiments the transportation capacity unit ("TCU"), may be represented by TCU(t) which is the forward price when the TCU was initiated and S(t) is the spot price at time=t 3510. In some embodiments S(T) is the spot price at delivery 3510.

In some embodiments a TCU may be standardized or custom 3510. In some embodiments, TCU futures may vary from TCF forwards in that participants realize gains and losses daily, TCU futures may be standardized, TCU futures may be settled through a clearing house and TCU futures may be regulated whereas TCU forwards are not regulated 3520. In some embodiments, a TCU swap 3530 may be represented by the formula value equals V, which is the sum of the C overstrike less C squiggle divided by the quantity of the zero interest rate curve. In some embodiments, equation 3530 may be appealing as it expresses the TCU swap's value in terms of the portfolio value of a series of N TCU forward contracts.

Figure 36:
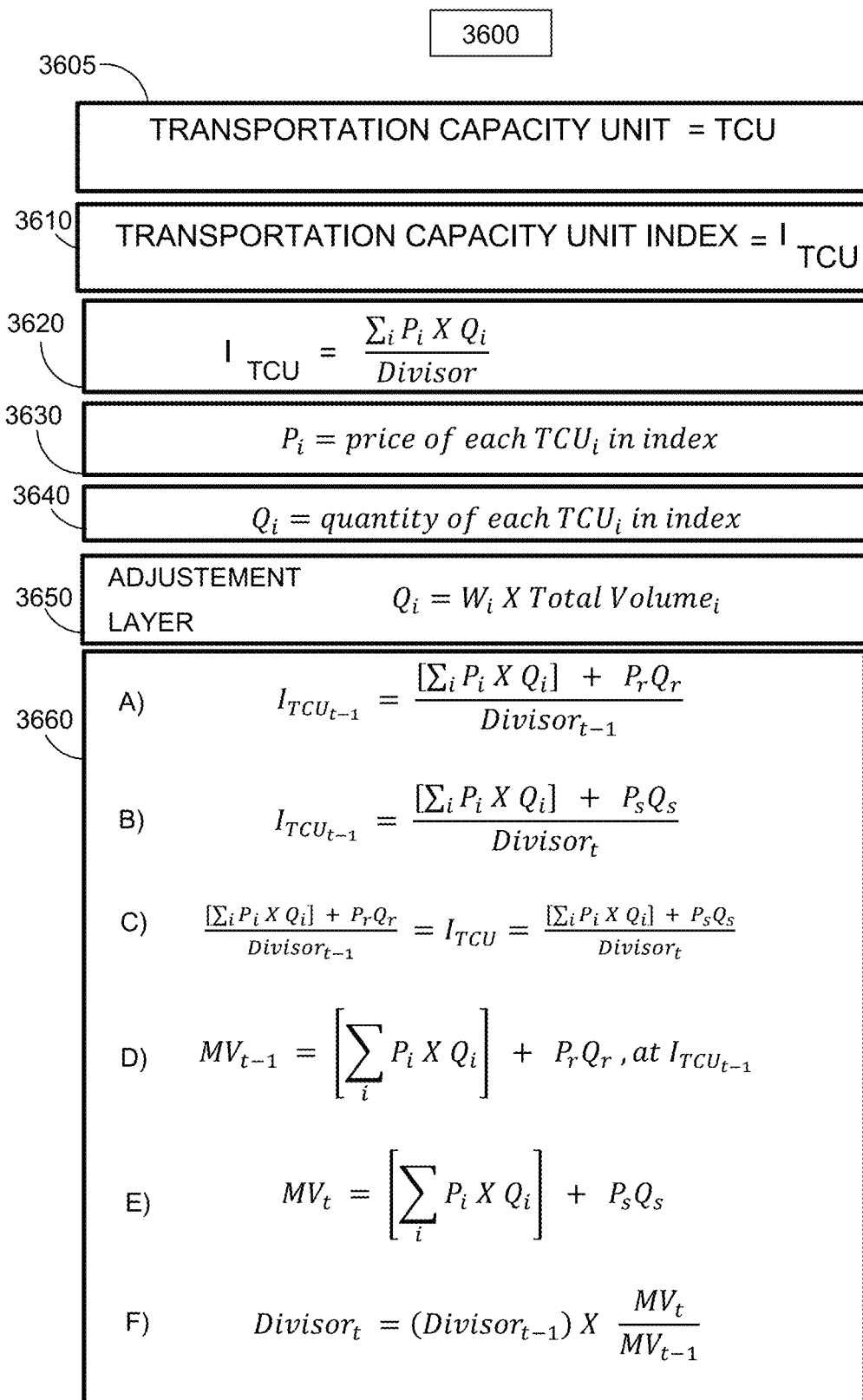
FIG. 36 illustrates an exemplary plurality of index constructions for transformed transportation capacity units.

FIG. 36 illustrates an exemplary relationship of TCUs as stand alone transportation capacity routes and as portfolio routes which may be constructed into price indexes such as the S&P 500 or Dow Jones or Goldman Sachs Commodity Index. In some embodiments a transportation capacity unit ("TCU") is named a TCU 3605. In some embodiments, a TCU index may be formed which may be labeled as $I_{TCU}$=Transportation Capacity Unit Index 3610;

In some embodiments, the formula for a given TCU or portfolio of TCUs may be formed with the following set of equations:

$$I_{TCU} = \frac{\sum_i P_i \times Q_i}{\text{Divisor}} 3620;$$

where P sub i is the price of each TCU sub i in an index 3630;

And where Q sub i is equal to the quantity of each TCU sub i in an index 3640.

In some embodiments, for a plurality of reasons and rationale, Q sub i may need adjustment due to irrational data, unreliable data submission, outlier data or other rationale with the adjustment layer 3650. The adjustment layer 3650 may reweight given weights to conform the weightings to standards that promote continuity or errant reporting by industry price sources, double counting, self-dealing or other rationale. In some embodiments, the general TCU index construction equation 3620 needs adjustments to the divisor when new TCUs are added to a portfolio TCU index or subtracted from a portfolio TCU index. In some embodiments divisor adjustments may place the TCU r, being removed $P_r Q_r$ 3660 A separately from the TCUs remaining: $(\Sigma_i P_i \times Q_i)$ 3660 A In some embodiments, the TCU index level with TCU sub r is replaced with TCU sub 5;

$P_s Q_s$ 3660 B,

In some embodiments, the design of TCU index level sub t−1 is equal to TCU index level sub t. Combining 3660A and 3660B and re-arranging, the adjustment to the Divisor can be determined from the index market value before and after the change of composition of the TCU portfolio index change 3660C. In some embodiments, the left hand side of 3660 C may be named MV sub t−1 for the index value at t−1 3660D. In some embodiments, the right hand fraction may be named MV sub t for the market value at time t 3660E. In some embodiments, given these factors, MV sub t−1, MV sub t, and Divisor sub t−1 are all known quantities. Given these values, the new divisor that will keep the index level constant when TCU r is replaced by TCU s is calculated using the formula illustrated in 3660F $$\text{Divisor}_t = (\text{Divisor}_{t-1}) \times \frac{MV_t}{MV_{t-1}} 3660F;$$

In some embodiments, a TCU Index may be an index between any two virtual transportation capacity unit hubs or any multi hub virtual hub combo of transportation capacity unit hubs or a portfolio of transportation capacity unit hubs 3660. In some embodiments, TCU index construction values may be used as settlement figures for swaps, options, futures, forwards and other derivative transactions based on transportation capacity units 3605.

FIG. 37 illustrates an exemplary relationship of TCUs as European puts and calls by way of example but not limiting by example 3700. In some embodiments, C=European Call Option with interest rate r and the TCU futures or forward or swap price of F(t) of maturity T on a TCU with strike price K and delivery date T' (with T' greater than or equal to T):

$c = e^{-rT}[FN(d_1) - KN(d_2)]$ 3710;

In some embodiments, P=the corresponding put option price:

$p = e^{-rT}[KN(-d_2) - FN(-d_1)]$ 3720;

and N( ) is the cumulative normal distribution function; where:

$$d_1 = \frac{\ln\left(\frac{F}{K}\right) + \left(\frac{\sigma^2}{2}\right)T}{\sigma\sqrt{T}} \text{ and } d_2 = \frac{\ln\left(\frac{F}{K}\right) - \left(\frac{\sigma^2}{2}\right)T}{\sigma\sqrt{T}} = d_1 - \sigma\sqrt{T}, 3730$$

If we consider an option on a forward contract expiring at time T'>T, the payoff doesn't occur until T'. Thus the discount factor $e^{-rT}$ is replaced by $e^{-rT_t}$ 3730.

In some embodiments, a TCU Index may be an index between any two virtual transportation capacity unit hubs or any multi hub virtual hub combo of transportation capacity unit hubs or a portfolio of transportation capacity unit hubs. In some embodiments, call 3710 and put 3720 options on TCUs may be used to settle calculation payments and the basis of TCU transactions.

Figure 38:
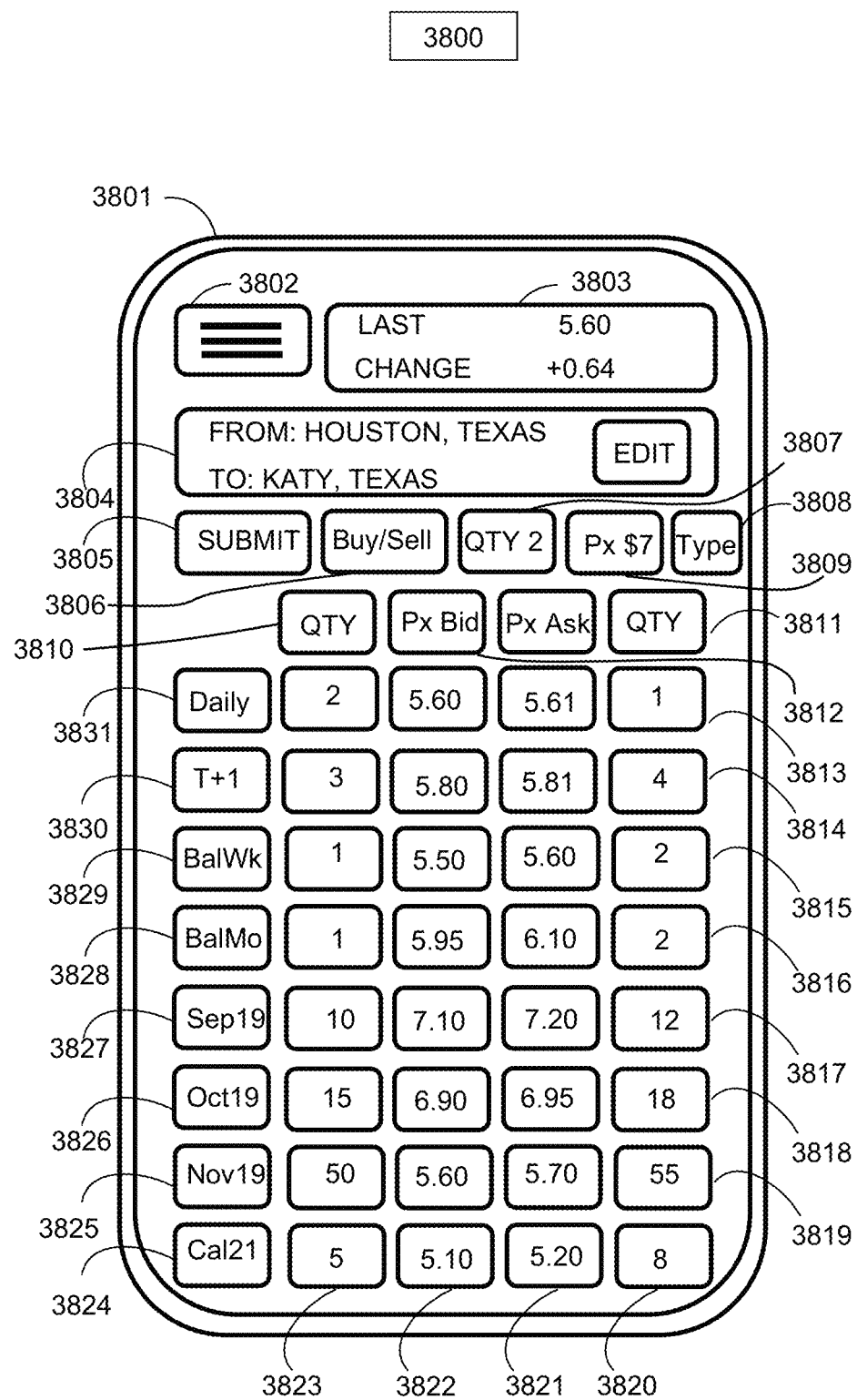
FIG. 38 illustrates an exemplary forward or swap or option graphical user interface over the term structure of the transformed transportation capacity unit.

FIG. 38 illustrates an exemplary graphical user interface 3801 of the trading and transaction system for TCUs with the term structure of a transportation capacity unit specification for a forward, swap, option or futures. In some embodiments, a menu hamburger option 3802 may be pressed to take the user 3110 to other functional areas of the TCU application. In some embodiments, the graphical user interface 3801 may display the last TCU trade value and the change in price of the trade value from the previous time period 3803. In some embodiments, the method and system transform a commute by formatting two or more virtual hubs into a virtual hub sequence 3804 that then initiates instructions to display a plurality of term structure discrete time periods to trade swaps, futures, forwards, options or other derivatives based on the virtual hub sequence specification 3804 which is editable to update or change to other virtual hub sequences. In some embodiments, the user 3110 may select a certain discrete term structure specification such as daily 3831 to display the current day swap, option, forward or future market for the virtual hub sequence 3804. In some embodiments, the user 3110 may then chose to buy or sell 3806 the selected specification of a virtual hub sequence and specification 3804 by selecting a buy order or sell order 3806, then selecting a quantity of transportation capacity units 3807, then a price for the transportation capacity unit 3809, and an order type 3808 which may use a plurality of specification parameters such as timings 510, quality specification 520, future, swap, forward or option specification 520, term specification 610, order time specification 710, order type specification 720, order mode specification 810 or other specifications such as American options, European options, swaptions, differential swaps, vanilla swaps, fuel to TCU swaps, participation swaps, margin swaps, extendible swaps, futures, forwards, backwardation swaps and other combinations of futures, swaps, forwards and options on transportation capacity units. In some embodiments, the order and price grid for TCUs 3801 is set up to display a specific TCU specification bid or buy quantity 3810, TCU specification bid or buy price 3812, TCU specification ask or offer or sell price 3821 and TCU specification ask or offer or sell quantity 3811. In some embodiments, the TCU market grid 3801 may be configured to display a plurality of tenures for a given specification 3804 and 3808. In some embodiments, the tenure for a TCU specification may include but not be limited to daily 3831 for same day pricing, T+1 3830 for next day TCU markets, BalWK 3829 for the balance of the week TCU market, BalMo 3828 for the balance of the month TCU markets, Sepember 19 3827 for the TCU market for the month of September 2019, October 19 3826 for the TCU market for the month of October 2019, November 19 3825 for the TCU market for the month of November 2019, Cal21 3824 for the TCU market for the calendar year of 2021. In some embodiments, each tenure such as Cal21 3824 may have associated buy or bid quantities 3823, associated buy or bid prices 3822, sell or ask or offer prices 3821, sell or ask or offer quantities 3820. In some embodiments, the market grid for a given TCU specification may use a time priority queue to transform and organize TCU market data which may be as described in the following applications: (1) U.S. patent application Ser. No. 16/274,490, "Route Community Objects with Price-Time Priority Queues for transformed transportation units," filed Feb. 13, 2019; (2) U.S. patent application Ser. No. 15/577,393, "Electronic Forward Market Exchange for Transportation Seats and Capacity in transportation vehicles and spaces," filed Jan. 23, 2018; (3) U.S. patent application Ser. No. 16/257,032, "Securitization of transportation Units," filed Jan. 24, 2019, (4) U.S. patent application Ser. No. 15/266,326, "Implementation of a computerized business transaction exchange for various users," filed Sep. 15, 2016. All of these applications are incorporated by reference herein in their entirety. In some embodiments, each term TCU term structure specification 3831, 3830, 3829, 3828, 3827, 3826, 3825, 3824 may have associated buy or bid quantities 3823, associated buy or bid prices 3822, sell or ask or offer prices 3821, sell or ask or offer quantities 3820. In some embodiments, each tenure TCU term structure specification may have independent associated buy or bid quantities 3823, associated buy or bid prices 3822, sell or ask or offer prices 3821, sell or ask or offer quantities 3820 such as shown with independent quantity sell or offer or ask volumes 3813, 3814, 3815, 3816, 3817, 3818, 3819. In some embodiments, all elements of the TCU market grid 3801 are configurable based on the users 3110 selections.

Figure 39:
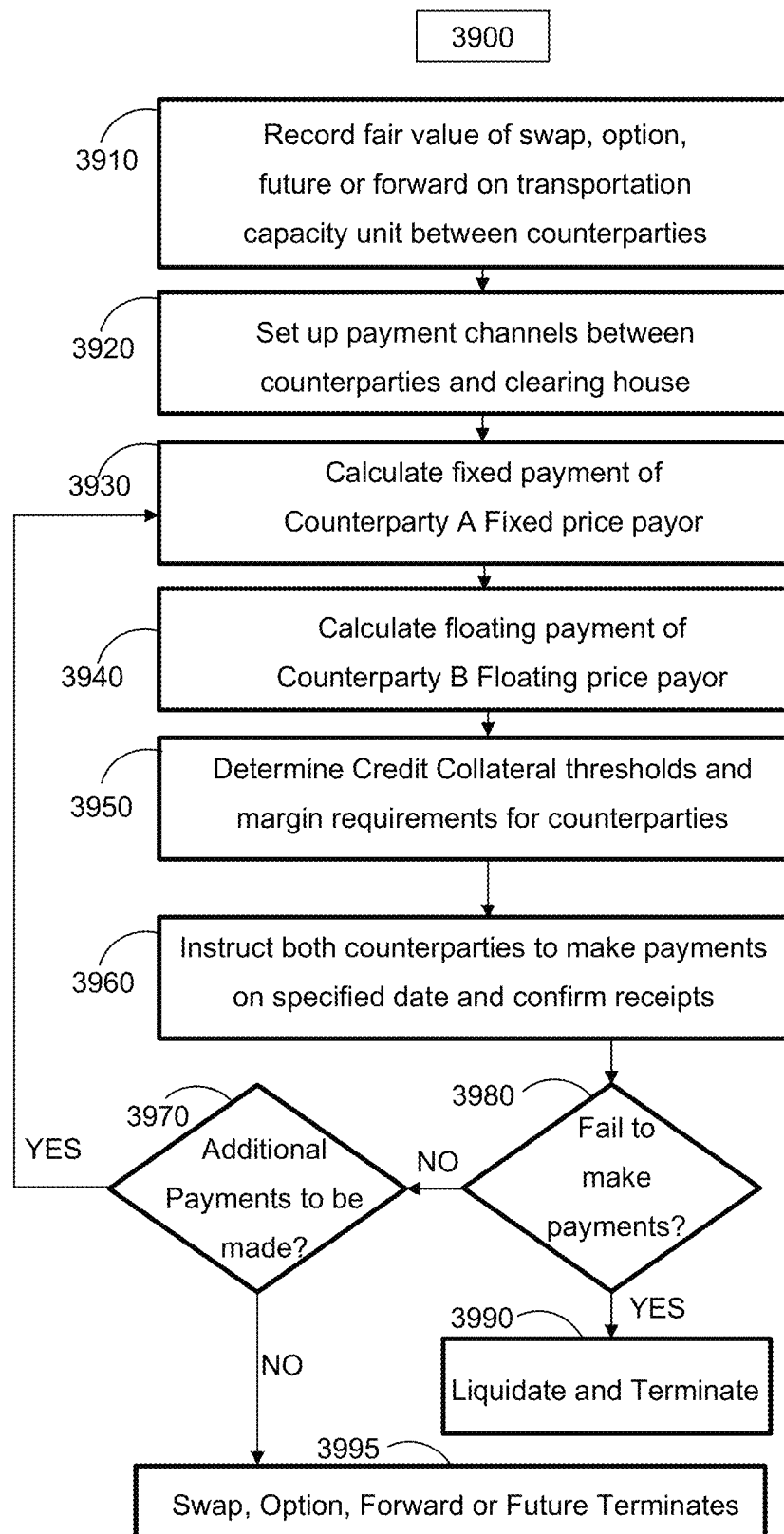
FIG. 39 illustrates an exemplary step flow diagram of swap, option, future, forward life cycle.

FIG. 39 illustrates an exemplary payment and index calculation step flow process for each transportation capacity unit specification for a forward, swap, option or futures 3900. In some embodiments, the disclosed method and system may record the fair value of the swap, option, future, forward or derivative based on a TCU between a plurality of counterparties 3910. In some embodiments, the disclosed system and method may set up payment channels between counterparties and the clearing house 3920. In some embodiments, the disclosed system and method may calculate fixed payment or payments of counterparty A who may be the fixed price payor 3930. In some embodiments, the disclosed system and method may calculate floating payment or payments of counterparty b who may be the floating price payor 3940. In some embodiments, the disclosed system and method may determine credit collateral thresholds and margin requirements for counterparties 3950. In some embodiments, the disclosed system and method may instruct both counterparties to make payments on specified dates and confirm receipts of such payments 3960. In some embodiments, the disclosed system and method may record if a counterparty fails to make a payment or payments 3980 which may then trigger steps to move towards TCU position liquidation and termination 3990 or if payments are made successfully 3970 trigger a repeat of steps 3930 through 3980 until all payments have been made successfully and the TCU swap, option, forward or future terminates 3995.

Figure 40:
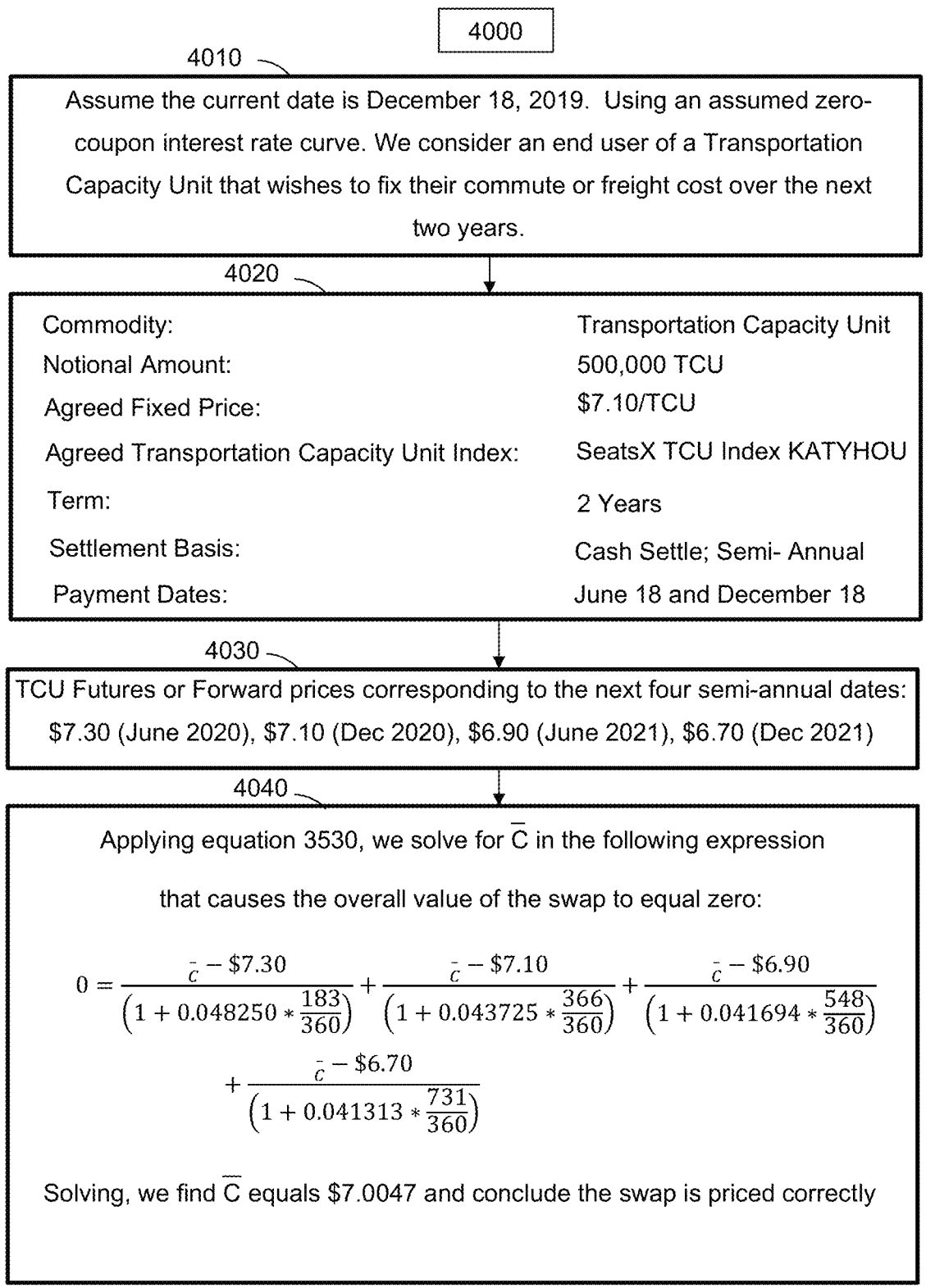
FIG. 40 illustrates an exemplary pricing of a transformed transportation capacity unit swap.

FIG. 40 illustrates an exemplary transportation capacity unit specification for a forward, swap, option or futures 4000 as a specific example for the purpose of illustration but not to limit by example. In some embodiments, the TCU transaction may include the following assumptions such as, assuming the current date is Dec. 18, 2019 and using an assumed zero-coupon interest rate curve, we may consider an end user of a Transportation Capacity Unit that wishes to fix their commute or freight cost over the next two years 4010. In some embodiments, specifications 4020 including but not limited to the following attributes such as commodity type of a Transportation Capacity Unit, a notional quantity of commodity type such as 500,000 TCU, agreed price per TCU such as $7.10, agreed Transportation Capacity Unit Index such as SeatsX TCU Index KATYHOU which is a specific index based on TCU transactions between two or more virtual TCU hubs between Katy, Tex. and Houston, Tex., an agreed upon term such as two years, an agreed upon settlement basis, such as cash or physical settlement, an agreed upon settlement time period such as semi-annual, an agreed upon payment date such as June 18 and December 18. In some embodiments, the TCU futures or forwards or swap prices corresponding to the next four periods of the exemplary transaction 4030 may be $7.30 (June 2020), $7.10 (December 2020), $6.90 (June 2021), $6.70 (December 2021). In some embodiments, an exemplary TCU swap may be priced using equations 3530 as described in equation 4040 to construct the swap with a zero coupon interest rate term structure and corresponding future, forward or swap bullet prices 4030 for purposes of example, but not to limit by example.

FIG. 41 illustrates an exemplary transportation capacity unit legal document specification transformation for a forward, swap, option or futures 4100 as a specific example for the purpose of illustration but not to limit by example. In some embodiments, the terms of the TCU transaction 4110 may be described with the legal transformation to make transportation capacity unit transformations a specification which can be traded as a swap, forward, future, option or other derivative transaction. In some embodiments, the legal transformation may describe a transaction type such as a Transportation Capacity Unit ("TCU") Swap 4110, a notional quantity of TCU units 4110, a specific virtual hub sequence and index description 4110, a unit specification 4110.

FIG. 42 illustrates an exemplary transportation capacity unit legal document specification transformation following 4100 for a forward, swap, option or futures 4200 as a specific example for the purpose of illustration but not to limit by example. In some embodiments, the terms of the TCU transaction 4100, 4200 may additionally include contractual currency 4210, virtual hub route sequence 4210, demographic group 4210, market 4210, term 4210, period 4210, effective date 4210, termination dates 4210, settlement dates 4210, details on fixed price payor and floating price payor 4210, price source of the index or product reference price 4210, floating price reference source 4210, settlement terms 4210, interest rates for exemplary transactions 4210.

FIG. 43 illustrates an exemplary transportation capacity unit legal document specification transformation following 4100 and 4200 for a forward, swap, option or futures 4300 as a specific example for the purpose of illustration but not to limit by example. In some embodiments, the legal transformation may include details to a calculation agent 4310, payment details to a clearing house 4310, payment details to counterparties 4310, contact information 4310, signature pages 4310 and confirmation instructions 4310.

FIG. 44 illustrates an exemplary transportation capacity unit legal document specification transformation following 4100 and 4200 and 4300 for a forward, swap, option or futures 4400 as a specific example for the purpose of illustration but not to limit by example. An exemplary detailed description of other possible legal transformations of the Transportation Capacity Unit 4410.

FIG. 45 illustrates an exemplary transportation capacity unit legal document specification transformation following 4100 and 4200 and 4300 and 4400 for a forward, swap, option or futures 4500 as a specific example for the purpose of illustration but not to limit by example. An exemplary detailed description of other possible legal transformations of the Transportation Capacity Unit 4510.

FIG. 46 illustrates an exemplary transportation capacity unit legal document specification transformation following 4100 and 4200 and 4300 and 4400 and 4500 for a forward, swap, option or futures 4600 as a specific example for the purpose of illustration but not to limit by example. An exemplary detailed description of other possible legal transformations of the Transportation Capacity Unit 4610.

FIG. 47 illustrates an exemplary transportation capacity unit legal document specification transformation following 4100 and 4200 and 4300 and 4400 and 4500 and 4600 for a forward, swap, option or futures 4700 as a specific example for the purpose of illustration but not to limit by example. An exemplary detailed description of other possible legal transformations of the Transportation Capacity Unit 4710.

The aforementioned description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    receiving origin location data and destination location data from a first user over a wireless or wired communication network, wherein the origin location data corresponds to a geographic origin for a transportation route and the destination location data corresponds to a geographic destination for the transportation route;
    determining a plurality of virtual hubs based on the origin location data and the destination location data, wherein the plurality of virtual hubs comprises a first virtual hub based on the origin location data and a second virtual hub based on the destination location data;
    storing virtual hub location data corresponding to the first and second virtual hubs on a first database server;
    receiving, over the wireless or wired communication network, specification data from the first user, wherein the specification data comprises data indicating a selection of one or more derivatives specifications for traveling from the first virtual hub to the second virtual hub;
    determining a transportation capacity exchange for a plurality of transportation capacity units based on the plurality of virtual hubs and the specification data, wherein the plurality of transportation capacity units correspond to a plurality of predetermined spaces traveling from the first virtual hub to the second virtual hub, wherein the plurality of transportation capacity units correspond to the selection of the one or more derivatives specifications, and wherein the transportation capacity exchange corresponds to market depth data, the market depth data comprising data indicating at least a bid price or offer price provided by a second user for a respective transportation capacity unit;
    storing the transportation capacity exchange on a second database server;
    transmitting, over the wireless or wired communication network, the market depth data for the transportation capacity exchange to the first user;
    determining one or more index values for the plurality of transportation capacity units based on the market depth data and the specification data;
    transmitting, over the wireless or wired communication network, the one or more index values to the first user; and
    receiving, over the wireless or wired communication network, transaction input data from the first user, wherein the transaction input data comprises data indicating an acceptance by the first user of the bid price or offer price provided by the second user.

2. The method of claim 1, wherein the one or more derivatives specifications comprises a futures specification, a swap specification, a forward specification, an option specification, or combinations thereof.

3. The method of claim 1, wherein the origin location data is determined using a satellite navigation system, and wherein the method further comprises:
    determining locations for the first user and the second user using the satellite navigation system in order to complete a physical delivery corresponding to a respective transportation capacity unit of the transportation capacity units for the first user and the second user.

4. The method of claim 1, further comprising:
    determining the first virtual hub based on additional origin location data from one or more other users, wherein the first virtual hub corresponds to a location proximate to the geographic origin; and
    determining the second virtual hub based on additional destination location data from the one or more other users, wherein the second virtual hub corresponds to a location proximate to the geographic destination.

5. The method of claim 1, further comprising:
generating a forward commodity contract between the first user and the second user based on the received transaction input data, wherein the forward commodity contract comprises a futures specification contract, a swap specification contract, a forward specification contract, an option specification contract, or combinations thereof; and
scheduling a delivery corresponding to the respective transportation capacity unit based on the forward commodity contract.

6. The method of claim 1, further comprising receiving financial data from the first user, wherein the financial data corresponds to payment information for the first user.

7. The method of claim 1, further comprising:
receiving updated market depth data in real time, wherein the updated market depth data comprises data corresponding to a plurality of updated bid prices and a plurality of updated offer prices for the plurality of transportation capacity units;
determining an updated transportation capacity exchange for the plurality of transportation capacity units based on at least the updated market depth data; and
transmitting the updated market depth data to the first user.

8. The method of claim 1, wherein the market depth data comprises data corresponding to a plurality of bid prices and a plurality of offer prices for the plurality of transportation capacity units, and wherein the plurality of bid prices and the plurality of offer prices comprise the bid price or offer price provided by the second user.

9. The method of claim 1, wherein the specification data further comprises:
data indicating a selection by the first user of one or more transportation modes for traveling from the first virtual hub to the second virtual hub, and wherein the one or more transportation modes comprise an automobile, an aircraft, an autonomous vehicle, a motorcycle, a bicycle, a boat, a bus, a subway car, a taxicab, a train, and a delivery vehicle;
data indicating a selection of one or more grade specifications for traveling from the first virtual hub to the second virtual hub;
data indicating a selection by the first user of one or more conditions for traveling from the first virtual hub to the second virtual hub, wherein the one or more conditions comprise cheapest route, single mode of transportation, multiple modes of transportation, fastest route, most scenic route, highest rated route, most available route, highest volume of participants for route, most frequent route, service level for route, highest safety and security level for route, gender of driver, security of driver, and rating of driver; or
combinations thereof.

10. The method of claim 1, wherein the plurality of predetermined spaces comprises a plurality of seats, a plurality of cargo spaces, or combinations thereof in a plurality of vehicles traveling from the first virtual hub to the second virtual hub.

11. The method of claim 1, wherein determining the one or more index values comprises determining the one or more index values based on an addition or a subtraction of a respective transportation capacity unit to the plurality of transportation capacity units.

12. The method of claim 1, wherein determining the one or more index values comprises determining the one or more index values based on a plurality of prices and a plurality of quantities corresponding to the plurality of transportation capacity units.

13. The method of claim 1, wherein the market depth data further comprises data corresponding to:
a bid queue for one or more bid prices, wherein the one or more bid prices are ranked in the bid queue from highest price to lowest price, and wherein respective bid prices of the same value are ranked by time in the bid queue; and
an offer queue for one or more offer prices, wherein the one or more offer prices are ranked in the offer queue from lowest price to highest price, and wherein respective offer prices of the same value are ranked by time in the offer queue.

14. A computing system, comprising:
one or more processors; and
one or more memory comprising program instructions executable by the one or more processors to:
receive origin location data and destination location data from a first user over a wireless or wired communication network, wherein the origin location data corresponds to a geographic origin for a transportation route and the destination location data corresponds to a geographic destination for the transportation route;
determine a plurality of virtual hubs based on the origin location data and the destination location data, wherein the plurality of virtual hubs comprises a first virtual hub based on the origin location data and a second virtual hub based on the destination location data;
store virtual hub location data corresponding to the first and second virtual hubs on a first database server;
receive specification data, over the wireless or wired communication network, from the first user, wherein the specification data comprises data indicating a selection of one or more derivatives specifications for traveling from the first virtual hub to the second virtual hub;
determine a transportation capacity exchange for a plurality of transportation capacity units based on the plurality of virtual hubs and the specification data, wherein the plurality of transportation capacity units correspond to a plurality of predetermined spaces traveling from the first virtual hub to the second virtual hub, wherein the plurality of transportation capacity units correspond to the selection of the one or more derivatives specifications, and wherein the transportation capacity exchange corresponds to market depth data, the market depth data comprising data indicating at least a bid price or offer price provided by a second user for a respective transportation capacity unit;
store the transportation capacity exchange on a second database server;
transmit, over the wireless or wired communication network, the market depth data for the transportation capacity exchange to the first user;
determine one or more index values for the plurality of transportation capacity units based on the market depth data and the specification data;
transmit, over the wireless or wired communication network, the one or more index values to the first user; and
receive, over the wireless or wired communication network, transaction input data from the first user, wherein the transaction input data comprises data indicating an acceptance by the first user of the bid price or offer price provided by the second user.

15. The computing system of claim 14, wherein the one or more derivatives specifications comprises a futures specification, a swap specification, a forward specification, an option specification, or combinations thereof.

16. The computing system of claim 14, wherein the program instructions further comprise program instructions executable by the one or more processors to:
generate a forward commodity contract between the first user and the second user based on the received transaction input data, wherein the forward commodity contract comprises a futures specification contract, a swap specification contract, a forward specification contract, an option specification contract, or combinations thereof; and
schedule a delivery corresponding to the respective transportation capacity unit based on the forward commodity contract.

17. The computing system of claim 14, wherein the program instructions executable by the one or more processors to determine the one or more index values comprise program instructions executable by the one or more processors to determine the one or more index values based on an addition or a subtraction of a respective transportation capacity unit to the plurality of transportation capacity units.

18. The computing system of claim 14, wherein the program instructions executable by the one or more processors to determine the one or more index values comprise program instructions executable by the one or more processors to determine the one or more index values based on a plurality of prices and a plurality of quantities corresponding to the plurality of transportation capacity units.

19. A non-transitory computer-readable medium having stored thereon a plurality of computer-executable instructions which, when executed by a computer, cause the computer to:
receive origin location data and destination location data from a first user over a wireless or wired communication network, wherein the origin location data corresponds to a geographic origin for a transportation route and the destination location data corresponds to a geographic destination for the transportation route;
determine a plurality of virtual hubs based on the origin location data and the destination location data, wherein the plurality of virtual hubs comprises a first virtual hub based on the origin location data and a second virtual hub based on the destination location data;
store virtual hub location data corresponding to the first and second virtual hubs on a first database server;
receive specification data, over the wireless or wired communication network, from the first user, wherein the specification data comprises data indicating a selection of one or more derivatives specifications for traveling from the first virtual hub to the second virtual hub;
determine a transportation capacity exchange for a plurality of transportation capacity units based on the plurality of virtual hubs and the specification data, wherein the plurality of transportation capacity units correspond to a plurality of predetermined spaces traveling from the first virtual hub to the second virtual hub, wherein the plurality of transportation capacity units correspond to the selection of the one or more derivatives specifications, and wherein the transportation capacity exchange corresponds to market depth data, the market depth data comprising data indicating at least a bid price or offer price provided by a second user for a respective transportation capacity unit;
store the transportation capacity exchange on a second database server;
transmit, over the wireless or wired communication network, the market depth data for the transportation capacity exchange to the first user;
determine one or more index values for the plurality of transportation capacity units based on the market depth data and the specification data;
transmit, over the wireless or wired communication network, the one or more index values to the first user; and
receive, over the wireless or wired communication network, transaction input data from the first user, wherein the transaction input data comprises data indicating an acceptance by the first user of the bid price or offer price provided by the second user.

20. The non-transitory computer-readable medium of claim 19, wherein the one or more derivatives specifications comprises a futures specification, a swap specification, a forward specification, an option specification, or combinations thereof.

* * * * *